US010056043B2

(12) United States Patent
Takesue et al.

(10) Patent No.: US 10,056,043 B2
(45) Date of Patent: *Aug. 21, 2018

(54) IMAGE PROCESSING DEVICE, DISPLAY SYSTEM, AND ELECTRONIC DEVICE

(71) Applicant: Semiconductor Energy Laboratory Co., Ltd., Atsugi-shi, Kanagawa-ken (JP)

(72) Inventors: Norifumi Takesue, Chiba (JP); Yuichi Yanagisawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,487

(22) Filed: Aug. 21, 2017

(65) Prior Publication Data

US 2017/0372669 A1 Dec. 28, 2017

Related U.S. Application Data

(63) Continuation of application No. 14/945,688, filed on Nov. 19, 2015, now Pat. No. 9,754,540.

(30) Foreign Application Priority Data

Nov. 28, 2014 (JP) ................................ 2014-241476

(51) Int. Cl.
 *G09G 3/36* (2006.01)
 *G09G 3/34* (2006.01)
 (Continued)

(52) U.S. Cl.
 CPC ......... *G09G 3/3413* (2013.01); *G06F 3/1438* (2013.01); *G09G 3/3208* (2013.01);
 (Continued)

(58) Field of Classification Search
 USPC ....................................................... 345/173
 See application file for complete search history.

(56) References Cited

U.S. PATENT DOCUMENTS

| 5,793,344 A | 8/1998 | Koyama |
| 6,549,183 B1 | 4/2003 | Koyama |

(Continued)

FOREIGN PATENT DOCUMENTS

| CN | 103377611 A | 10/2013 |
| JP | 2002-324673 A | 11/2002 |

(Continued)

OTHER PUBLICATIONS

International Search Report (Application No. PCT/IB2015/058697) dated Mar. 15, 2016.

(Continued)

*Primary Examiner* — Van N Chow
(74) *Attorney, Agent, or Firm* — Fish & Richardson P.C.

(57) ABSTRACT

A display system including a display device and an image processing device is provided. The display device includes a second display panel overlapping with a first display panel on the display surface side. The second display panel has a region that transmits visible light adjacent to a display region. The region that transmits visible light of the second display panel overlaps with a display region of the first display panel, which makes a non-display region between display regions of two display panels in the display device small. The image processing device has a function of correcting the gray scale, which is included in image data, corresponding to at least one of a portion overlapping with the region that transmits visible light and a portion not overlapping with the region in the display region of the first display panel.

9 Claims, 28 Drawing Sheets

(51) Int. Cl.
*G09G 3/3208* (2016.01)
*G06F 3/14* (2006.01)
*G09G 3/00* (2006.01)

(52) U.S. Cl.
CPC ..... *G09G 3/006* (2013.01); *G09G 2300/0408* (2013.01); *G09G 2300/0426* (2013.01); *G09G 2300/0452* (2013.01); *G09G 2310/0221* (2013.01); *G09G 2310/0281* (2013.01); *G09G 2320/0233* (2013.01); *G09G 2320/0276* (2013.01); *G09G 2320/0285* (2013.01); *G09G 2320/0626* (2013.01); *G09G 2320/0673* (2013.01); *G09G 2360/144* (2013.01); *G09G 2360/145* (2013.01); *G09G 2370/16* (2013.01); *G09G 2380/02* (2013.01)

(56) References Cited

U.S. PATENT DOCUMENTS

| | | | |
|---|---|---|---|
| 6,987,497 | B2 | 1/2006 | Koyama |
| 7,053,874 | B2 | 5/2006 | Koyama |
| 7,399,991 | B2 | 7/2008 | Seo et al. |
| 7,663,149 | B2 | 2/2010 | Seo et al. |
| 7,696,961 | B2 | 4/2010 | Koyama |
| 8,367,440 | B2 | 2/2013 | Takayama et al. |
| 8,415,208 | B2 | 4/2013 | Takayama et al. |
| 8,436,792 | B2 | 5/2013 | Koyama |
| 2006/0109231 | A1 | 5/2006 | Koyama |
| 2013/0155042 | A1 | 6/2013 | Ishikawa et al. |
| 2013/0193858 | A1 | 8/2013 | Koyama |
| 2013/0214324 | A1 | 8/2013 | Takayama et al. |
| 2013/0278624 | A1 | 10/2013 | Abe |
| 2014/0291640 | A1 | 10/2014 | Miyake |
| 2015/0228704 | A1 | 8/2015 | Miyake et al. |

FOREIGN PATENT DOCUMENTS

| | | |
|---|---|---|
| JP | 2003-174153 A | 6/2003 |
| JP | 2011-211276 A | 10/2011 |
| JP | 2012-048206 A | 3/2012 |
| JP | 2013-156452 A | 8/2013 |
| JP | 2013-225052 A | 10/2013 |
| JP | 2014-032314 A | 2/2014 |
| JP | 2014-211631 A | 11/2014 |
| KR | 2014-0120272 A | 10/2014 |
| WO | WO-2008/149449 | 12/2008 |

OTHER PUBLICATIONS

Written Opinion (Application No. PCT/162015/058697) dated Mar. 15, 2016.

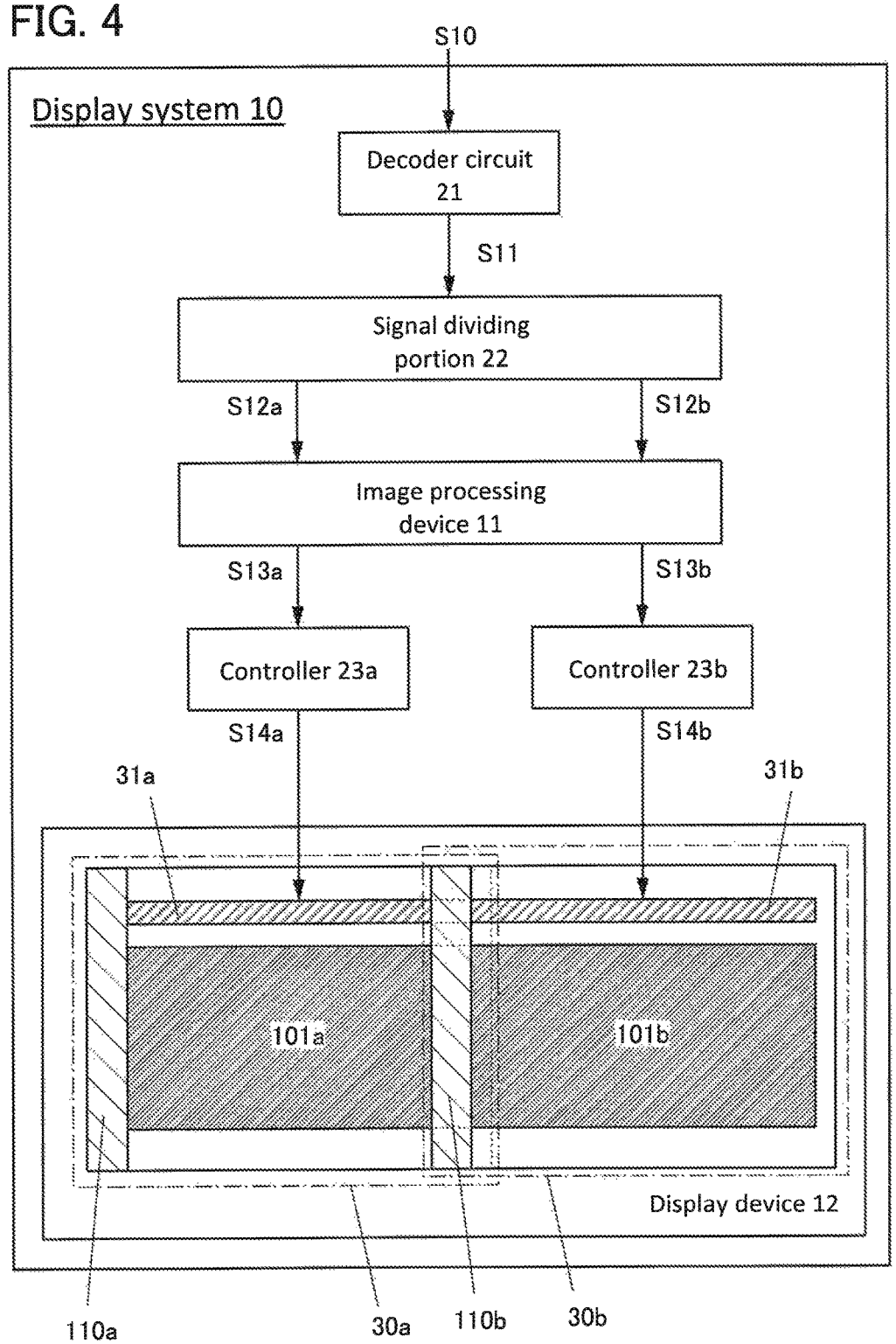

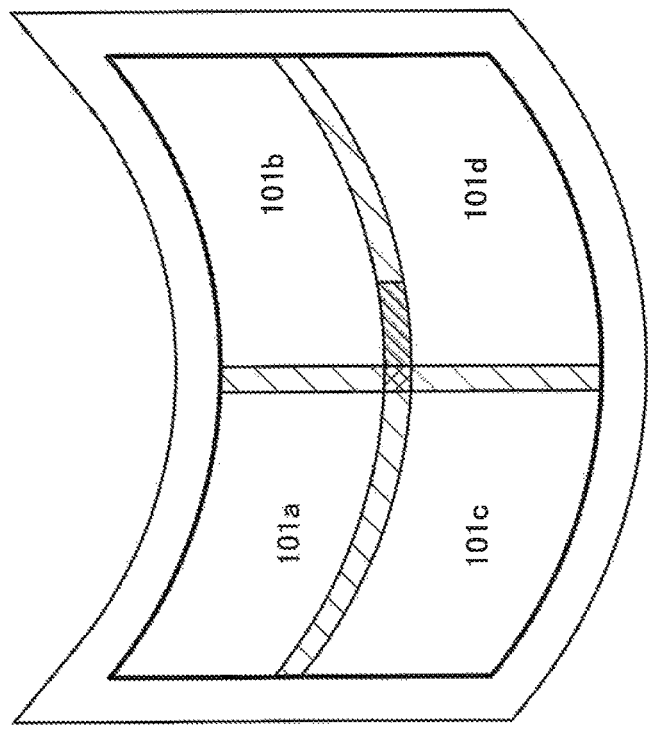
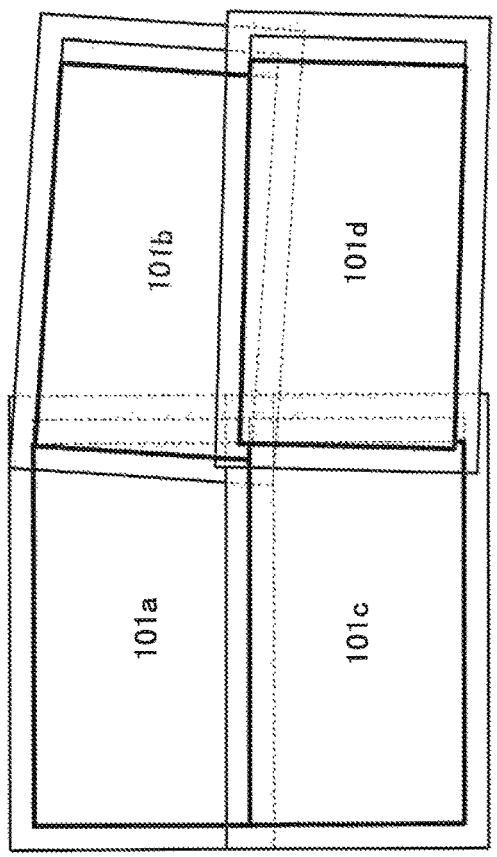
FIG. 8B
FIG. 8A

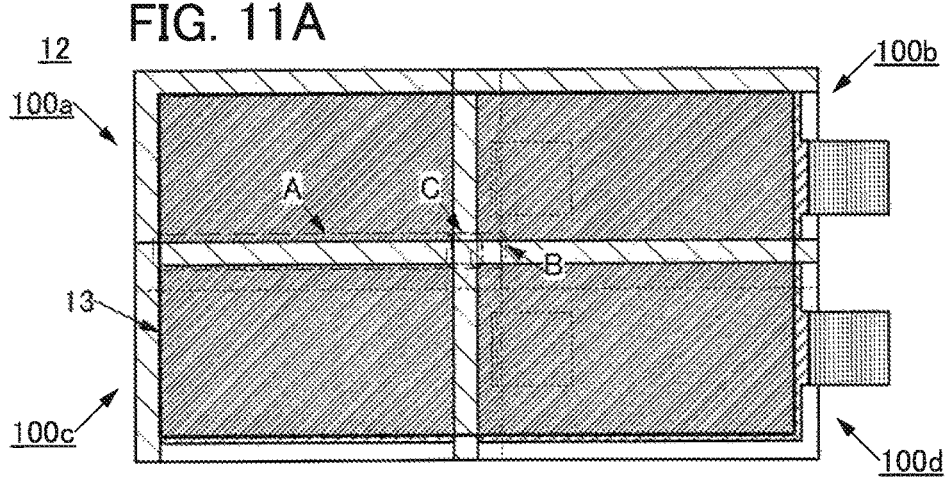
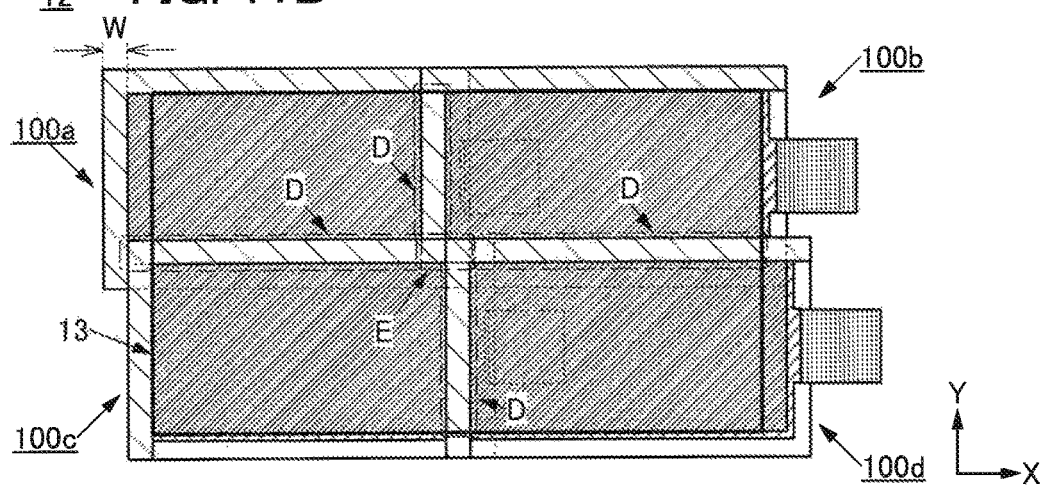
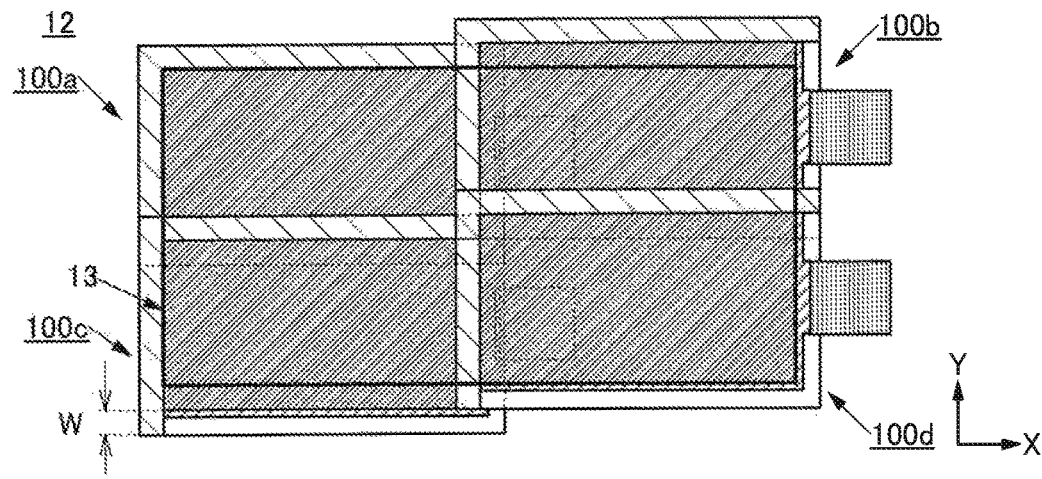

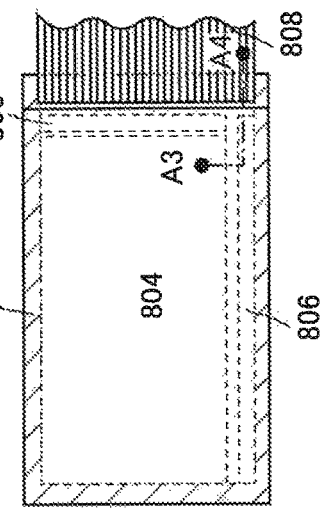
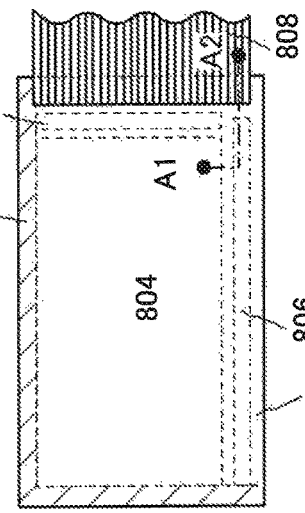
FIG. 17A
FIG. 17B
FIG. 17C

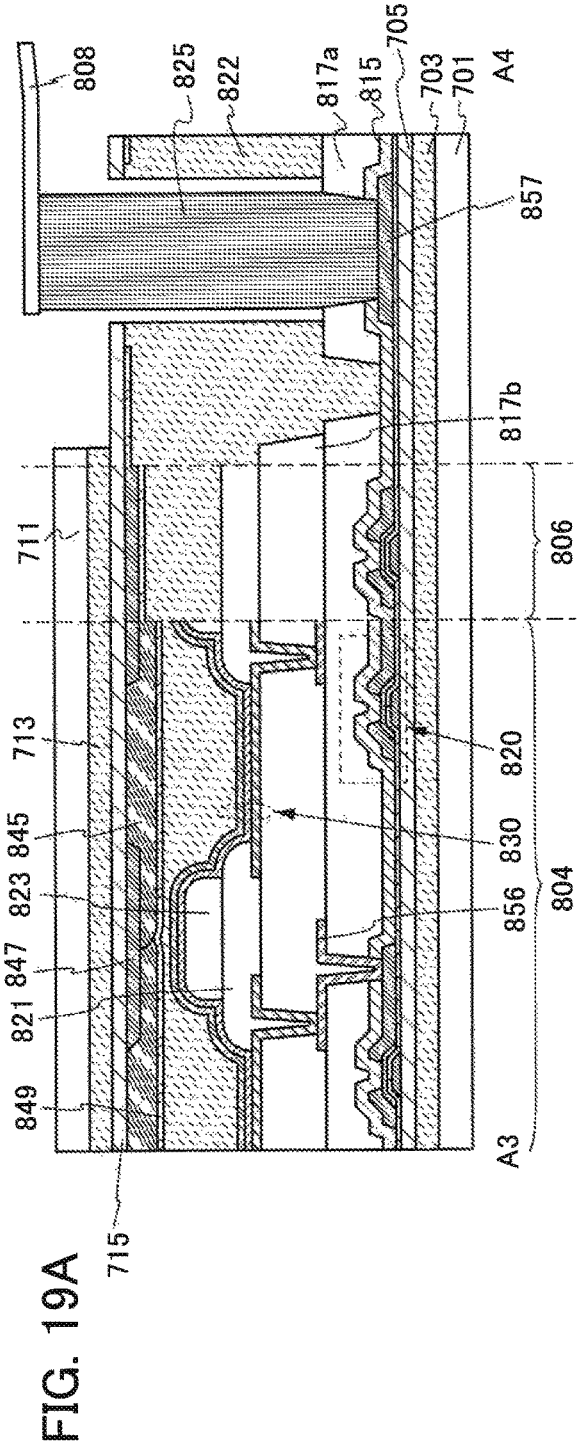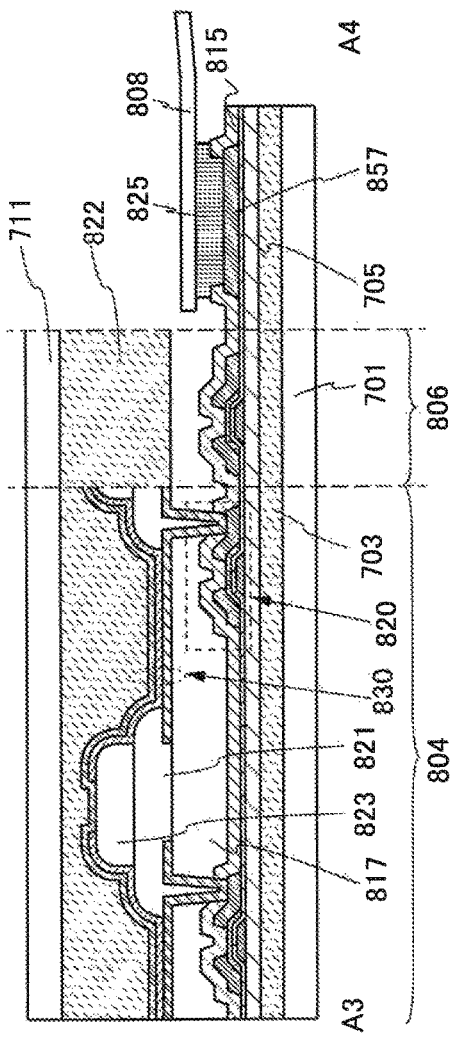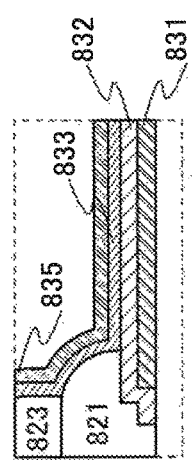

500TP

FIG. 28A1 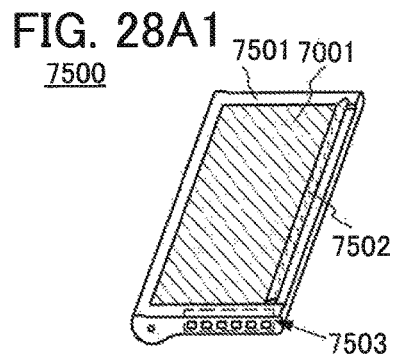

FIG. 28A2 

IMAGE PROCESSING DEVICE, DISPLAY SYSTEM, AND ELECTRONIC DEVICE

CROSS-REFERENCE TO RELATED APPLICATIONS

This application is a continuation of U.S. application Ser. No. 14/945,688, filed Nov. 19, 2015, now allowed, which claims the benefit of a foreign priority application filed in Japan as Serial No. 2014-241476 on Nov. 28, 2014, both of which are incorporated by reference.

TECHNICAL FIELD

One embodiment of the present invention relates to an image processing device, a display system, and an electronic device.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input-output device (e.g., a touch panel), a driving method thereof, and a manufacturing method thereof.

BACKGROUND ART

In recent years, larger display devices have been required. Large display devices can be used for a television device for home use (also referred to as a TV or a television receiver), digital signage, and a public information display (PID), for example. A larger display region of a display device can provide more information at a time. In addition, a larger display region attracts more attention, so that the effectiveness of the advertisement is expected to be increased, for example.

Larger display devices have been also required for application to mobile devices. It has been considered to improve browsability by increasing the area of a display region of the display device to increase the amount of information to be displayed at a time.

Light-emitting elements utilizing electroluminescence (also referred to as EL elements) have features such as ease of thinning and lightening, high-speed response to an input signal, and driving with a direct-current low voltage source; thus, application of the EL elements to display devices has been proposed. For example, Patent Document 1 discloses an example of a display device including an organic EL element.

Patent Document 2 discloses a flexible active matrix light-emitting device in which an organic EL element and a transistor serving as a switching element are provided over a film substrate.

REFERENCE

Patent Document

[Patent Document 1] Japanese Published Patent Application No. 2002-324673
[Patent Document 2] Japanese Published Patent Application No. 2003-174153

DISCLOSURE OF INVENTION

An object of one embodiment of the present invention is to increase the size of a display device. Another object of one embodiment of the present invention is to suppress display unevenness or luminance unevenness of a display device. Another object of one embodiment of the present invention is to reduce the thickness or weight of a display device. Another object of one embodiment of the present invention is to provide a display device capable of displaying an image along a curved surface. Another object of one embodiment of the present invention is to provide a highly browsable display device. Another object of one embodiment of the present invention is to provide a display device including a wide display region in which a joint is hardly recognized.

Another object of one embodiment of the present invention is to provide a novel image processing device, a novel display system, a novel electronic device, or the like. Another object of one embodiment of the present invention is to provide an image processing device in which a joint in a display region composed of a plurality of display panels is hardly recognized.

Note that the descriptions of these objects do not preclude the existence of other objects. In one embodiment of the present invention, there is no need to achieve all the objects. Other objects can be derived from the description of the specification, the drawings, and the claims.

One embodiment of the present invention is an image processing device for supplying an image signal to a display device. The image processing device includes an arithmetic portion. A first image signal and correction data are supplied to the arithmetic portion. The arithmetic portion has a function of correcting the first image signal on the basis of the correction data to produce a second image signal and a function of supplying the second image signal to the display device. The display device includes a first display panel and a second display panel. The first display panel includes a first region having a function of displaying an image. The second display panel includes a second region and a third region. The second region has a function of displaying an image. The third region is adjacent to the second region. The third region has a function of transmitting visible light. The first region includes a first portion overlapping with the third region on a display surface side. The second image signal is a signal in which gray scale corresponding to the first portion is corrected.

One embodiment of the present invention is an image processing device for supplying an image signal to a display device. The image processing device includes an arithmetic portion. A first image signal and correction data are supplied to the arithmetic portion. The arithmetic portion has a function of correcting the first image signal on the basis of the correction data to produce a second image signal and a function of supplying the second image signal to the display device. The display device includes a first display panel and a second display panel. The first display panel includes a first region having a function of displaying an image. The second display panel includes a second region and a third region. The second region has a function of displaying an image. The third region is adjacent to the second region. The third region has a function of transmitting visible light. The first region includes a first portion overlapping with the third region on a display surface side. The second image signal is a signal in which gray scale corresponding to at least part of the first region excluding the first portion or at least part of the second region is corrected.

One embodiment of the present invention is a display system including a display device and an image processing device. The display device includes a first display panel and a second display panel. The first display panel includes a first region having a function of displaying an image. The second display panel includes a second region and a third region. The second region has a function of displaying an image. The third region is adjacent to the second region. The third region has a function of transmitting visible light. The first region includes a first portion overlapping with the third region on a display surface side. The image processing device includes an arithmetic portion. A first image signal and correction data are supplied to the arithmetic portion. The arithmetic portion has a function of correcting the first image signal on the basis of the correction data to produce a second image signal and a function of supplying the second image signal to the display device. The second image signal is a signal in which gray scale corresponding to the first portion is corrected.

One embodiment of the present invention is a display system including a display device and an image processing device. The display device includes a first display panel and a second display panel. The first display panel includes a first region having a function of displaying an image. The second display panel includes a second region and a third region. The second region has a function of displaying an image. The third region is adjacent to the second region. The third region has a function of transmitting visible light. The first region includes a first portion overlapping with the third region on a display surface side. The image processing device includes an arithmetic portion. A first image signal and correction data are supplied to the arithmetic portion. The arithmetic portion has a function of correcting the first image signal on the basis of the correction data to produce a second image signal and a function of supplying the second image signal to the display device. The second image signal is a signal in which gray scale corresponding to at least part of the first region excluding the first portion or at least part of the second region is corrected.

The display system includes a detection device. The detection device may have a function of acquiring luminance data of the display device and a function of supplying the luminance data to the image processing device.

The display device included in the display system may include a light-transmitting layer. The light-transmitting layer preferably has a light transmittance of higher than or equal to 80% on average at a wavelength longer than or equal to 450 nm and shorter than or equal to 700 nm, and has a higher refractive index than the air. The light-transmitting layer is between the first display panel and the second display panel. In addition, the light-transmitting layer is on the display surface side of the first display panel and on the opposite side of a display surface of the second display panel. The first portion has a portion where the first region overlaps with the third region with the light-transmitting layer positioned therebetween.

The display device included in the display system may be flexible. At least one of the display panels included in the display device may be flexible, or all display panels may be flexible, for example.

The image processing device includes a memory portion. The correction data is supplied to the memory portion. The memory portion preferably has a function of supplying the correction data to the arithmetic portion.

The second image signal may be subjected to gamma correction.

One embodiment of the present invention also includes an electronic device or a lighting device including the display system having any of the above structures. For example, one embodiment of the present invention is an electronic device including the display system having any of the above structures, and an antenna, a battery, a housing, a speaker, a microphone, an operation switch, or an operation button.

One embodiment of the present invention can increase the size of a display device. One embodiment of the present invention can suppress display unevenness or luminance unevenness of a display device. One embodiment of the present invention can reduce the thickness or weight of a display device. One embodiment of the present invention can provide a display device capable of displaying an image along a curved surface. One embodiment of the present invention can provide a highly browsable display device. One embodiment of the present invention can provide a display device including a wide display region in which a joint is hardly recognized.

One embodiment of the present invention can provide a novel image processing device, a novel display system, a novel electronic device, or the like. One embodiment of the present invention can provide an image processing device in which a joint in a display region composed of a plurality of display panels is hardly recognized.

Note that the description of these effects does not preclude the existence of other effects. One embodiment of the present invention does not necessarily have all the effects listed above. Other effects can be derived from the description of the specification, the drawings, and the claims.

BRIEF DESCRIPTION OF DRAWINGS

FIG. 4 illustrates an example of a display system.
FIGS. 8A and 8B each illustrate an example of a display device.
FIGS. 11A to 11C each illustrate an example of a display device.
FIGS. 17A to 17C illustrate examples of a light-emitting panel.
FIGS. 19A to 19C each illustrate an example of a light-emitting panel.

FIGS. 28A1, 28A2, and 28B to 28I illustrate examples of electronic devices.

BEST MODE FOR CARRYING OUT THE INVENTION

Figure 1A:
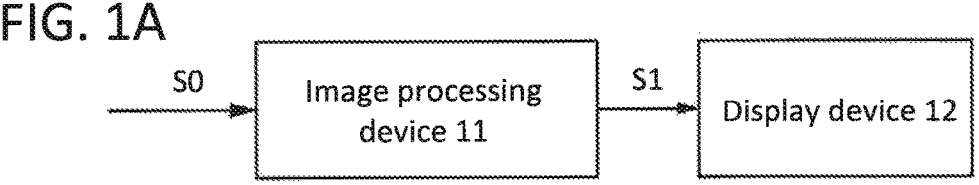
FIGS. 1A to 1D illustrate examples of a display system and an image processing device.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Furthermore, the same hatching pattern is applied to portions having similar functions, and the portions are not denoted by particular reference numerals in some cases.

In addition, the position, size, range, or the like of each structure illustrated in drawings is not accurately represented in some cases for easy understanding. Therefore, the disclosed invention is not necessarily limited to the position, the size, the range, or the like disclosed in the drawings.

Note that the terms "film" and "layer" can be interchanged with each other depending on the case or circumstances. For example, the term "conductive layer" can be changed into the term "conductive film" in some cases, and the term "insulating film" can be changed into the term "insulating layer" in some cases.

Note that in this specification, examples of the case where X and Y are electrically connected include the case where X and Y are directly connected without another element interposed therebetween and the case where one or more elements that enable electrical connection between X and Y (e.g., a switch, a transistor, a capacitor, an inductor, a resistor, a diode, a display element, a light-emitting element, or a load) are connected between X and Y. A switch is controlled to be on or off. That is, a switch is conducting or not conducting (is turned on or off) to determine whether current flows therethrough or not. Alternatively, the switch has a function of selecting and changing a current path.

Embodiment 1

In this embodiment, an image processing device of one embodiment of the present invention and a display system of one embodiment of the present invention will be described with reference to drawings.

When a plurality of display panels are arranged in one or more directions (e.g., in one column or in matrix), a display device with a large display region can be manufactured.

In the case where a large display device is manufactured using a plurality of display panels, each of the display panels is not required to be large. Thus, an apparatus for manufacturing the display panel does not need to be increased in size, whereby space-saving can be achieved. Furthermore, since an apparatus for manufacturing small- and medium-sized display panels can be used and a novel apparatus for manufacturing large display devices is unnecessary, manufacturing cost can be reduced. In addition, a decrease in yield caused by an increase in the size of a display panel can be suppressed.

A display device including a plurality of display panels has a larger display region than a display device including one display panel when the display panels have the same size, and has an effect of displaying more information at a time, for example.

However, in the case where output images of the plurality of display panels are displayed as one image, a user of the display device sees the image as divided because each of the display panels has a non-display region that surrounds a display region.

Making the non-display regions of the display panels small (using display panels with narrow frames) can prevent an image on the display panels from appearing divided; however, it is difficult to totally remove the non-display region of the display panel.

A small non-display region of the display panel leads to a decrease in the distance between an edge of the display panel and an element in the display panel, in which case the element easily deteriorates by impurities entering from outside the display panel in some cases.

Thus, in one embodiment of the present invention, a plurality of display panels are arranged to partly overlap with one another. In two display panels overlapping with each other, at least a display panel positioned on the display surface side (upper side) includes a region that transmits visible light and a display region adjacent to each other. In one embodiment of the present invention, a display region of a display panel positioned on a lower side and the region that transmits visible light of the display panel on the upper side overlap with each other. Thus, a non-display region that appears between the display regions of the two display panels overlapping with each other can be reduced or even removed. Accordingly, a large display device in which a joint between display panels is hardly recognized by a user can be obtained.

At least part of a non-display region of the display panel on the upper side transmits visible light, and can overlap with the display region of the display panel on the lower side. Furthermore, at least part of a non-display region of the display panel on the lower side can overlap with the display region of the display panel on the upper side or a region that blocks visible light thereof. It is not necessary to reduce the areas of the non-display regions because a reduction in the area of the frame of the display device (a reduction in area except a display region) is not affected by these regions.

A large non-display region of the display panel leads to an increase in the distance between the edge of the display panel and an element in the display panel, in which case the deterioration of the element due to impurities entering from outside the display panel can be suppressed. For example, in the case where an organic EL element is used as a display element, impurities such as moisture or oxygen are less likely to enter (or less likely to reach) the organic EL element from outside the display panel as the distance between the edge of the display panel and the organic EL element increases. Since a sufficient area of the non-display region of the display panel can be secured in the display device of one embodiment of the present invention, a highly reliable large display device can be fabricated even when a display panel including an organic EL element or the like is used.

However, the region that transmits visible light reflects or absorbs not a little visible light (e.g., light at a wavelength longer than or equal to 450 nm and shorter than or equal to 700 nm). Thus, the luminance (brightness) of a display on the display panel on the lower side might be different between a portion seen through the region that transmits visible light and a portion seen not through the region.

In view of the above, in one embodiment of the present invention, image processing is performed to correct the gray scale, which is included in image data, at the coordinates corresponding to at least one of the portion seen through the region that transmits visible light in the display region and the portion seen not through the region. As a result, a difference in luminance between the portion seen through the region that transmits visible light and the portion seen not through the region can be suppressed.

FIG. 1A illustrates the image processing device of one embodiment of the present invention.

A first image signal S0 is supplied to an image processing device 11. The image processing device 11 supplies a second image signal S1 to a display device 12.

The first image signal S0 and the second image signal S1 each include image data (e.g., coordinate data and gray scale data) or a synchronization signal (e.g., a start pulse signal and a clock signal).

Figure 1B:
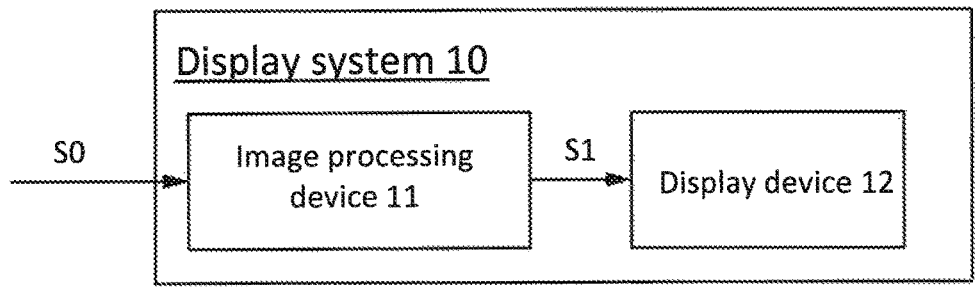

FIG. 1B illustrates the display system of one embodiment of the present invention.

A display system 10 includes the image processing device 11 and the display device 12.

The first image signal S0 is supplied from outside the display system 10 to the image processing device 11. The image processing device 11 supplies the second image signal S1 to the display device 12.

Figure 1C:
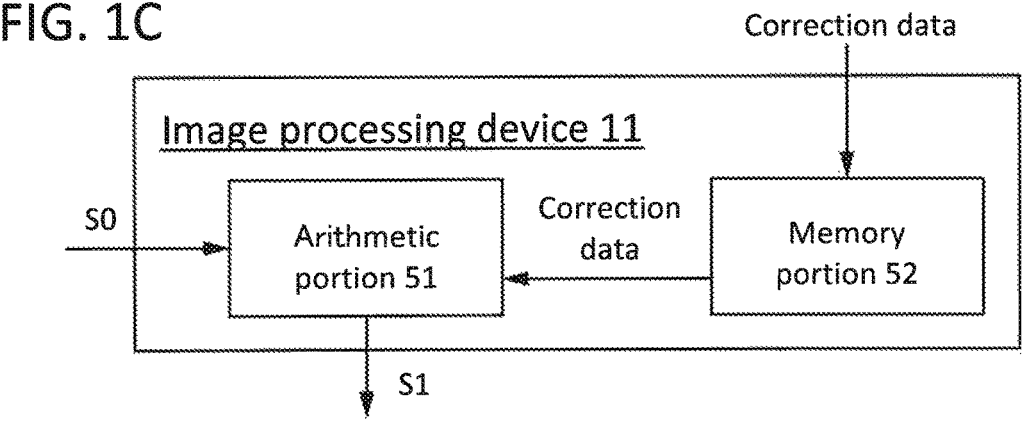

FIG. 1C illustrates a structure example of the image processing device 11.

The image processing device 11 includes an arithmetic portion 51 and a memory portion 52.

The first image signal S0 and correction data are supplied to the arithmetic portion 51. The arithmetic portion 51 corrects the first image signal S0 on the basis of the correction data to produce the second image signal S1. The arithmetic portion 51 can supply the second image signal S1 to the display device or the like. Note that in this specification, correction data is electrical data.

The arithmetic portion 51 includes, for example, a central processing unit (CPU) and an arithmetic circuit for image processing.

The correction data is supplied to the memory portion 52. The memory portion 52 supplies the correction data to the arithmetic portion 51.

Examples of the correction data supplied to the image processing device 11 include data acquired in advance by a camera, a luminance meter, a sensor (e.g., an illuminance sensor or a color temperature sensor), an optical inspection system of the display device, or the like, or by calculation. A measurement result of the light transmittance (e.g., light transmittance of material itself (internal transmittance) or light transmittance including surface reflection and back reflection (external transmittance)), light reflectance, light absorptance, or the like of a region that transmits visible light and overlaps with a display region of a display panel can also be used as the correction data. Alternatively, data of each display panel included in the display device, such as luminance, gray scale, brightness, or chromaticity, may be used as the correction data. Since an image taken by a camera or the like might have a distortion, a distortion-corrected image or an analysis result of the distortion-corrected image is preferably used as the correction data. The image processing device 11 may have a function of correcting a distortion of a supplied image or a function of analyzing a supplied image to generate correction data.

The memory portion 52 includes, for example, a memory circuit that stores a computer program for the arithmetic portion 51 to perform arithmetic processing, a look-up table, correction data calculated by the arithmetic portion 51, the correction data supplied to the image processing device 11, or the like.

Although FIG. 1C illustrates an example where the correction data is supplied from outside the image processing device 11, one embodiment of the present invention is not limited thereto. Examples of the correction data include data supplied from outside the display system 10 or outside the image processing device 11 and data generated in the display system 10 or in the image processing device 11.

The image processing device 11 may generate correction data, for example. Alternatively, it may be possible that the arithmetic portion 51 generates correction data and supplies the correction data to the memory portion 52.

Figure 1D:
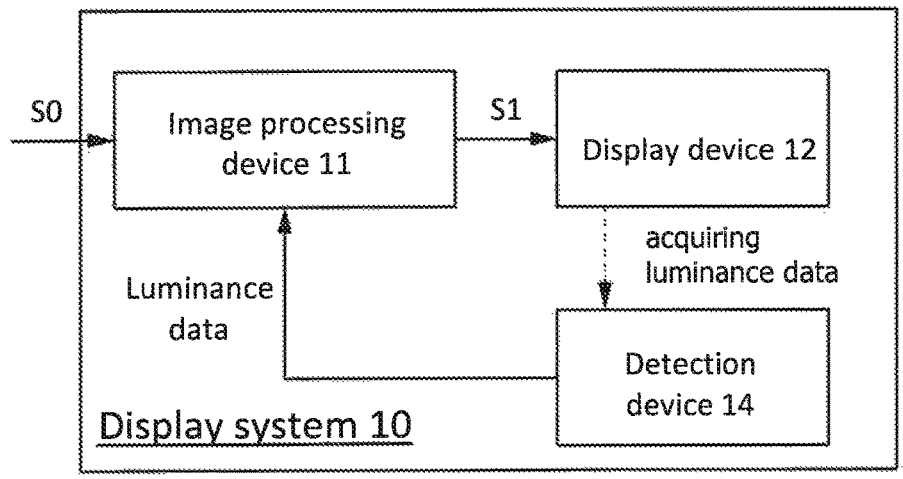

FIG. 1D illustrates another display system of one embodiment of the present invention.

The display system 10 includes the image processing device 11, the display device 12, and a detection device 14.

The detection device 14 can acquire, for example, data of the display device 12, such as luminance, gray scale, brightness, or chromaticity. Alternatively, the detection device 14 can acquire data (e.g., illuminance or color temperature) on the ambient environment of the display device 12 or the display system 10. The detection device 14 may include, for example, a camera, a video camera, a luminance meter, a sensor (e.g., an illuminance sensor or a color temperature sensor), or an optical inspection system of the display device. The detection device 14 can supply such data (e.g., luminance data) as electrical data to the image processing device 11.

The display system 10 may include a plurality of kinds of detection devices and acquire a plurality of kinds of data from which correction data is generated that can be used for image processing.

The detection device 14 acquires luminance data of the display device 12 while the display device 12 displays an image, for example, in which case the detection device 14 supplies the luminance data to the image processing device 11. Alternatively, the detection device 14 may acquire the luminance data of the display device 12 while the display device 12 displays white on the entire display surface, for example. Further alternatively, the detection device 14 may acquire a plurality of kinds of luminance data in the following manner, for example: the detection device 14 acquires corresponding luminance data of the display device 12 while the display device 12 displays each red, blue, and green on the entire display surface.

The luminance data may be supplied from the detection device 14 to the memory portion 52 included in the image processing device 11 and then may be supplied from the memory portion 52 to the arithmetic portion 51. Alternatively, the luminance data may be supplied from the detection device 14 directly to the arithmetic portion 51.

The arithmetic portion 51 performs an arithmetic operation using the supplied luminance data to generate correction data. The arithmetic portion 51 supplies the generated correction data to the memory portion 52.

After the correction data is supplied to the memory portion 52, the display device 12 can display an image corrected using the correction data. Specifically, the arithmetic portion 51 is supplied with the first image signal S0 from the outside and the correction data from the memory portion 52. The arithmetic portion 51 corrects the first image signal S0 using the correction data to produce the second image signal S1. The arithmetic portion 51 supplies the second image signal 51 to the display device 12. Accordingly, the display device 12 can display a corrected image.

Figure 2:
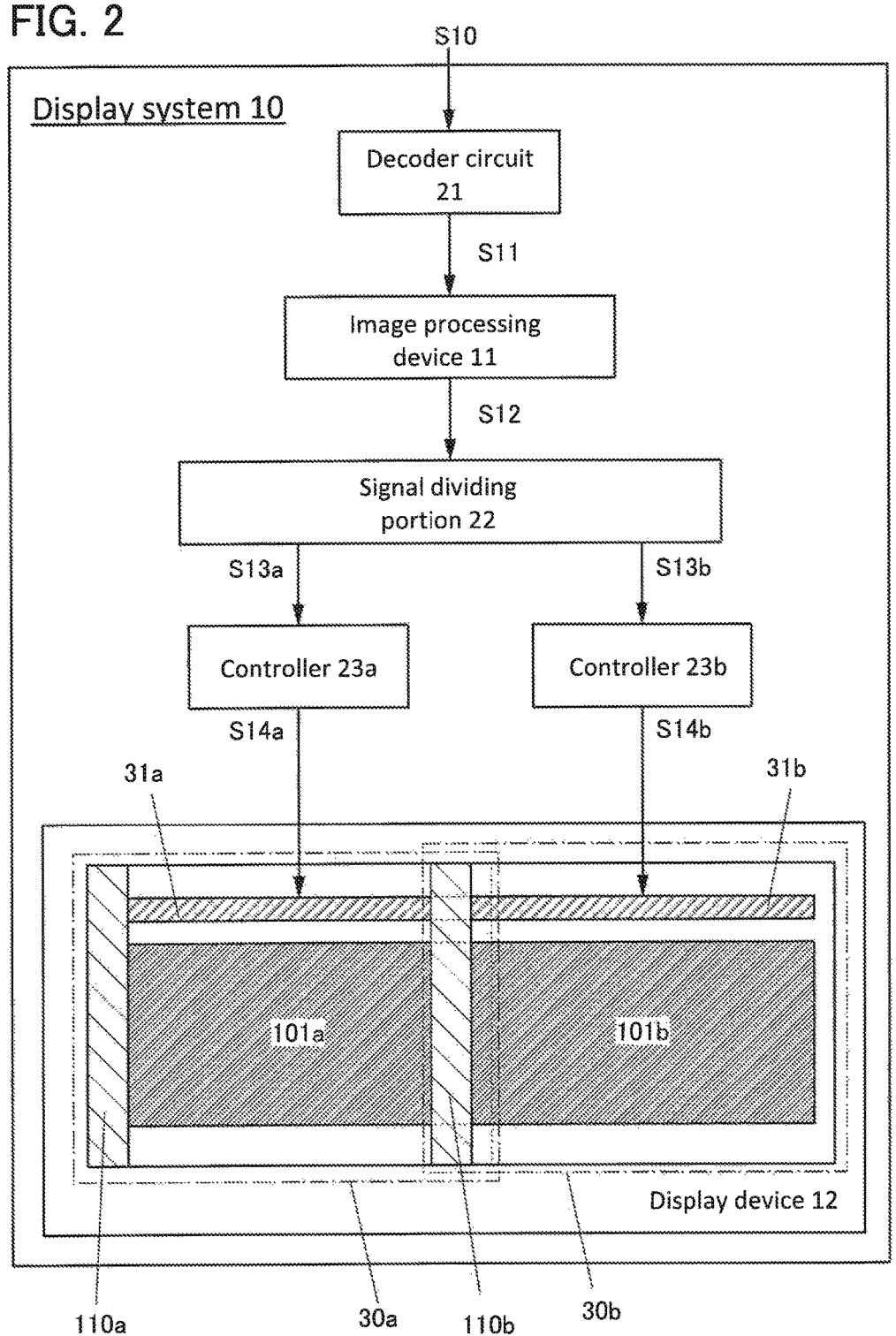
FIG. 2 illustrates an example of a display system.
Figure 3:
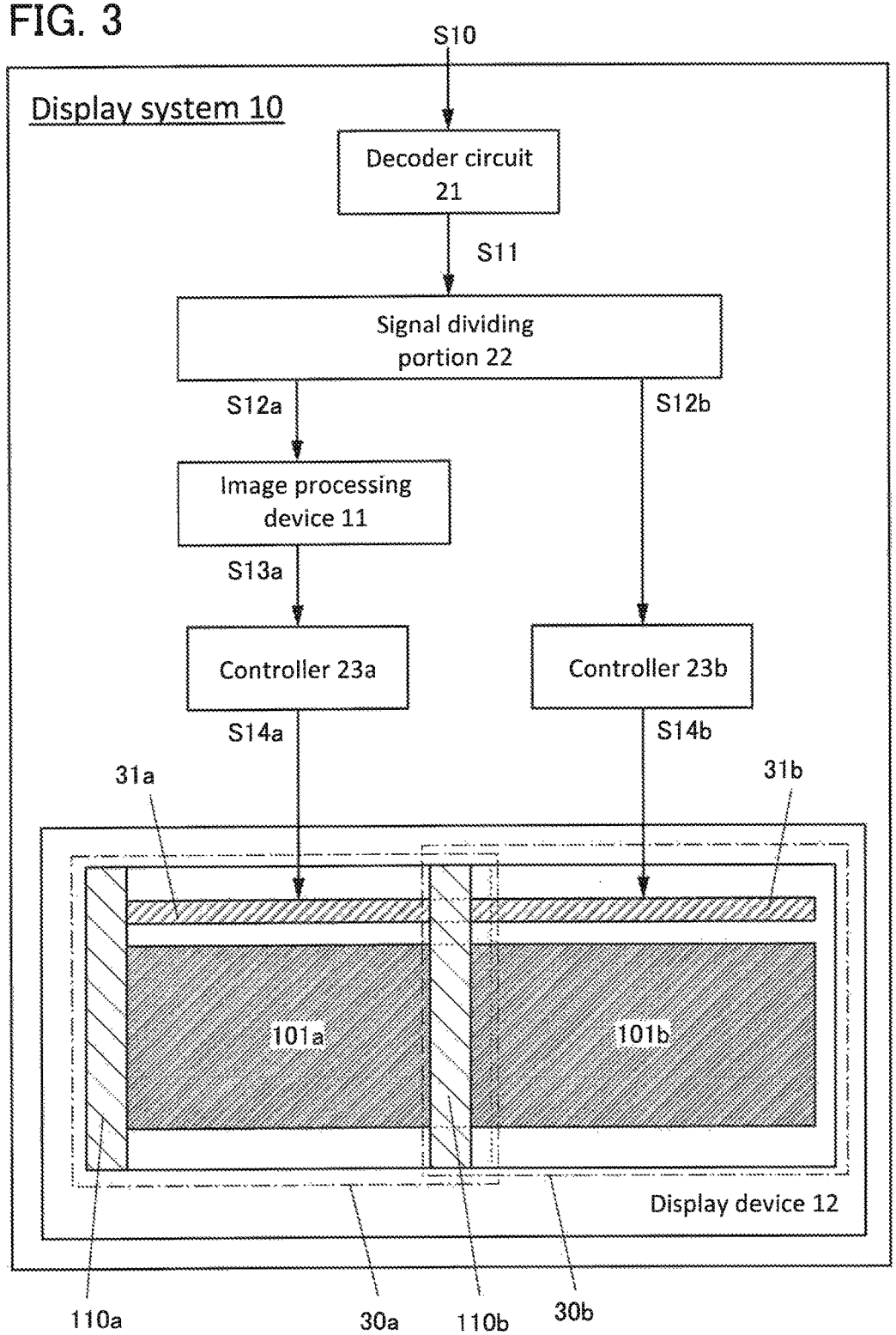
FIG. 3 illustrates an example of a display system.

FIG. 2 to FIG. 4 each illustrate a structure example of the display system 10.

The display systems 10 illustrated in FIG. 2 to FIG. 4 each include a decoder circuit 21, the image processing device 11, a signal dividing portion 22, a controller 23a, a controller 23b, and the display device 12.

The display device 12 includes a plurality of display panels arranged in one or more directions. FIG. 2 illustrates an example of including two display panels (a display panel 30a and a display panel 30b). Note that the description given later can be referred to for the details of the display device 12.

In this embodiment, to distinguish the display panels from each other, the same components included in the display panels from each other, or the same components relating to the display panels from each other, letters are added to reference numerals. Unless otherwise specified, "a" is added to reference numerals for a display panel and components placed on the lowest side (the side opposite to the display surface side), and to one or more display panels and components placed thereover, "b", "c", and the like are added in alphabetical order from the lower side.

The display panel 30a includes a display region 101a and a driver circuit 31a. The display panel 30a may include a region 110a that transmits visible light.

The display panel 30b includes a display region 101b, a driver circuit 31b, and a region 110b that transmits visible light.

The display region 101a of the display panel 30a has a portion overlapping with the region 110b that transmits visible light of the display panel 30b. In the display region 101a, there might be a difference in recognized luminance between the portion overlapping with the region 110b that transmits visible light and a portion not overlapping with the region 110b. Thus, the image processing device 11 corrects the gray scale, which is included in image data, at the coordinates corresponding to at least one of the portion overlapping with the region 110b that transmits visible light and the portion not overlapping with the region 110b. As a result, luminance unevenness can be reduced throughout the display region 101a.

The gray scale of image data can be corrected in the following manner, for example: as correction data, luminance in the case where the display region 101a overlaps with the region 110b that transmits visible light and luminance in the case where the display region 101a does not overlap with the region 110b are acquired in advance, or are measured with a detection device, and the gray scale is corrected on the basis of the correction data.

Note that in the case of correcting the gray scale, which is included in image data, at the coordinates corresponding to the portion not overlapping with the region 110b that transmits visible light in the display region 101a, it is preferable to correct the gray scale at the coordinates corresponding to the display region 101b as well. Accordingly, luminance unevenness can be reduced throughout the display device 12.

A compressed or encoded image signal S10 is supplied to the decoder circuit 21. The decoder circuit 21 converts, decompresses, or reconstructs (decodes) the image signal S10 to produce an image signal S11.

In the case where the image signal S10 supplied to the display system 10 is not a compressed or encoded signal but a signal the image processing device 11 can deal with, the decoder circuit 21 does not need to be provided and the image signal S10 may be supplied directly to the image processing device 11 or the like.

In FIG. 2, the decoder circuit 21 supplies the image signal S11 to the image processing device 11.

The image processing device 11 corrects the supplied image signal on the basis of the correction data to produce another image signal.

In FIG. 2, the image signal S11 is supplied to the image processing device 11. Then, the image processing device 11 corrects the image signal S11 on the basis of the correction data to produce an image signal S12. After that, the image processing device 11 supplies the image signal S12 to the signal dividing portion 22.

The signal dividing portion 22 divides the supplied image signal. In the signal dividing portion 22, the supplied image signal is divided into the number of display panels included in the display device 12. In FIG. 2, for example, since the display device 12 includes two display panels, the supplied image signal S12 is divided into two signals: an image signal S13a and an image signal S13b.

The controller 23a supplies an image signal S14a based on the supplied image signal S13a to the driver circuit 31a.

Similarly, the controller 23b supplies an image signal S14b based on the supplied image signal S13b to the driver circuit 31b.

In the case where signals output from the signal dividing portion 22 are digital signals, for example, the controller 23a and the controller 23b preferably have functions of converting the digital signals into analog signals used for driving the display panel 30a and the display panel 30b. If the driver circuit 31a and the driver circuit 31b function as, or the signal dividing portion 22 functions as the controller 23a and the controller 23b, the controller 23a and the controller 23b are unnecessary.

The driver circuit 31a drives pixels in the display region 101a, so that an image can be displayed on the display region 101a. Similarly, the driver circuit 31b drives pixels in the display region 101b, so that an image can be displayed on the display region 101b.

The display panel may include a driver circuit functioning as a gate driver circuit. For example, the driver circuit 31a and the driver circuit 31b each preferably function as a gate driver circuit. Alternatively, the display device may be manufactured using a module including the display panel and an integrated circuit (IC) functioning as a gate driver circuit, without providing a gate driver circuit in the display panel. The IC can be mounted on a substrate by a chip on glass (COG) method or a chip on film (COF) method. A flexible print circuit (hereinafter FPC), a tape automated bonding (TAB) tape, a tape carrier package (TCP), or the like on which the IC is mounted may alternatively be used as the module.

Similarly, the display panel may include a driver circuit functioning as a source driver circuit. Alternatively, the display device may be manufactured using a module including the display panel and an IC functioning as a source driver circuit, without providing a source driver circuit in the display panel.

As illustrated in FIG. 3 and FIG. 4, the decoder circuit 21 may supply the image signal S11 to the signal dividing portion 22.

As illustrated in FIG. 3, at least one of a plurality of image signals which are produced as a result of division by the signal dividing portion 22 is supplied to the image processing device 11.

In FIG. 3, an image signal S12a is supplied from the signal dividing portion 22 to the image processing device 11. The image processing device 11 corrects the image signal S12a on the basis of the correction data to produce the image signal S13a. The image processing device 11 supplies the image signal S13a to the controller 23a.

In addition, an image signal S12b is supplied from the signal dividing portion 22 to the controller 23b.

Alternatively, all of the plurality of image signals which are produced as a result of division by the signal dividing portion 22 may be supplied to the image processing device 11 as illustrated in FIG. 4.

In FIG. 4, the image signal S12a and the image signal S12b are supplied from the signal dividing portion 22 to the image processing device 11. The image processing device 11 corrects the image signal S12a and the image signal S12b on the basis of the correction data to produce the image signal S13a and the image signal S13b. The image processing device 11 supplies the image signal S13a to the controller 23a and the image signal S13b to the controller 23b.

Next, examples of the correction made by the image processing device 11 will be described with reference to FIGS. 5A to 5F.

In FIGS. 5A to 5F, an input value input, which is a luminance value of image data included in the image signal, input to the display device 12 is represented by x ($0 \leq x \leq 1$), and an output value output, which is a luminance value, output from the display device 12 is represented by y ($0 \leq y \leq 1$). Note that the larger the output value y is, the brighter the screen is (the higher the luminance is). The input value x and the output value y can each be converted into a gray scale value; in the case of 256 gray scales, for example, the input value can be x ($0 \leq x \leq 255$) and the output value can be y ($0 \leq y \leq 255$). Note that when the input value x is the luminance value, the value may be the one that has already been subjected to gamma correction or the like (in which case the value can be expressed by $x = x_0^{\gamma_0}$).

Assume that a relationship between the input value x and the output value y (also referred to as input-output characteristics) of the portion not overlapping with the region 110b that transmits visible light in the display region 101a of the display panel 30a is expressed by y=x. Meanwhile, assume that input-output characteristics of the portion overlapping with the region 110b that transmits visible light in the display region 101a of the display panel 30a is expressed by $y=a_0 x$ ($0<a_0<1$). This means that, in the display region 101a, luminance is lower in the portion overlapping with the region 110b that transmits visible light than in the portion not overlapping with the region 110b that transmits visible light. In that case, luminance unevenness occurs throughout the display panel 30a. Note that $a_0$ is dependent on the optical characteristics of the region 110b that transmits visible light.

In view of the above, in one embodiment of the present invention, luminance (or gray scale) of the portion overlapping with the region 110b that transmits visible light and that of the portion not overlapping with the region 110b are corrected such that their input-output characteristics become the same or slightly different from each other to prevent luminance unevenness throughout the display panel 30a.

Figure 5A:
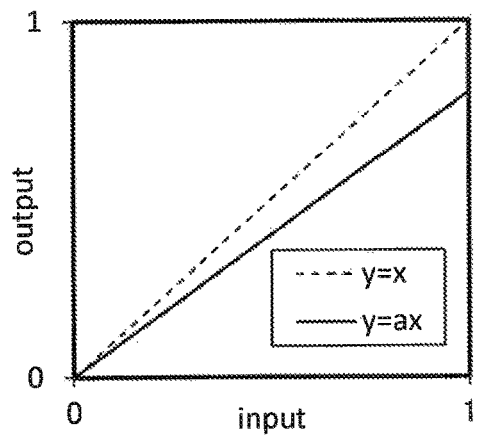
FIGS. 5A to 5F each show a relationship between an input value and an output value.

For example, the input-output characteristics of the portion not overlapping with the region 110b that transmits visible light in the display region 101a are corrected so as to satisfy y=ax ($0<a<1$), as shown in FIG. 5A. Specifically, the image processing device 11 produces the second image signal S1 including gray scale data, which is obtained by correcting gray scale data included in the first image signal S0 using such a correction formula, and outputs the second image signal S1 to the display device 12. By such correction, luminance unevenness throughout the display device 12 can be suppressed. Note that a can be calculated using at least one of the luminance data of the display device 12; the light transmittance, light reflectance, and light absorptance of the region 110b that transmits visible light; and the like.

Note that the correction may be made for all sub-pixels (e.g., a red (R) pixel, a green (G) pixel, and a blue (B) pixel) included in one pixel at the same degree (using the same value of a), or may be performed at different degrees (e.g., using $a_R$, $a_G$, and $a_B$) for each sub-pixel. For example, if the luminance data of the display device 12 is acquired by the detection device 14 in each case where red, blue, and green are displayed, the average luminance may be calculated for each case to determine $a_R$, $a_G$, and $a_B$ such that the luminance of each sub-pixel becomes the average luminance.

In the case where a corrected image signal is supplied to both the display panel 30a and the display panel 30b as illustrated in FIG. 2 and FIG. 4, the luminance at the coordinates corresponding to at least one of the display region 101b and the portion not overlapping with the region 110b that transmits visible light in the display region 101a can be corrected, for example.

The input-output characteristics of the display region 101b, as well as those of the portion not overlapping with the region 110b that transmits visible light in the display region 101a, are corrected so as to satisfy y=ax ($0<a<1$) as shown in FIG. 5A, for example, whereby luminance unevenness throughout the display device 12 can be suppressed.

In the case where a corrected image signal is supplied only to the display panel 30a as illustrated in FIG. 3, the luminance, which is included in image data, at the coordinates corresponding to the portion overlapping with the region 110b that transmits visible light in the display region 101a can be corrected, for example.

Figure 5B:
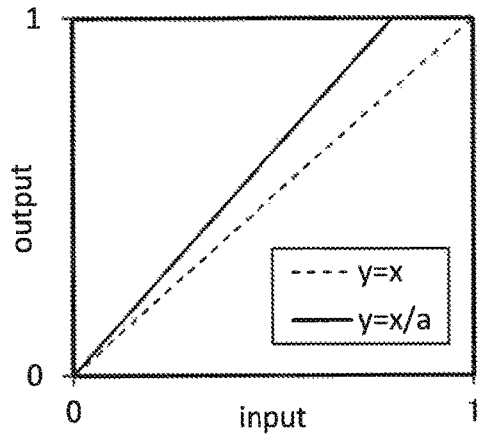

The input-output characteristics of the portion overlapping with the region 110b that transmits visible light in the display region 101a are corrected so as to satisfy y=x/a ($0<a<1$) as shown in FIG. 5B, for example, whereby luminance unevenness throughout the display device 12 can be suppressed.

Figure 5C:
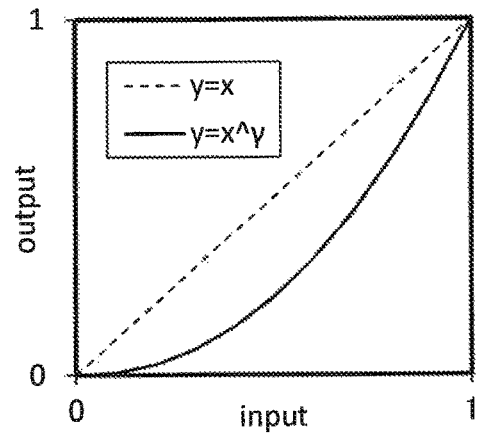

Note that the input value x and the output value y of the display device are not always proportional to each other. It is generally known that the input-output characteristics of a display device can be approximated by the formula $y=x^\gamma$ as shown in FIG. 5C.

Figure 5D:
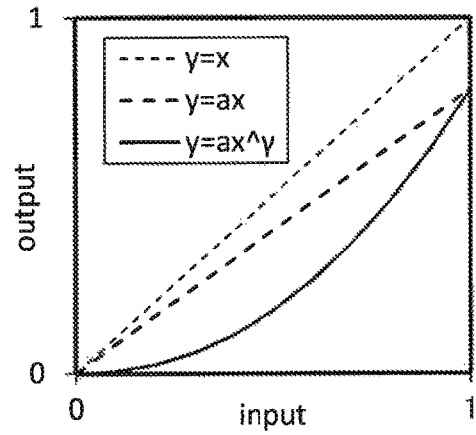

In such a case, the input-output characteristics of the portion not overlapping with the region 110b that transmits visible light in the display region 101a and those of the display region 101b are corrected so as to satisfy $y=ax^\gamma$ ($0<a<1$) as shown in FIG. 5D, for example, whereby luminance unevenness throughout the display device 12 can be suppressed.

In one embodiment of the present invention, the image signal may be subjected to gamma correction in addition to the correction based on the value a.

Figure 5E:
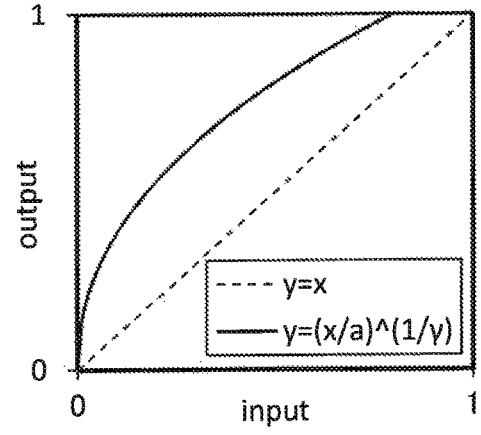
Figure 5F:
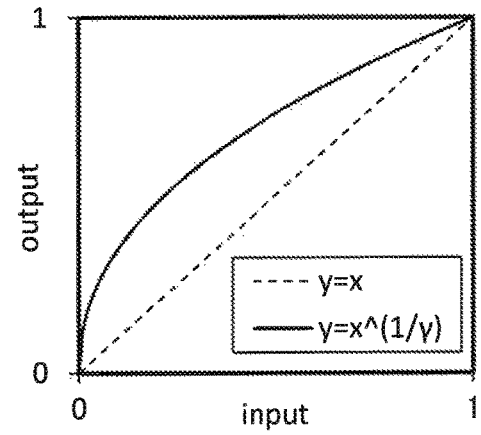

Specifically, the input-output characteristics of the portion overlapping with the region 110b that transmits visible light in the display region 101a are corrected so as to satisfy $y=(x/a)^{(1/\gamma)}$ ($0<a<1$) as shown in FIG. 5E. In addition, the input-output characteristics of the portion not overlapping with the region 110b that transmits visible light in the display region 101a and those of the display region 101b are corrected so as to satisfy $y=x^{(1/\gamma)}$ as shown in FIG. 5F. Accordingly, luminance unevenness throughout the display device 12 can be suppressed, and an image faithful to the image signal supplied to the display system 10 can be displayed.

The image processing device 11 may have, as the correction data, pattern data including the correction formula for the input-output characteristics, coordinate data of the display panel, and data for determining whether to correct for each coordinates. The pattern data may include a plurality of correction formulae for the input-output characteristics, in which case the pattern data preferably includes data for determining whether to correct for each coordinates and data for determining which correction formula to be used to correct for each coordinates. Specific examples will be described with reference to FIGS. 6A and 6B and FIGS. 7A to 7D.

Figure 6A:
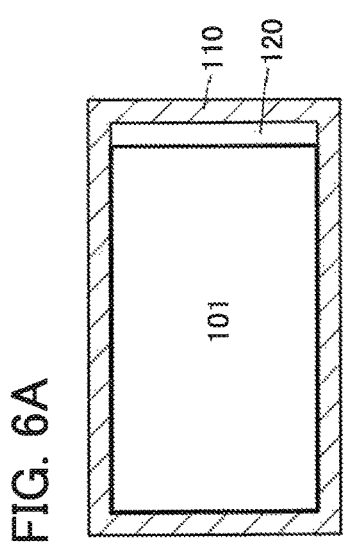
FIGS. 6A and 6B illustrate examples of a display panel and a display device.
Figure 6B:
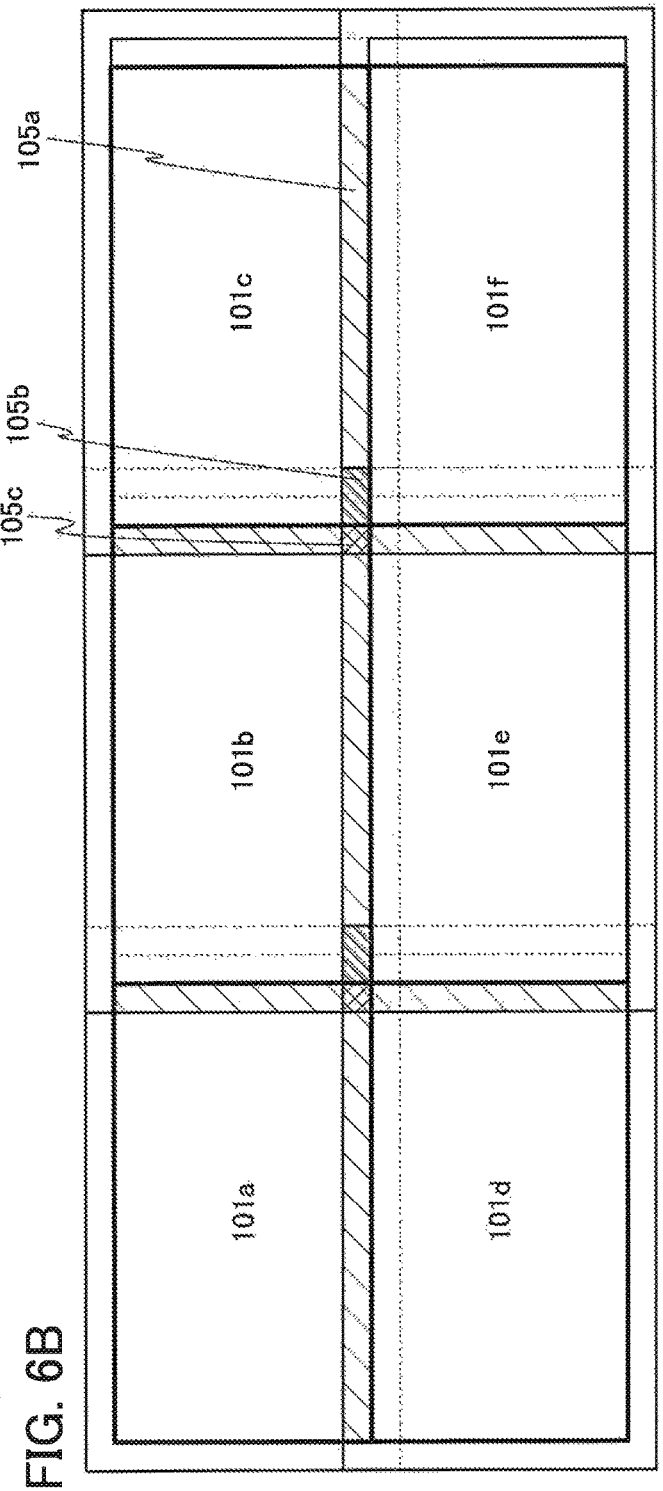

A display panel illustrated in FIG. 6A includes a display region 101, a region 120 that blocks visible light, and a region 110 that transmits visible light. FIG. 6B illustrates a display device in which six display panels illustrated in FIG. 6A are stacked.

The display region 101a of the lowest display panel (upper left display panel) in FIG. 6B has a region 105a overlapping with one region 110 that transmits visible light of another display panel, and a region 105c overlapping with three regions 110 of other display panels.

The display region 101b has the region 105a overlapping with one region 110 that transmits visible light of another display panel, a region 105b overlapping with two regions 110 of other display panels, and the region 105c overlapping with three regions 110 of other display panels.

A display region 101c has the region 105a overlapping with one region 110 that transmits visible light of another display panel and the region 105b overlapping with two regions 110 of other display panels.

A display region 101d and a display region 101e each have the region 105a overlapping with one region 110 that transmits visible light of another display panel.

A display region 101f does not have a region overlapping with the region 110 that transmits visible light.

FIGS. 7A to 7D illustrate examples of the pattern data of such a display device. Described here is an example where the gray scale of the portion overlapping with the region 110 that transmits visible light in the display region 101 is corrected. Note that an example where a in the above correction formula is determined using only a value at, which is for the case of overlapping of one region 110 that transmits visible light of another display panel, for correction is described here for easy understanding; however, values used for the case of overlapping of two or more regions 110 (a2 in the case of two regions 110 and a3 in the case of three regions 110, for example) may be measured or calculated to be used for correction.

Figure 7A:
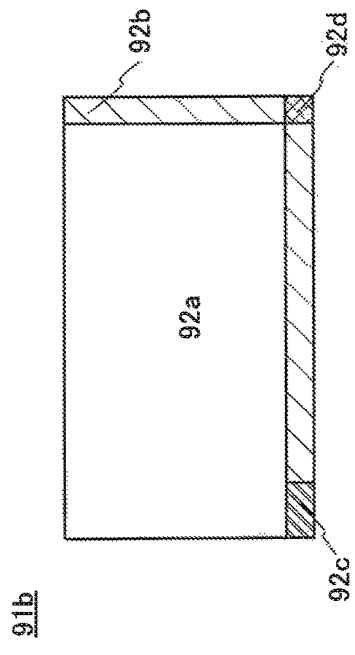
FIGS. 7A to 7D each illustrate an example of pattern data.

FIG. 7A illustrates pattern data for the display region 101a. Corrections can be made as follows, for example: correction is not made at coordinates in a region 92a illustrated in FIG. 7A, correction using $a=a_1$ is made at coordinates in a region 92b, and correction using $a=(a_1)^3$ is made at coordinates in a region 92d.

Figure 7B:
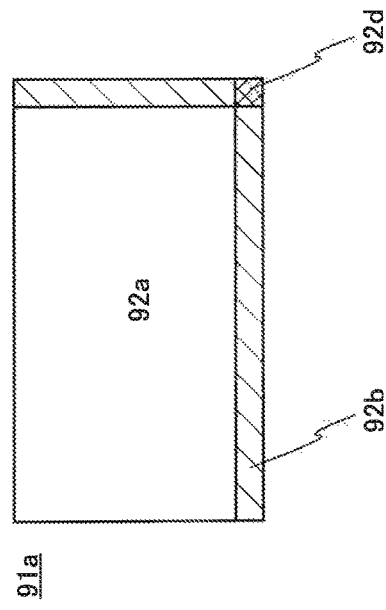

FIG. 7B illustrates pattern data for the display region 101b. Corrections can be made as follows, for example: correction is not made at coordinates in the region 92a illustrated in FIG. 7B, correction using $a=a_1$ is made at coordinates in the region 92b, correction using $a=(a_1)^2$ is made at coordinates in a region 92c, and correction using $a=(a_1)^3$ is made at coordinates in the region 92d.

Figure 7C:
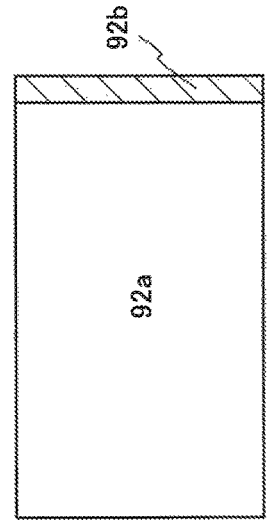

FIG. 7C illustrates pattern data for the display region 101c. Corrections can be made as follows, for example: correction is not made at coordinates in the region 92a illustrated in FIG. 7C, correction using $a=a_1$ is made at coordinates in the region 92b, and correction using $a=(a_1)^2$ is made at coordinates in the region 92c.

Figure 7D:
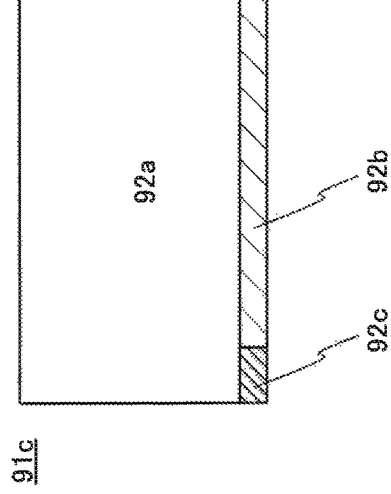

FIG. 7D illustrates pattern data for the display region 101d and the display region 101e. Corrections can be made as follows, for example: correction is not made at coordinates in the region 92a illustrated in FIG. 7D and correction using $a=a_1$ is made at coordinates in the region 92b.

As described above, coordinate data of the display panels and pattern data including the value a corresponding to each coordinates which are based on the shapes of the display panels or an overlapping with pattern may be acquired and stored in the image processing device 11 in advance.

Note that the correction made by the image processing device 11 is not limited to the above. For example, sharpening such as unsharp masking, noise removal, contrast enhancement, or edge enhancement may be performed.

The correction by the image processing device 11 is not limited to correction of a difference in luminance of the display region 101a between the portion overlapping with the region 110b that transmits visible light and the portion not overlapping with the region 110b; the image processing device 11 may correct a difference in luminance, chromaticity, or the like throughout one display panel or between a plurality of display panels. The correction can be made on the basis of data on the characteristics or the ambient environment of the display device 12, for example.

In the case where the display panels are displaced as illustrated in FIG. 8A, anti-aliasing is preferably performed to make the outline of the portion overlapping with the region 110 that transmits visible light in the display region 101 faint. Alternatively, pattern data in the case where the display panels are displaced may be acquired and supplied to the image processing device 11.

The display system of one embodiment of the present invention may include flexible display devices. In that case, luminance data is acquired at the time when an image is displayed while the display devices are curved as illustrated in FIG. 8B, which is preferable because correction in the image processing device can be made more accurately.

In one embodiment of the present invention, at least part of the display device may have flexibility. Alternatively, at least part of the display panel may have flexibility. The display system of one embodiment of the present invention preferably includes a flexible display panel. Accordingly, a large curved display system or a flexible display system can be fabricated, leading to an increase in use. In that case, an organic EL element can be favorably used as a display element.

The display device or the display system preferably has high resolution such as FHD (1920×1080), 4K2K (e.g., 3840×2048 or 4096×2180), or 8K4K (e.g., 7680×4320 or 8192×4320).

Specific examples of the display device 12 will be described below with reference to drawings.

Figure 9A:
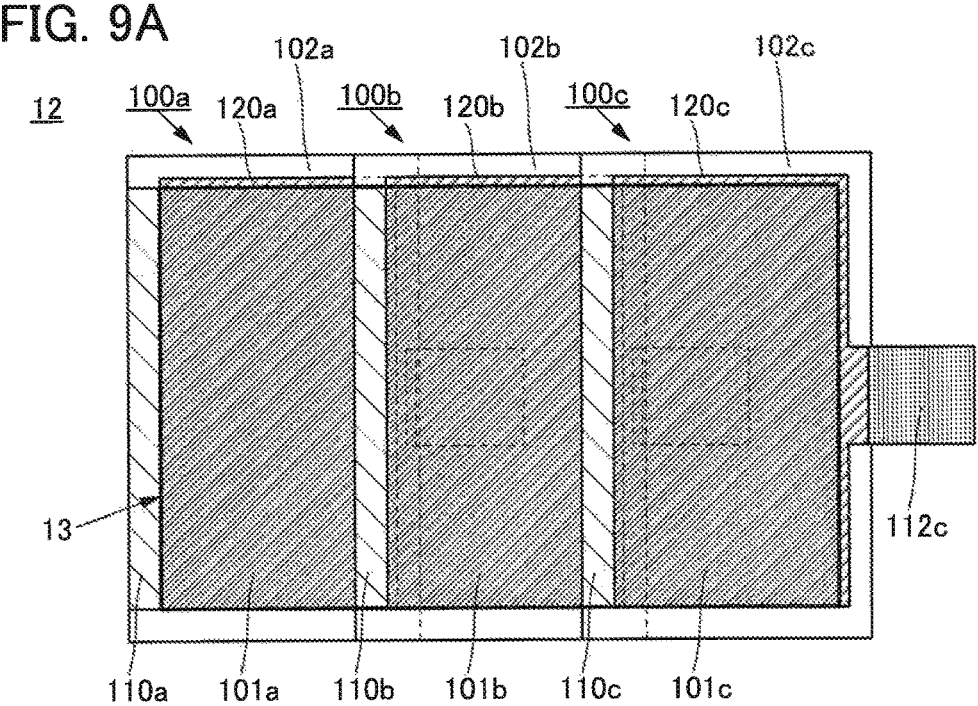
FIGS. 9A to 9C illustrate examples of a display device.

FIG. 9A is a top view of the display device 12. The display device 12 illustrated in FIG. 9A includes three display panels 100 illustrated in FIG. 10B arranged in one direction (a lateral direction).

Figure 9B:
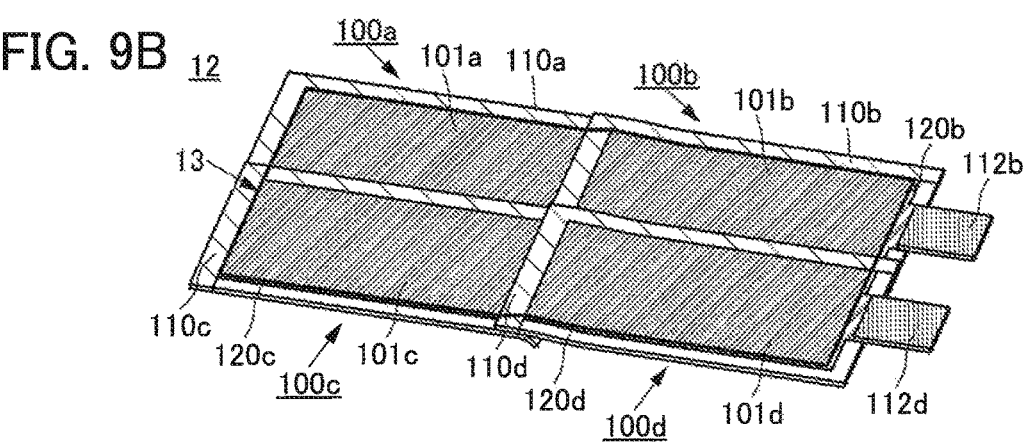
Figure 9C:
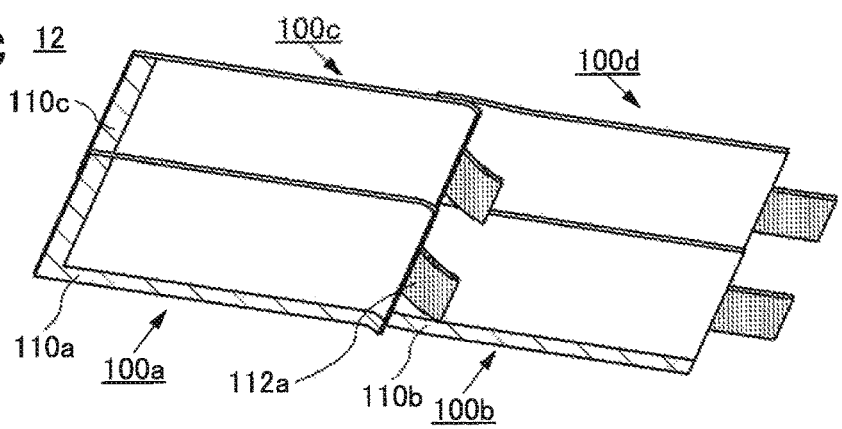

FIGS. 9B and 9C are perspective views of the display device 12 different from that in FIG. 9A. The display device 12 in FIGS. 9B and 9C includes four display panels 100 illustrated in FIG. 10C arranged in a 2×2 matrix (two display panels in the longitudinal direction and the lateral direction). FIG. 9B is a perspective view of the display device 12 on the display surface side. FIG. 9C is a perspective view of the display device 12 on the side opposite to the display surface side.

FIGS. 9A to 9C illustrate examples where each of the display panels is electrically connected to an FPC.

A display panel which can be used for the display device 12 is described with reference to FIGS. 10A to 10D. FIGS. 10A to 10D illustrate examples of a top view of the display panel 100.

The display panel 100 includes the display region 101 and a region 102. Here, the region 102 is a portion other than the display region 101 of the display panel 100 in a top view. The region 102 can also be referred to as a non-display region.

Figure 10A:
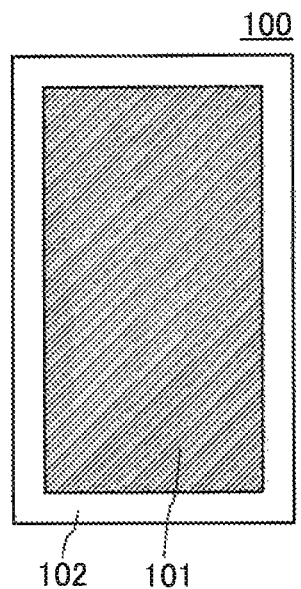
FIGS. 10A to 10D each illustrate an example of a display panel.

For example, the display panel 100 may include the frame-like region 102 that surrounds the display region 101 as illustrated in FIG. 10A.

Figure 10B:
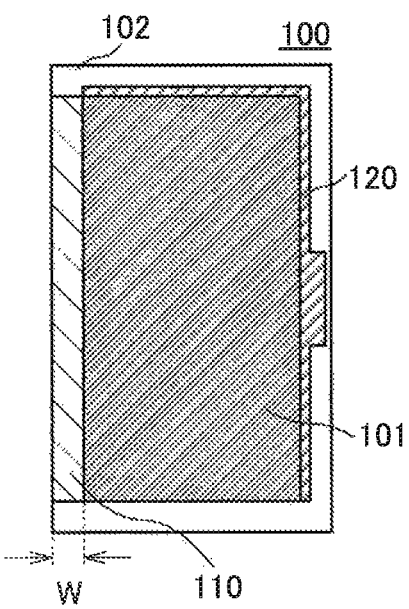
Figure 10C:
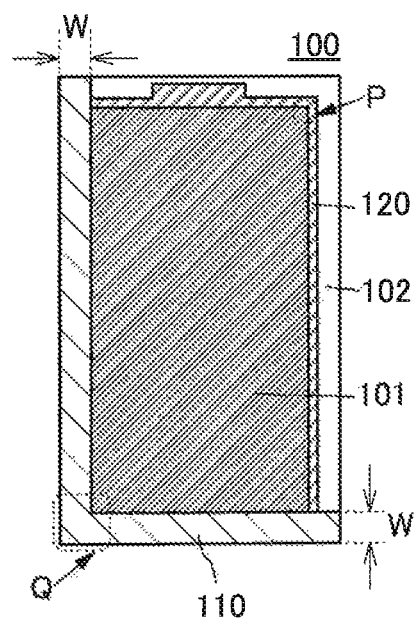
Figure 10D:
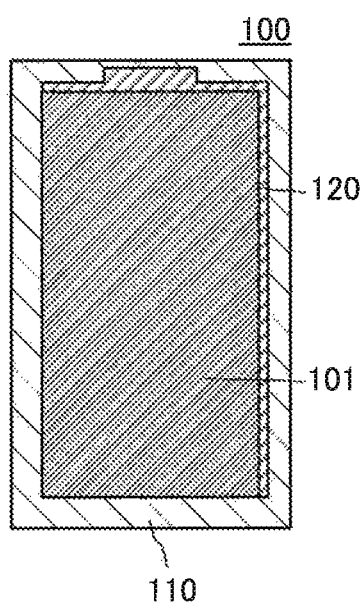

FIGS. 10B to 10D each specifically illustrate a structure of the region 102. The region 102 includes the region 110 that transmits visible light and the region 120 that blocks visible light. The region 110 that transmits visible light and the region 120 that blocks visible light are each adjacent to the display region 101. The region 110 that transmits visible light and the region 120 that blocks visible light may each be provided along part of the outer edge of the display region 101.

In the display panel 100 illustrated in FIG. 10B, the region 110 that transmits visible light is provided along one side of the display region 101. In the display panel 100 illustrated in FIG. 10C, the region 110 that transmits visible light is provided along two sides of the display region 101. The region 110 that transmits visible light may be provided along three or more sides of the display region 101. The region 110 that transmits visible light is preferably in contact with the display region 101 and provided so as to extend to an end portion of the display panel as in FIG. 10B or the like.

In each of the display panels 100 in FIGS. 10B to 10D, the region 120 that blocks visible light is provided along two sides of the display region 101. The region 120 that blocks visible light may be extended close to an end portion of the display panel.

Note that in each of the regions 102 illustrated in FIGS. 10B and 10C, a region other than the region 110 that transmits visible light and the region 120 that blocks visible light does not necessarily have visible light transmittance. For example, the region 110 that transmits visible light may be provided over the entire circumference of the display panel as illustrated in FIG. 10D.

At least part of the region 110 that transmits visible light is adjacent to the display region 101. The region 120 that blocks visible light may be partly provided between the region 110 that transmits visible light and the display region 101.

The display region 101 includes a plurality of pixels arranged in a matrix and can display an image. One or more display elements are provided in each pixel. As the display element, a light-emitting element such as an organic EL element, a liquid crystal element, or the like can be used, for example.

A material that transmits visible light is used for the region 110 that transmits visible light. A substrate, a bonding layer, or the like included in the display panel 100 may also be used, for example. The transmittance of the region 110 that transmits visible light with respect to visible light is preferably higher because extraction efficiency of light from the display panel under the region 110 that transmits visible light can be increased. The region 110 that transmits visible light preferably has a light transmittance of higher than or equal to 70%, further preferably higher than or equal to 80%, and still further preferably higher than or equal to 90% on average at a wavelength longer than or equal to 450 nm and shorter than or equal to 700 nm.

In the region 120 that blocks visible light, for example, a wiring electrically connected to the pixels (or display elements) included in the display region 101 is provided. In addition to such a wiring, driver circuits (e.g., a scan line driver circuit and a signal line driver circuit) for driving the pixels may be provided. Furthermore, the region 120 that blocks visible light includes a terminal electrically connected to an FPC or the like (also referred to as a connection terminal), a wiring electrically connected to the terminal, and the like.

Here, a width W of the region 110 that transmits visible light illustrated in FIGS. 10B and 10C is preferably greater than or equal to 0.5 mm and less than or equal to 150 mm, further preferably greater than or equal to 1 mm and less than or equal to 100 mm, and still further preferably greater than or equal to 2 mm and less than or equal to 50 mm. The region 110 that transmits visible light serves as a sealing region. As the width W of the region 110 that transmits visible light is larger, the distance between the edge of the display panel 100 and the display region 101 can become longer, in which case an entry of an impurity such as water from the outside into the display region 101 can be suppressed. Note that the width W of the region 110 that transmits visible light corresponds to the shortest distance between the display region 101 and the edge of the display panel 100 in some cases.

In the case where an organic EL element is used as the display element, for example, the width W of the region 110 that transmits visible light is set to be greater than or equal to 1 mm, whereby deterioration of the organic EL element can be effectively suppressed, which leads to an improvement in reliability. Note that also in a portion other than the region 110 that transmits visible light, the distance between the edge of the display region 101 and the edge of the display panel 100 is preferably in the above range.

The display device 12 in FIG. 9A includes a display panel 100a, a display panel 100b, and a display panel 100c.

The display panel 100b is placed so as to partly overlap with an upper side (display surface side) of the display panel 100a. Specifically, the region 110b that transmits visible light of the display panel 100b is provided to overlap with the display region 101a of the display panel 100a. A region 120b that blocks visible light of the display panel 100b is provided so as not to overlap with the display region 101a of the display panel 100a. The display region 101b of the display panel 100b is provided to overlap with a region 102a of the display panel 100a and a region 120a that blocks visible light of the display panel 100a.

Similarly, the display panel 100c is placed so as to partly overlap with an upper side (display surface side) of the display panel 100b. Specifically, a region 110c that transmits visible light of the display panel 100c is provided to overlap with the display region 101b of the display panel 100b. A region 120c that blocks visible light of the display panel 100c is provided so as not to overlap with the display region 101b of the display panel 100b. A display region 101c of the display panel 100c is provided to overlap with a region 102b of the display panel 100b and the region 120b that blocks visible light of the display panel 100b.

The region 110b that transmits visible light is provided to overlap with the display region 101a; thus, a user of the display device 12 can see the entire image on the display region 101a even when the display panel 100b overlaps with a display surface of the display panel 100a. Similarly, the region 110c that transmits visible light is provided to overlap with the display region 101b; thus, a user of the display device 12 can see the entire image on the display region 101b even when the display panel 100c overlaps with a display surface of the display panel 100b.

The display region 101b of the display panel 100b overlaps with upper sides of the region 102a and the region 120a that blocks visible light; as a result, a non-display region does not exist between the display region 101a and the display region 101b. Similarly, the display region 101c of the display panel 100c overlaps with upper sides of the region 102b and the region 120b that blocks visible light; as a result, a non-display region does not exist between the display region 101b and the display region 101c. Thus, a region where the display region 101a, the display region 101b, and the display region 101c are placed seamlessly can serve as a display region 13 of the display device 12.

The display device 12 illustrated in FIGS. 9B and 9C includes the display panel 100a, the display panel 100b, the display panel 100c, and a display panel 100d.

In FIGS. 9B and 9C, short sides of the display panels 100a and 100b overlap with each other such that part of the display region 101a and part of the region 110b that transmits visible light overlap with each other. Furthermore, long sides of the display panels 100a and 100c overlap with each other such that part of the display region 101a and part of the region 110c that transmits visible light overlap with each other.

In FIGS. 9B and 9C, part of the display region 101b overlaps with part of the region 110c that transmits visible light and part of a region 110d that transmits visible light. In addition, part of the display region 101c overlaps with part of the region 110d that transmits visible light.

Thus, as illustrated in FIG. 9B, a region where the display regions 101a to 101d are placed seamlessly can serve as the display region 13 of the display device 12.

Here, the display panel 100 preferably has flexibility. For example, a pair of substrates included in the display panel 100 preferably has flexibility.

Thus, as illustrated in FIGS. 9B and 9C, a region near an FPC 112a of the display panel 100a can be bent so that part of the display panel 100a and part of the FPC 112a can be placed under the display region 101b of the display panel 100b adjacent to the FPC 112a. As a result, the FPC 112a can be placed without physical interference with the rear surface of the display panel 100b. Furthermore, when the display panel 100a and the display panel 100b overlap with each other and are fixed, it is not necessary to consider the thickness of the FPC 112a; thus, the top surface of the region 110b that transmits visible light and the top surface of the display panel 100a can be substantially leveled. This can make an end portion of the display panel 100b over the display region 101a less noticeable.

Moreover, each display panel 100 is made flexible, in which case the display panel 100b can be curved gently so that the top surface of the display region 101b of the display panel 100b and the top surface of the display region 101a of the display panel 100a are leveled. Thus, the display regions can be leveled except the vicinity of a region where the display panel 100a and the display panel 100b overlap with each other, so that the display quality of an image displayed on the display region 13 of the display device 12 can be improved.

Although the relation between the display panel 100a and the display panel 100b is taken as an example in the above description, the same can apply to the relation between any other two adjacent display panels.

Furthermore, to reduce the step between two adjacent display panels 100, the thickness of the display panel 100 is preferably small. For example, the thickness of the display panel 100 is preferably less than or equal to 1 mm, further preferably less than or equal to 300 µm, and still further preferably less than or equal to 100 µm. The display panel is preferably thin because the thickness or weight of the whole display device can also be reduced.

FIG. 11A is a top view of the display device 12 in FIGS. 9B and 9C seen from the display surface side.

Here, when the region 110 that transmits visible light of the display panel 100 does not have sufficiently high transmittance with respect to visible light, luminance of a displayed image may be decreased depending on the number of display panels 100 overlapping with the display region 101.

For example, in a region A in FIG. 11A, one display panel 100c overlaps with the display region 101a of the display panel 100a. In a region B, two display panels 100 (the display panels 100c and 100d) overlap with the display region 101b of the display panel 100b. In a region C, three display panels 100 (the display panels 100b, 100c, and 100d) overlap with the display region 101a of the display panel 100a.

In such a case, image data is preferably corrected with the use of the image processing device of one embodiment of the present invention. Specifically, it is preferable that image data be corrected so that the gray scale of the pixels is locally increased depending on the number of display panels 100 overlapping with the display region 101. In this manner, a decrease in the display quality of the image displayed on the display region 13 of the display device 12 can be suppressed.

Alternatively, the position of an end portion of the display panel 100 placed on the upper side may be shifted from the position of an end portion of another display panel 100, whereby the number of display panels 100 overlapping with the display region 101 of the lower display panel 100 can be reduced.

In FIG. 11B, the display panels 100c and 100d over the display panels 100a and 100b are shifted in one direction. Specifically, the display panels 100c and 100d are relatively shifted from the display panels 100a and 100b in the positive X direction by the width W of the region 110 that transmits visible light. At this time, there are two regions: a region D in which one display panel 100 overlaps with the display region 101, and a region E in which two display panels 100 overlap with the display region 101.

The display panel may be shifted in a direction perpendicular to the X direction (Y direction). In FIG. 11C, the display panels 100b and 100d are shifted from the display panels 100a and 100c in the positive Y direction by the width W of the region 110 that transmits visible light.

In the case where the display panel 100 placed on the upper side is shifted from the display panel 100 placed on the lower side, the shape of the contour of a region in which the display regions 101 of the display panels 100 are combined is different from a rectangular shape. Thus, to make the shape of the display region 13 of the display device 12 rectangular as illustrated in FIG. 11B or 11C, the display device 12 is preferably driven so that no image is displayed on regions, which are placed outside the display region 13, in the display regions 101 of the display panels 100. Considering the number of pixels in the region not displaying an image, the display region 101 of each display panel 100 preferably includes more pixels than the number obtained by dividing the number of all the pixels in the display region 13 by the number of the display panels 100.

Although the distance of a relative shift of the display panels 100 is set to an integral multiple of the width W of the region 110 that transmits visible light in the above description, the distance is not limited thereto and can be set as appropriate in consideration of the shapes of the display panels 100, the shape of the display region 13 of the display device 12, in which the display panels 100 are combined, or the like.

FIGS. 12A to 12E and FIGS. 13A to 13F are examples of cross sectional views of the two display panels attached to each other.

In FIGS. 12A to 12E, a lower display panel includes the display region 101a, the region 110a that transmits visible light, and the region 120a that blocks visible light. The lower display panel is electrically connected to the FPC 112a. An upper display panel (display panel on the display surface side) includes the display region 101b, the region 110b that transmits visible light, and the region 120b that blocks visible light. The upper display panel is electrically connected to an FPC 112b.

Figure 12A:
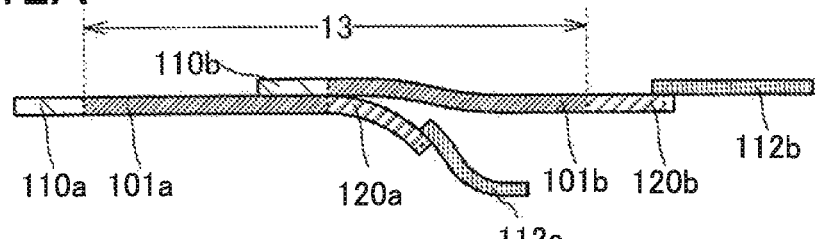
FIGS. 12A to 12E each illustrate an example of a display device.

In FIG. 12A, the FPC 112a and the FPC 112b are connected to the display surface side (front surface side) of the lower display panel and the display surface side of the upper display panel, respectively.

When air exists between the region that transmits visible light of the upper display panel and the display region of the lower display panel, part of light extracted from the display region is reflected at the interface between the display region and air and the interface between air and the region that transmits visible light, which may result in a decrease in luminance of the display. As a result, the light extraction efficiency of a region in which a plurality of display panels overlap with each other might be decreased. In addition, a difference in luminance of the display region of the lower display panel might occur between a portion overlapping with the region that transmits visible light of the upper display panel and a portion not overlapping with the region that transmits visible light of the upper display panel, so that a joint between the display panels is easily recognized by a user in some cases.

Figure 12B:
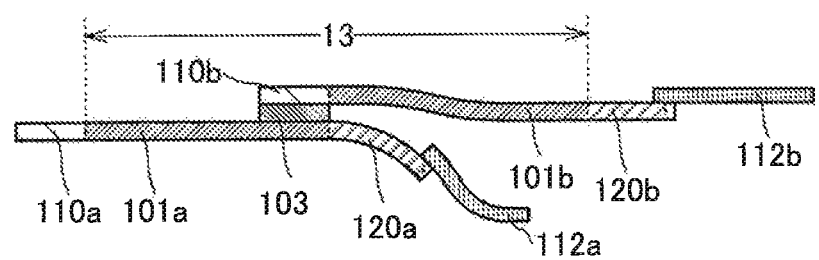

In view of the above, as illustrated in FIG. 12B, the display device preferably includes a light-transmitting layer 103 having a refractive index higher than that of air and transmitting visible light between the display region and the region that transmits visible light. Thus, air can be prevented from entering between the display region and the region that transmits visible light, so that the interface reflection due to a difference in refractive index can be suppressed. In addition, display unevenness or luminance unevenness of the display device can be reduced. When there is no air in the interface between two panels, the degree of a decrease in the luminance of the display region, which is seen through the region that transmits visible light, can be easily estimated; thus, the accuracy of the image processing can be improved.

Note that the transmittance of the light-transmitting layer with respect to visible light is preferably as high as possible because the light extraction efficiency of the display device can be increased. The light-transmitting layer preferably has a light transmittance of higher than or equal to 80% and further preferably higher than or equal to 90% on average at a wavelength longer than or equal to 450 nm and shorter than or equal to 700 nm.

The difference in refractive index between the light-transmitting layer and a layer in contact with the light-transmitting layer is preferably as small as possible because the light reflection can be suppressed. For example, the refractive index of the light-transmitting layer is higher than that of air, and preferably higher than or equal to 1.3 and lower than or equal to 1.8. The difference in the refractive index between the light-transmitting layer and the layer in contact with the light-transmitting layer (e.g., a substrate included in the display panel) is preferably lower than or equal to 0.30, further preferably lower than or equal to 0.20, and still further preferably lower than or equal to 0.15.

It is preferred that the light-transmitting layer be detachably in contact with at least one of the lower display panel and the upper display panel. In the case where the display panels included in the display device are individually detachable, when malfunction occurs in one of the display panels, for example, only the defective display panel can be easily replaced with a new display panel. The continuous use of the other display panel enables the display device to be used longer and at lower cost.

When there is no need to attach and detach the display panels, the display panels are fixed to each other with the light-transmitting layer including a material having an adhesive property (adhesive or the like).

Either of an inorganic material and an organic material can be used for the light-transmitting layer. A liquid substance, a gelatinous substance, or a solid substance can be used for the light-transmitting layer.

For the light-transmitting layer, a liquid substance such as water, a solution, a fluorine-based inactive liquid, a refractive liquid, or silicone oil can be used, for example.

In the case where the display device is inclined to the horizontal plane (a plane perpendicular to a direction in which gravity acts) or in the case where the display device is placed so as to be perpendicular to the horizontal plane, the viscosity of a liquid substance is preferably 1 mPa·s or more, further preferably 1 Pa·s or more, still further preferably 10 Pa·s or more, and yet still further preferably 100 Pa·s or more. In the case where the display device is placed so as to be parallel to the horizontal plane, for example, the viscosity of the liquid substance is not limited thereto.

The light-transmitting layer is preferably inactive because another layer included in the display device can be prevented from being damaged, for example.

A material contained in the light-transmitting layer is preferably nonvolatile. Accordingly, an entry of air into the interface due to volatilization of a material used for the light-transmitting layer can be prevented.

For the light-transmitting layer, a high molecular material can be used. For example, a resin such as an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin can be used. Alternatively, a two-component-mixture-type resin may be used. For example, an adhesive sheet or any of a variety of curable adhesives such as a reactive curable adhesive, a thermosetting adhesive, an anaerobic adhesive, and a photo curable adhesive such as an ultraviolet curable adhesive containing at least one of these resins may be used. The adhesives does not need to be cured in the case where, for example, the display panels are not fixed to each other.

The light-transmitting layer preferably has high self-attachability to an object. In addition, the light-transmitting layer preferably has high separability against an object. After the light-transmitting layer attached to the display panel is separated from the display panel, it is preferred that the light-transmitting layer be able to be attached to the display panel again.

In addition, it is preferred that the light-transmitting layer have no adhesiveness or low adhesiveness. In that case, attachment and separation of the light-transmitting layer to and from an object can be repeated without damaging or contaminating a surface of the object.

As the light-transmitting layer, a film having attachability or a film having adhesiveness can be used, for example. In the case where an attachment film having a stacked-layer structure of an attachment layer or an adhesive layer and a base material is used, the attachment layer or the adhesive layer may function as the light-transmitting layer of the display device of one embodiment of the present invention, and the base material may function as a substrate included in the display panel. Note that the display device may have a substrate in addition to the base material in the attachment film. The attachment film may include an anchor layer between the attachment layer or the adhesive layer and the base material. The anchor layer has a function of enhancing the adhesiveness between the attachment layer or the adhesive layer and the base material. In addition, the anchor layer has a function of smoothing a surface of the base material coated with the attachment layer or the adhesive layer. In this manner, bubbles can be made hardly generated between the object and the light-transmitting layer.

A film in which a silicone resin layer and a polyester film are stacked can be preferably used in the display device, or example. In that case, the silicone resin layer has attachability and functions as a light-transmitting layer, whereas the polyester film serves as a substrate included in the display panel. Note that another substrate may be included in the display panel in addition to the polyester film.

In the case where a film in which an attachment layer, a base material, and an adhesive layer or a bonding layer are stacked is used, the attachment layer functions as a light-transmitting layer of the display device; the base material functions as a substrate included in the display panel; and the adhesive layer or the bonding layer functions as a layer for attaching an element layer of the display panel to the substrate.

The thickness of the light-transmitting layer is not particularly limited and may be greater than or equal to 1 μm and less than or equal to 50 μm, for example. The thickness of the light-transmitting layer can be greater than 50 μm; however, in the case of manufacturing a flexible display device, the thickness of the display device is preferably set such that the flexibility of the display device is not reduced. For example, the thickness of the light-transmitting layer is preferably greater than or equal to 10 μm and less than or equal to 30 μm. The thickness of the light-transmitting layer can be less than 1 μm.

The display region 101a overlaps with the region 110b that transmits visible light with the light-transmitting layer 103 provided therebetween. Thus, air can be prevented from entering between the display region 101a and the region 110b that transmits visible light, so that interface reflection due to a difference in refractive index can be reduced.

Accordingly, a difference in luminance of the display region 101a between a portion overlapping with the region 110b that transmits visible light and a portion not overlapping with the region 110b that transmits visible light can be suppressed, so that a joint between the display panels of the display device can be hardly recognized by a user of the display device. In addition, display unevenness or luminance unevenness of the display device can be suppressed.

The region 120a that blocks visible light and the FPC 112a each overlap with the display region 101b. Thus, a sufficient area of a non-display region can be secured and a seamless display region can be increased in size, so that a highly reliable large display device can be fabricated.

Figure 12C:
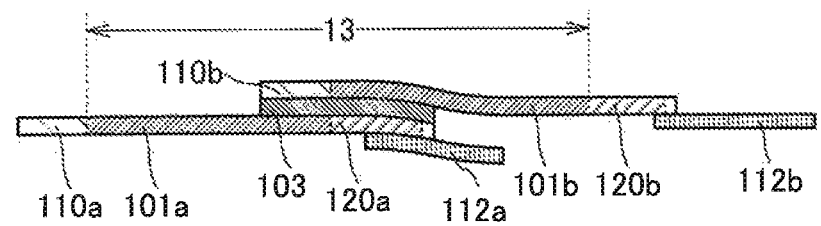

In FIG. 12C, the FPC 112a and the FPC 112b are connected to the side (rear surface side) opposite to the display surface of the lower display panel and the side (rear surface side) opposite to the display surface of the upper display panel, respectively.

As illustrated in FIG. 12C, the light-transmitting layer 103 may also be provided between the region 120a that blocks visible light of the lower display panel and the display region 101b of the upper display panel.

When an FPC is connected to the rear surface side of a lower display panel, an end portion of the display panel can be attached to the rear surface of an upper display panel; thus, the attachment area can be increased and the mechanical strength of the attached portion can be increased.

Figure 12D:
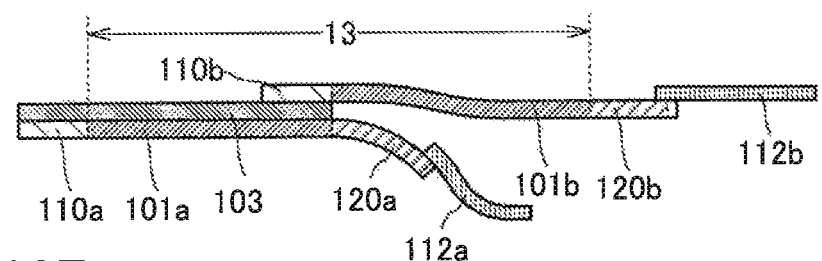

As illustrated in FIG. 12D, the light-transmitting layer 103 may overlap with a region of the display region 101a not overlapping with the upper display panel. Furthermore, the region 110a that transmits visible light and the light-transmitting layer 103 may overlap with each other.

Figure 12E:
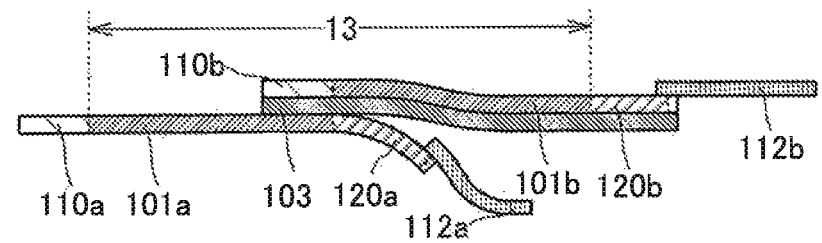

As illustrated in FIG. 12E, the light-transmitting layer 103 may overlap with a region of the upper display panel not overlapping with the display region 101a.

Figure 13A:
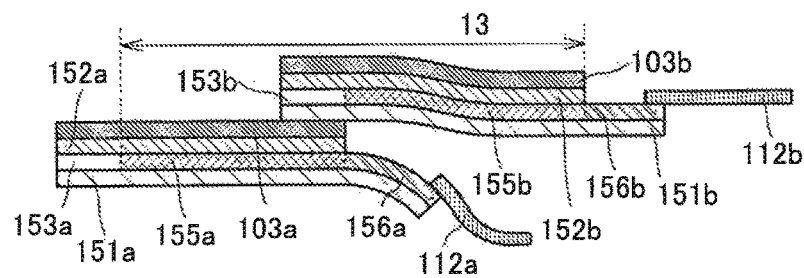
FIGS. 13A to 13F each illustrate an example of a display device.

As illustrated in FIG. 13A, the lower display panel may include a substrate 151a, a substrate 152a, and an element layer 153a, and the upper display panel may include a substrate 151b, a substrate 152b, and an element layer 153b, for example.

The element layer 153a has a region 155a including a display element and a region 156a including a wiring electrically connected to the display element. The wiring included in the region 156a is electrically connected to the FPC 112a.

Similarly, the element layer 153b of the upper display panel has a region 155b including a display element and a region 156b including a wiring electrically connected to the display element. The wiring included in the region 156b is electrically connected to the FPC 112b.

A light-transmitting layer 103a is provided over the substrate 152a. For example, a stack of the substrate 152a and the light-transmitting layer 103a can be formed using the above-described attachment film having a stack of an attachment layer and a base material. The substrate 152b and a light-transmitting layer 103b can have a similar structure.

Here, fine dirt such as dust in the air might be attached depending on a material of the light-transmitting layer. In such a case, it is preferable that the region of the display region 101a not overlapping with the upper display panel do not overlap with the light-transmitting layer 103. This makes it possible to prevent unclear display of the display device due to dirt or the like attached to the light-transmitting layer 103.

Figure 13B:
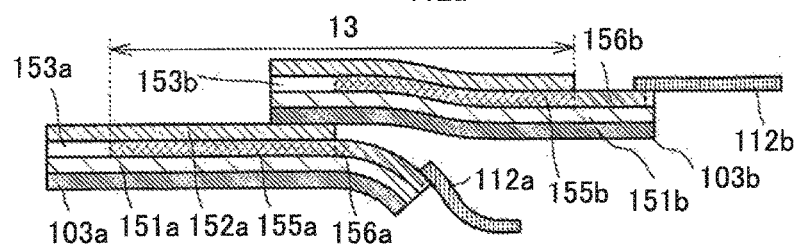

As illustrated in FIG. 13B, the light-transmitting layer 103a may be in contact with the substrate 151a. For example, a stack of the substrate 151a and the light-transmitting layer 103a can be formed using the above-described attachment film having a stack of an attachment layer and a base material. The substrate 151b and the light-transmitting layer 103b can have a similar structure.

In the structure illustrated in FIG. 13B, the light-transmitting layer is not provided on the outermost surface of the display surface of the display device; thus, unclear display of the display device due to dirt or the like attached to the light-transmitting layer 103 can be prevented. In addition, when a light-transmitting layer having attachability is provided on the rear surface of the display device, the display device can be detachably attached to a desired portion with the use of a surface of the light-transmitting layer which is not in contact with the display panel.

Figure 13C:
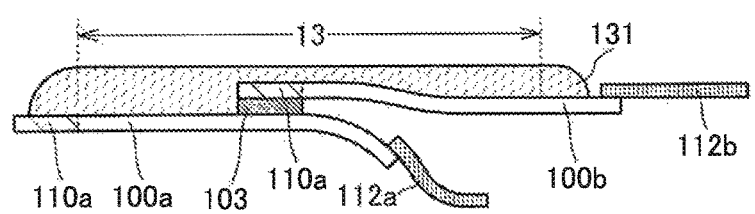

Alternatively, as illustrated in FIG. 13C, a resin layer 131 which covers front surfaces of the display panel 100a and the display panel 100b may be provided. Specifically, the resin layer 131 is preferably provided to cover the display regions of the display panels 100a and 100b and a region where the display panel 100a overlap with the display panel 100b.

Providing the resin layer 131 over the plurality of display panels 100 can increase the mechanical strength of the display device 12. In addition, the resin layer 131 is formed to have a flat surface, whereby the display quality of an image displayed on the display region 13 can be increased. For example, when a coating apparatus such as a slit coater, a curtain coater, a gravure coater, a roll coater, or a spin coater is used, the resin layer 131 with high flatness can be formed.

The refractive index of the resin layer 131 is preferably 0.8 to 1.2 times, further preferably 0.9 to 1.1 times, and still further preferably 0.95 to 1.15 times as high as the refractive index of the substrate on the display surface side of the display panel 100. Light can be extracted outside more efficiently as the difference in refractive index between the display panel 100 and the resin layer 131 becomes smaller. In addition, the resin layer 131 with such a refractive index is provided to cover a step portion between the display panel 100a and the display panel 100b, whereby the step portion is not easily recognized visually, and the display quality of an image displayed on the display region 13 can be increased.

The resin layer 131 transmits visible light. For the resin layer 131, for example, an organic resin such as an epoxy resin, an aramid resin, an acrylic resin, a polyimide resin, a polyamide resin, or a polyamide-imide resin can be used.

Figure 13D:
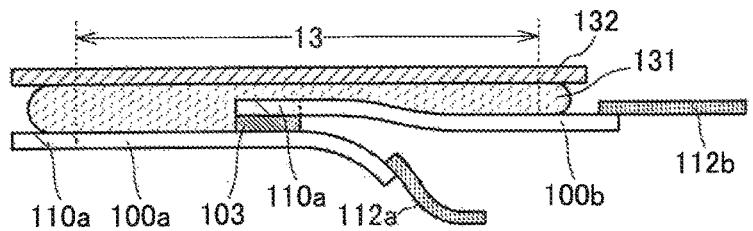

Alternatively, as illustrated in FIG. 13D, a protective substrate 132 is preferably provided over the display device 12 with the resin layer 131 provided therebetween. In that case, the resin layer 131 may serve as a bonding layer for bonding the protective substrate 132 to the display device 12. With the protective substrate 132, the surface of the display device 12 can be protected, and moreover, the mechanical strength of the display device 12 can be increased. For the protective substrate 132, a light-transmitting material is used at least in a region overlapping with the display region 13. Furthermore, the protective substrate 132 may have a light-blocking property in a region other than the region overlapping with the display region 13 so as not to be visually recognized.

The protective substrate 132 may function as a touch panel. In the case where the display panel 100 is flexible and capable of being bent, the protective substrate 132 is also preferably flexible.

Furthermore, a difference in refractive index between the protective substrate 132 and the substrate on the display surface side of the display panel 100 or the resin layer 131 is preferably less than or equal to 20%, further preferably less than or equal to 10%, and still further preferably less than or equal to 5%.

As the protective substrate 132, a plastic substrate that is formed as a film can be used. For the plastic substrate, a polyester resin such as polyethylene terephthalate (PET) or polyethylene naphthalate (PEN), a polyacrylonitrile resin, a polyimide resin, a polymethyl methacrylate resin, a polycarbonate (PC) resin, a poly ethersulfone (PES) resin, a polyamide resin (e.g., nylon or aramid), a polycycloolefin resin, a polystyrene resin, a polyamide imide resin, a polyvinyl chloride resin, a polyetheretherketone (PEEK) resin, a polysulfone (PSF) resin, a polyetherimide (PEI) resin, a poly arylate (PAR) resin, a polybutylene terephthalate (PBT) resin, a polytetrafluoroethylene (PTFE) resin, a silicone resin, or the like can be used. Alternatively, a substrate in which a fibrous body is impregnated with a resin (also referred to as prepreg) or a substrate whose coefficient of linear expansion is reduced by mixing an organic resin with an inorganic filler can be used. The protective substrate 132 is not limited to the resin film, and a transparent nonwoven fabric formed by processing pulp into a continuous sheet, a sheet including an artificial spider's thread fiber containing protein called fibroin, a complex in which the transparent nonwoven fabric or the sheet and a resin are mixed, a stack of a resin film and a nonwoven fabric containing a cellulose fiber whose fiber width is 4 nm or more and 100 nm or less, or a stack of a resin film and a sheet including an artificial spider's thread fiber may be used.

As the protective substrate 132, at least one of a polarizing plate, a circular polarizing plate, a retardation plate, an optical film, and the like may be used.

Figure 13E:
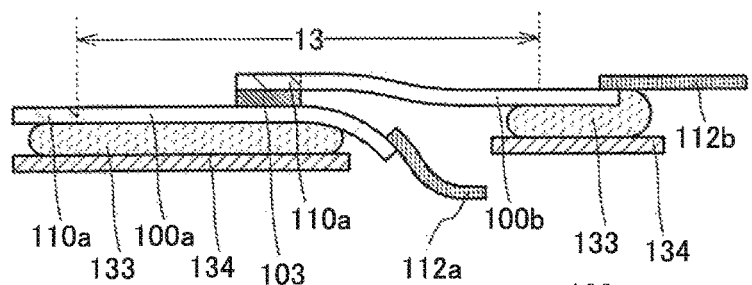

As illustrated in FIG. 13E, a resin layer 133 and a protective substrate 134 may be provided on surfaces opposite to the display surfaces of the display panels 100a and 100b. Providing a substrate supporting the display panels on the rear surfaces of the display panels can suppress unintended warping or bending of the display panels, whereby the display surfaces can be kept smooth. Thus, the display quality of an image displayed on the display region 13 can be improved.

Note that the resin layer 133 and the protective substrate 134, which are provided on the sides opposite to the display surfaces, do not necessarily have light transmittance, and a material which absorbs or reflects visible light may be used.

Figure 13F:
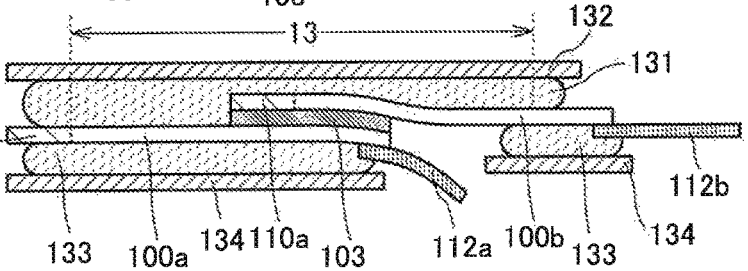

As illustrated in FIG. 13F, the resin layer 131 and the protective substrate 132 may be provided on the front surfaces of the display panels, and the resin layer 133 and the protective substrate 134 may be provided on the rear surfaces thereof. In this manner, the display panels 100a and 100b are sandwiched between the two protective substrates, whereby the mechanical strength of the display device 12 can be further increased.

It is preferable that the total thickness of the resin layer 131 and the protective substrate 132 be approximately the same as that of the resin layer 133 and the protective substrate 134. For example, it is preferable that the thicknesses of the resin layers 131 and 133 be made substantially equal to each other, and materials having the same thickness be used for the protective substrates 132 and 134. In that case, the plurality of display panels 100 can be located at the center of the stack in the thickness direction. For example, when the stack including the display panels 100 at the center in the thickness direction is bent, stress in the lateral direction applied to the display panels 100 by bending can be relieved, which prevents the display panels 100 from being damaged.

In the case where the thicknesses of the resin layer and the protective substrate differ between an end portion and a center portion of the display device, for example, the total thickness of the resin layer 131 and the protective substrate 132 and that of the resin layer 133 and the protective substrate 134 are preferably compared under the same condition which is appropriately selected from conditions such as the average thickness, the largest thickness, the smallest thickness, and the like.

In FIG. 13F, the same material is preferably used for the resin layers 131 and 133 because the manufacturing cost can be reduced. Similarly, the same material is preferably used for the protective substrates 132 and 134 because the manufacturing cost can be reduced.

As illustrated in FIGS. 13E and 13F, an opening for leading the FPC 112a is preferably provided in the resin layer 133 and the protective substrate 134, which are located on the rear surface sides of the display panels 100a and 100b. In particular, when the resin layer 133 is provided to cover part of the FPC 112a as illustrated in FIG. 13F, the mechanical strength at a connection portion between the display panel 100a and the FPC 112a can be increased, and defects such as separation of the FPC 112a can be suppressed. Similarly, the resin layer 133 is preferably provided to cover part of the FPC 112b.

Figure 14A:
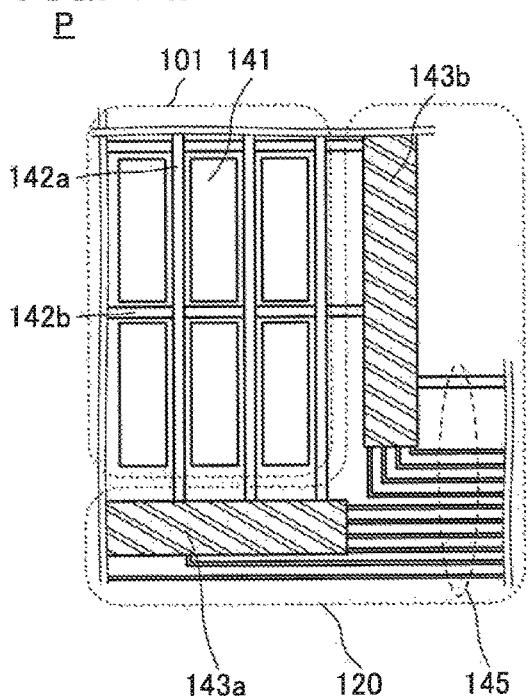
FIGS. 14A to 14C illustrate examples of a display panel.
Figure 14B:
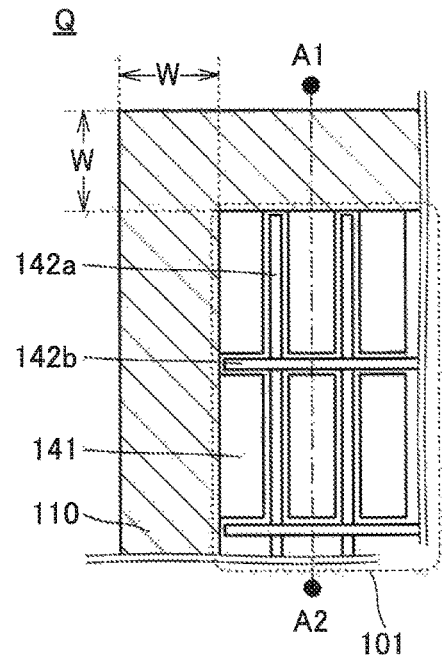

Next, a structure example of the display panel 100 will be described. FIG. 14A is an example of a top view in which a region P in FIG. 10C is enlarged, and FIG. 14B is an example of a top view in which a region Q in FIG. 10C is enlarged.

As illustrated in FIG. 14A, a plurality of pixels 141 are arranged in a matrix in the display region 101. In the case where the display panel 100 capable of full color display with three colors of red, blue, and green is formed, each of the pixels 141 corresponds to a sub-pixel capable of displaying any of the three colors. A sub-pixel capable of displaying white or yellow may be provided in addition to the sub-pixels capable of displaying any of the three colors. A region including the pixels 141 corresponds to the display region 101.

A wiring 142a and a wiring 142b are electrically connected to each pixel 141. Each of the plurality of wirings 142a intersects with the wiring 142b, and is electrically connected to a circuit 143a. The plurality of wirings 142b are electrically connected to a circuit 143b. One of the circuits 143a and 143b can function as a scan line driver circuit, and the other can function as a signal line driver circuit. One or both of the circuits 143a and 143b are not necessarily provided.

In FIG. 14A, a plurality of wirings 145 electrically connected to the circuit 143a or the circuit 143b are provided. The wiring 145 is electrically connected to an FPC 123 in an unillustrated region and has a function of supplying a signal from the outside to the circuits 143a and 143b.

In FIG. 14A, a region including the circuit 143a, the circuit 143b, the plurality of wirings 145, and the like corresponds to the region 120 that blocks visible light.

In FIG. 14B, a region outside the pixel 141 provided closest to the end corresponds to the region 110 that transmits visible light. The region 110 that transmits visible light does not include members that blocks visible light, such as the pixel 141, the wiring 142a, and the wiring 142b. Note that in the case where part of the pixel 141, the wiring 142a, or the wiring 142b transmits visible light, the part of the pixel 141, the wiring 142a, or the wiring 142b may be provided to extend to the region 110 that transmits visible light.

In the case where the width of the region 110 that transmits visible light varies within one display panel, or in the case where the width varies depending on the positions of the same display panel, the shortest length can be referred to as the width W. In FIG. 14B, the distance between the pixel 141 and the end portion of the substrate (that is, the width W of the region 110 that transmits visible light) in the longitudinal direction is the same as that in the lateral direction, but one embodiment of the present invention is not limited thereto.

Figure 14C:
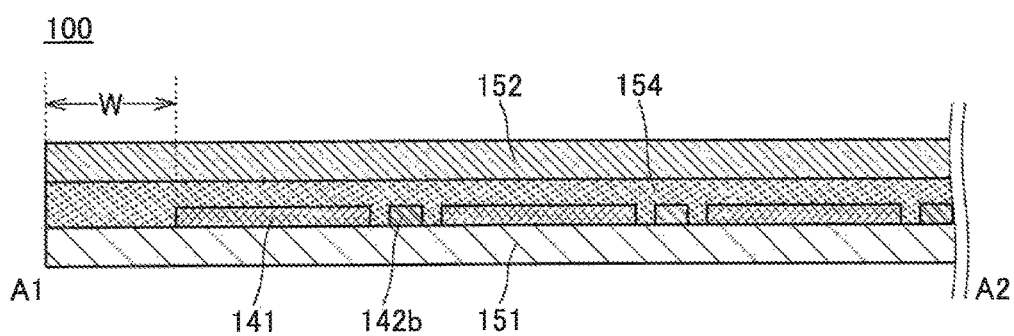

FIG. 14C is a cross-sectional view taken along line A1-A2 in FIG. 14B. The display panel 100 includes a pair of substrates (a substrate 151 and a substrate 152) that transmits visible light. The substrate 151 and the substrate 152 are bonded to each other with a bonding layer 154. Here, the substrate on which the pixel 141, the wiring 142b, and the like are formed is referred to as the substrate 151.

As illustrated in FIGS. 14B and 14C, in the case where the pixel 141 is positioned closest to the end of the display region 101, the width W of the region 110 that transmits visible light is the distance between an end portion of the substrate 151 or the substrate 152 and an end portion of the pixel 141.

Note that the end portion of the pixel 141 refers to an end portion of a member that is positioned closest to the end and blocks visible light in the pixel 141. Alternatively, in the case where a light-emitting element including a layer containing a light-emitting organic compound between a pair of electrodes (also referred to as an organic EL element) is used as the pixel 141, the end portion of the pixel 141 may be any of an end portion of a lower electrode, an end portion of the layer containing a light-emitting organic compound, and an end portion of an upper electrode.

Figure 15A:
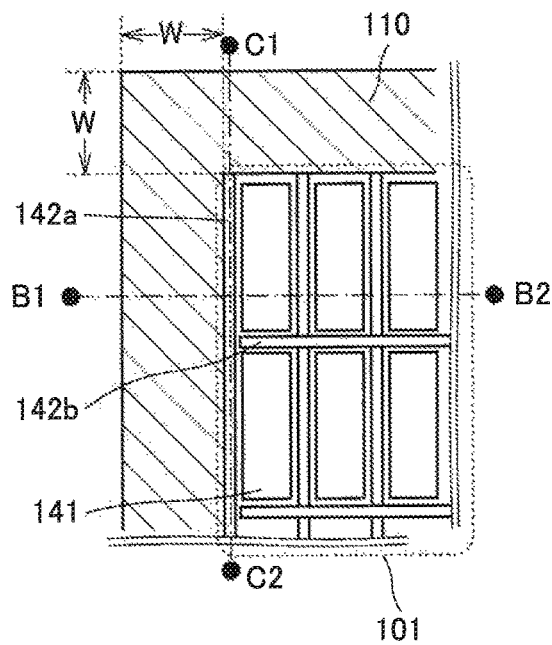
FIGS. 15A to 15C illustrate an example of a display panel.
Figure 15B:
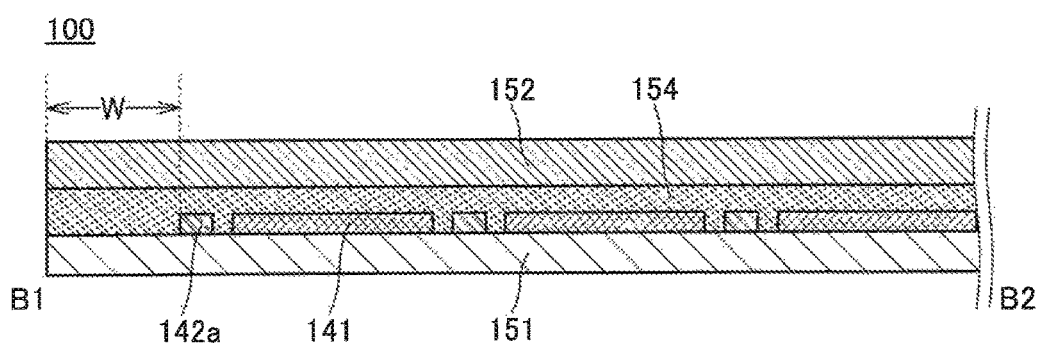

FIG. 15A is an example of a top view in which the region Q is enlarged; the position of the wiring 142a is different from that in FIG. 14B. FIG. 15B is a cross-sectional view taken along line B1-B2 in FIG. 15A, and FIG. 15C is a cross sectional view taken along line C1-C2 in FIG. 15A.

Figure 15C:
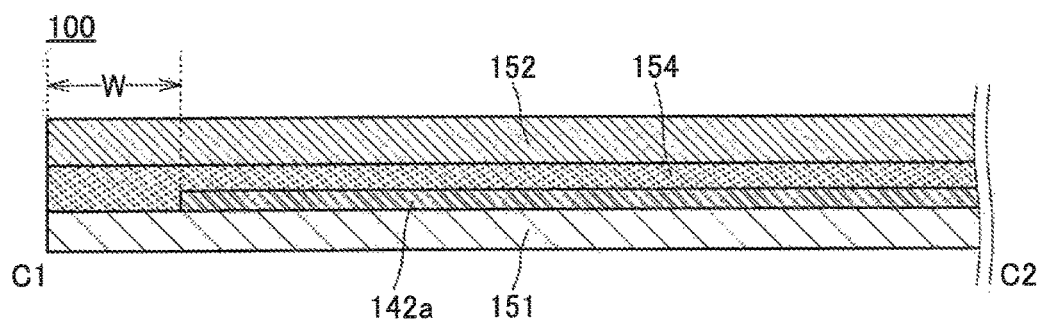

As illustrated in FIGS. 15A to 15C, in the case where the wiring 142a is positioned closest to the end of the display region 101, the width W of the region 110 that transmits visible light is the distance between the end portion of the substrate 151 or the substrate 152 and the end portion of the wiring 142a. In the case where the wiring 142a transmits visible light, the region 110 that transmits visible light may include a region where the wiring 142a is provided.

Here, in the case where the density of pixels provided in the display region 101 of the display panel 100 is high, misalignment may occur when two display panels 100 are bonded.

Figure 16A:
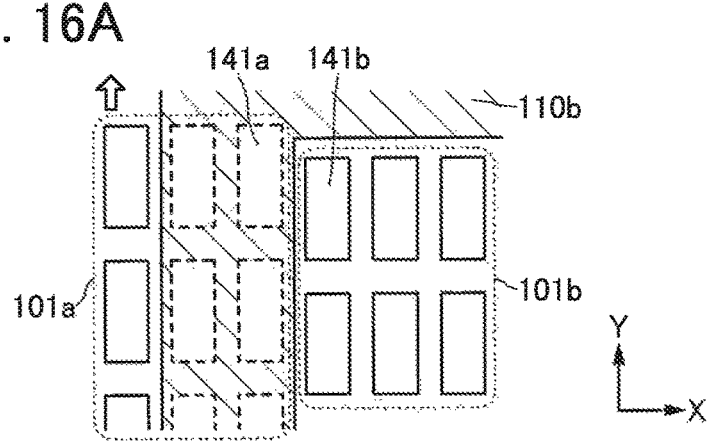
FIGS. 16A to 16C each illustrate an example of a display device.
Figure 16B:
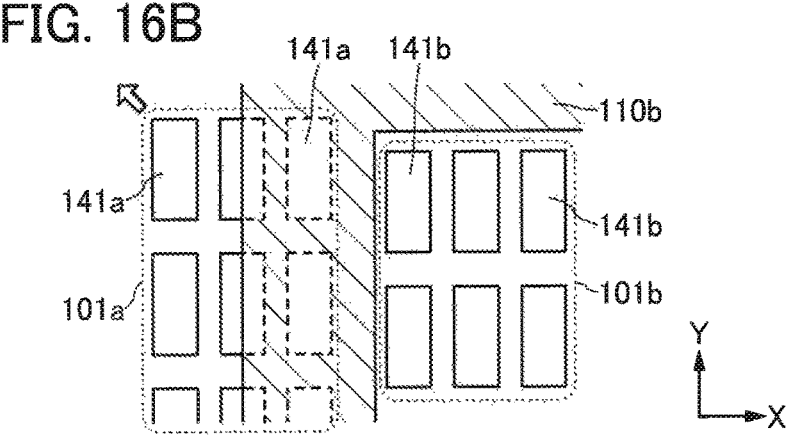
Figure 16C:
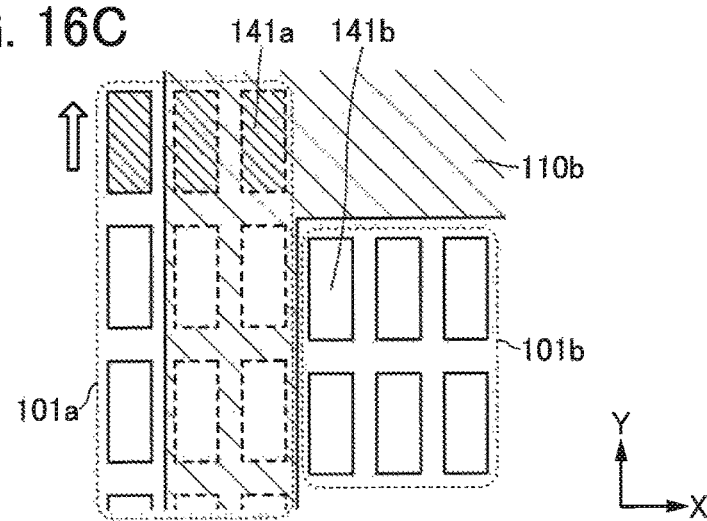

FIGS. 16A to 16C each illustrate a positional relation between the display region 101a of the display panel 100a provided on the lower side and the display region 101b of the display panel 100b provided on the upper side, seen from the display surface side. FIGS. 16A to 16C each illustrate the vicinities of the corner portions of the display regions 101a and 101b. Part of the display region 101a is covered with the region 110b that transmits visible light.

FIG. 16A illustrates the case where adjacent pixels 141a and 141b are relatively deviated in one direction (Y direction). The arrow in the drawing denotes a direction in which the display panel 100a is deviated from the display panel 100b.

FIG. 16B shows an example in which the adjacent pixels 141a and 141b are relatively deviated in a longitudinal direction and a lateral direction (X direction and Y direction).

In the examples illustrated in FIGS. 16A and 16B, the deviation in the lateral direction or the longitudinal direction is smaller than the width of one pixel. In such a case, image data corresponding to an image to be displayed on at least one of the display region 101a and the display region 101b is corrected on the basis of the deviation, whereby the display quality can be maintained. Specifically, when the deviation makes the distance between pixels smaller, the correction is preferably made such that the gray scale (luminance) of the pixels is decreased. In contrast, when the deviation makes the distance between pixels larger, the correction is preferably made such that the gray scale (luminance) of the pixels is increased. In the case where the display region 101b overlaps over the display region 101a by more than the width of one pixel, image data is preferably corrected to shift by one column such that the pixel 141a positioned under the pixel 141b is not driven.

FIG. 16C illustrates an example in which the pixels 141a and 141b, which should be adjacent to each other, are relatively deviated in one direction (Y direction) by a length of more than one pixel. When the deviation of more than one pixel occurs, the pixels are preferably driven so that projecting pixels (pixels which are hatched) are not displayed. Note that the same applies to the case where the deviation direction is the X direction.

When the plurality of display panels 100 are bonded, in order to suppress misalignment, each of the display panels 100 is preferably provided with an alignment marker or the like. Alternatively, a projection and a depression may be formed on the surfaces of the display panels 100, and the projection and the depression may fit together in a region where two display panels 100 overlap with each other.

In consideration of alignment accuracy, it is preferable that pixels more than the pixels to be used be placed in advance in the display region 101 of the display panel 100. For example, it is preferable that one or more, preferably three or more, and further preferably five or more extra pixel columns along either one or both of a scan line and a signal line be provided in addition to the pixel columns used for display.

As described above, the image processing device of one embodiment of the present invention can perform image processing to correct the gray scale, which is included in image data, at the coordinates corresponding to at least one of the portion seen through the region that transmits visible light in the display region of the display panel and the portion seen not through the region.

As a result, a difference in luminance between the portion seen through the region that transmits visible light and the portion seen not through the region can be suppressed. Thus, a large display system in which a joint between the display panels is hardly recognized and display unevenness or luminance unevenness is suppressed can be obtained.

This embodiment can be combined with any other embodiment as appropriate.

Embodiment 2

In this embodiment, light-emitting panels, each of which is an example of a display panel that can be used for the display system of one embodiment of the present invention, will be described with reference to drawings.

Although a light-emitting panel including an organic EL element will be mainly described as an example in this embodiment, a panel that can be used for the display system of one embodiment of the present invention is not limited to this example.

Specific Example 1

FIG. 17A is a plan view of a light-emitting panel, and FIG. 17C is an example of a cross-sectional view taken along dashed-dotted line A1-A2 in FIG. 17A. FIG. 17C also illustrates an example of a cross-sectional view of the region 110 that transmits visible light. The light-emitting panel described in Specific Example 1 is a top-emission light-emitting panel using a color filter method. In this embodiment, the light-emitting panel can have a structure in which sub-pixels of three colors of red (R), green (G), and blue (B) express one color, a structure in which sub-pixels of four colors of R, G, B, and white (W) express one color, a structure in which sub-pixels of four colors of R, G, B, and yellow (Y) express one color, or the like. There is no particular limitation on the color element and colors other than R, G, B, W, and Y may be used. For example, cyan, magenta, or the like may be used.

The light-emitting panel illustrated in FIG. 17A includes the region 110 that transmits visible light, a light-emitting portion 804, a driver circuit portion 806, and an FPC 808. The region 110 that transmits visible light is adjacent to the light-emitting portion 804, and is placed along two sides of the light-emitting portion 804.

The light-emitting panel illustrated in FIG. 17C includes a substrate 701, a bonding layer 703, an insulating layer 705, a plurality of transistors, a conductive layer 857, an insulating layer 815, an insulating layer 817, a plurality of light-emitting elements, an insulating layer 821, a bonding layer 822, a coloring layer 845, a light-blocking layer 847, an insulating layer 715, a bonding layer 713, and a substrate 711. The bonding layer 822, the insulating layer 715, the bonding layer 713, and the substrate 711 transmit visible light. The light-emitting elements and the transistors included in the light-emitting portion 804 and the driver circuit portion 806 are sealed with the substrate 701, the substrate 711, and the bonding layer 822.

The light-emitting portion 804 includes a transistor 820 and a light-emitting element 830 over the substrate 701 with the bonding layer 703 and the insulating layer 705 provided therebetween. The light-emitting element 830 includes a lower electrode 831 over the insulating layer 817, an EL layer 833 over the lower electrode 831, and an upper electrode 835 over the EL layer 833. The lower electrode 831 is electrically connected to a source electrode or a drain electrode of the transistor 820. An end portion of the lower electrode 831 is covered with the insulating layer 821. The lower electrode 831 preferably reflects visible light. The upper electrode 835 transmits visible light.

The light-emitting portion 804 also includes the coloring layer 845 overlapping with the light-emitting element 830 and the light-blocking layer 847 overlapping with the insulating layer 821. The space between the light-emitting element 830 and the coloring layer 845 is filled with the bonding layer 822.

The insulating layer 815 has an effect of suppressing diffusion of impurities into semiconductors included in the transistors. As the insulating layer 817, an insulating layer having a planarization function is preferably selected in order to reduce surface unevenness due to the transistors.

The driver circuit portion 806 includes a plurality of transistors over the substrate 701 with the bonding layer 703 and the insulating layer 705 provided therebetween. In FIG. 17C, one of the transistors included in the driver circuit portion 806 is illustrated.

The insulating layer 705 and the substrate 701 are attached to each other with the bonding layer 703. The insulating layer 715 and the substrate 711 are attached to each other with the bonding layer 713. At least one of the insulating layer 705 and the insulating layer 715 is preferably highly resistant to moisture, in which case impurities such as water can be prevented from entering the light-emitting element 830 and the transistor 820, leading to higher reliability of the light-emitting panel.

The conductive layer 857 is electrically connected to an external input terminal through which a signal (e.g., a video signal, a clock signal, a start signal, or a reset signal) or a potential from the outside is transmitted to the driver circuit portion 806. Here, an example is described in which the FPC 808 is provided as the external input terminal. To prevent an increase in the number of fabrication steps, the conductive layer 857 is preferably formed using the same material and step as any of the electrodes and the wirings in the light-emitting portion and the driver circuit portion. Described here is an example in which the conductive layer 857 is formed using the same material and step as the electrode included in the transistor 820.

In the light-emitting panel illustrated in FIG. 17C, the FPC 808 is positioned over the substrate 711. A connector 825 is connected to the conductive layer 857 through an opening provided in the substrate 711, the bonding layer 713, the insulating layer 715, the bonding layer 822, the insulating layer 817, and the insulating layer 815. The connector 825 is also connected to the FPC 808. The FPC 808 and the conductive layer 857 are electrically connected to each other via the connector 825. In the case where the conductive layer 857 overlaps with the substrate 711, an opening in the substrate 711 (or the use of a substrate having an opening portion) allows the connector 825 to be electrically connected to the conductive layer 857 and the FPC 808.

Figure 18:
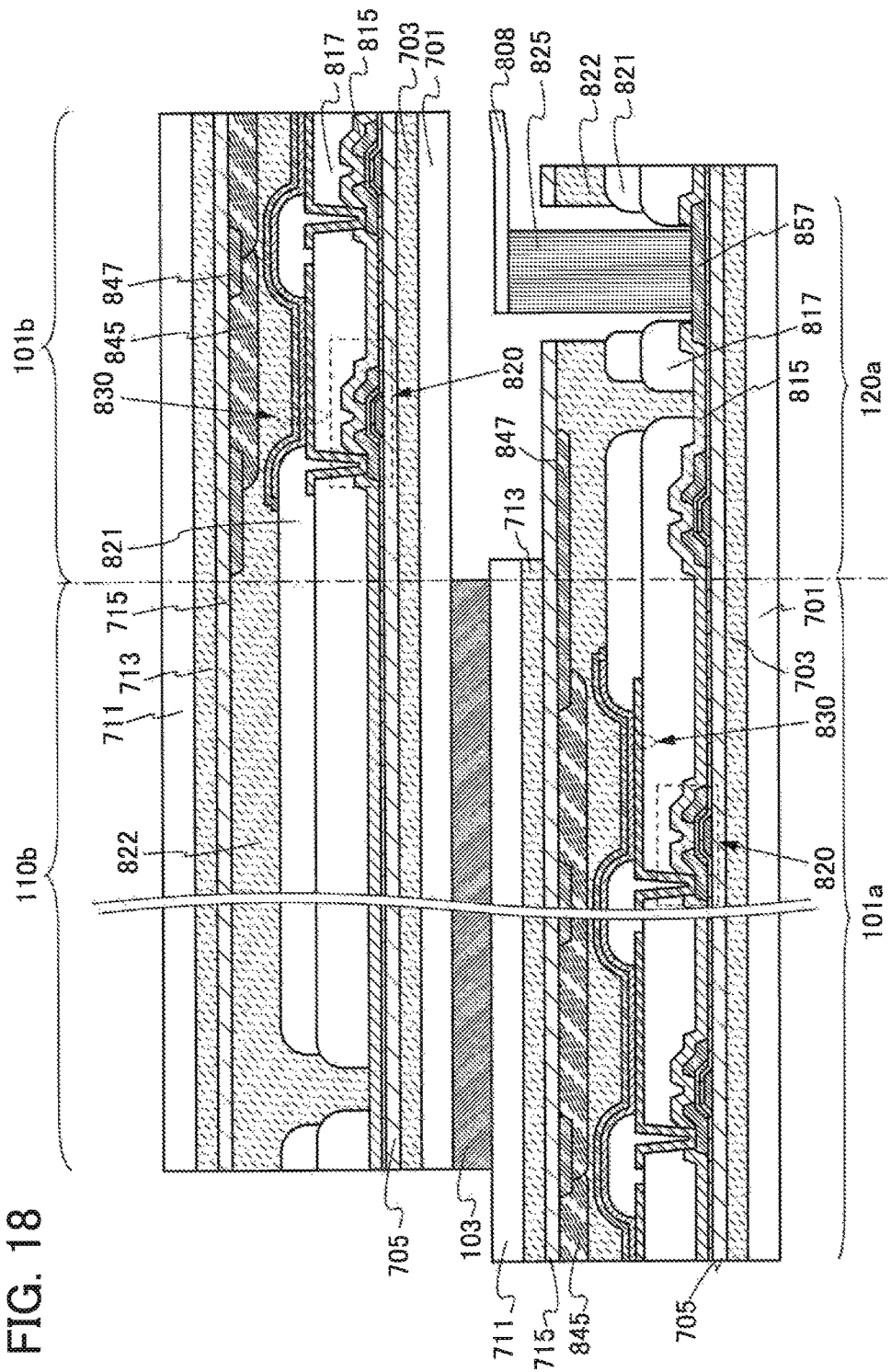
FIG. 18 illustrates an example of a display device.

FIG. 18 is an example of a cross-sectional view of a display device including two light-emitting panels illustrated in FIG. 17B that overlap with each other. FIG. 18 illustrates the display region 101*a* (corresponding to the light-emitting portion 804 in FIG. 17B) and the region 120*a* that blocks visible light (corresponding to the driver circuit portion 806 and the like in FIG. 17B) of a lower light-emitting panel, and the display region 101*b* (corresponding to the light-emitting portion 804 in FIG. 17B) and the region 110*b* that transmits visible light (corresponding to the region 110 that transmits visible light in FIG. 17B) of an upper light-emitting panel.

In the display device illustrated in FIG. 18, the light-emitting panel positioned on the display surface side (upper side) includes the region 110*b* that transmits visible light adjacent to the display region 101*b*. The display region 101*a* of the lower light-emitting panel and the region 110*b* that transmits visible light of the upper light-emitting panel overlap with each other. Thus, a non-display region that appears between the display regions of the two light-emitting panels overlapping with each other can be reduced or even removed. Accordingly, a large display device in which a joint between light-emitting panels is hardly recognized by a user can be obtained.

The display device illustrated in FIG. 18 includes a light-transmitting layer 103 having a refractive index higher than that of air and transmitting visible light between the display region 101*a* and the region 110*b* that transmits visible light. In that case, air can be prevented from entering between the display region 101*a* and the region 110*b* that transmits visible light, so that the interface reflection due to a difference in refractive index can be reduced. In addition, display unevenness or luminance unevenness of the display device can be suppressed.

The light-transmitting layer 103 may overlap with the entire surface of the substrate 711 of the lower light-emitting panel or that of the substrate 701 of the upper light-emitting panel, or may overlap with only the display region 101*a* and the region 110*b* that transmits visible light. In addition, the substrate 711 and the light-transmitting layer 103 may be included in the region 120*a* that blocks visible light.

The stack of the substrate 701 of the upper light-emitting panel and the light-transmitting layer 103 can be formed using, for example, an attachment film having a stack of an attachment layer and a base material.

Specific Example 2

FIG. 17B is a plan view of a light-emitting panel, and FIG. 19A is an example of a cross-sectional view taken along dashed-dotted line A3-A4 in FIG. 17B. The light-emitting panel described in Specific Example 2 is a top-emission light-emitting panel using a color filter method, which is different from that described in Specific Example 1. Portions different from those in Specific Example 1 will be described in detail here and the descriptions of portions common to those in Specific Example 1 will be omitted.

FIG. 17B illustrates an example where the region 110 that transmits visible light is provided along three sides of the light-emitting panel. The region 110 that transmits visible light is adjacent to the light-emitting portion 804 on two sides among the three sides.

The light-emitting panel illustrated in FIG. 19A is different from that in FIG. 17C in the following respects.

The light-emitting panel illustrated in FIG. 19A includes insulating layers 817*a* and 817*b* and a conductive layer 856 over the insulating layer 817*a*. The source electrode or the drain electrode of the transistor 820 and the lower electrode of the light-emitting element 830 are electrically connected to each other through the conductive layer 856.

The light-emitting panel illustrated in FIG. 19A includes a spacer 823 over the insulating layer 821. The spacer 823 can adjust the distance between the substrate 701 and the substrate 711.

The light-emitting panel illustrated in FIG. 19A includes an overcoat 849 covering the coloring layer 845 and the light-blocking layer 847. The space between the light-emitting element 830 and the overcoat 849 is filled with the bonding layer 822.

In the light-emitting panel illustrated in FIG. 19A, the substrate 701 differs from the substrate 711 in size. The FPC 808 is located over the insulating layer 715 and does not overlap with the substrate 711. The connector 825 is connected to the conductive layer 857 through an opening provided in the insulating layer 715, the bonding layer 822, the insulating layer 817*a*, the insulating layer 817*b*, and the insulating layer 815. Since no opening needs to be provided in the substrate 711, there is no limitation on the material of the substrate 711.

Note that as illustrated in FIG. 19B, the light-emitting element 830 may include an optical adjustment layer 832 between the lower electrode 831 and the EL layer 833. A light-transmitting conductive material is preferably used for the optical adjustment layer 832. Owing to the combination of a color filter (the coloring layer) and a microcavity structure (the optical adjustment layer), light with high color purity can be extracted from the display system of one embodiment of the present invention. The thickness of the optical adjustment layer is varied depending on the emission color of the sub-pixel.

Specific Example 3

FIG. 17B is a plan view of a light-emitting panel, and FIG. 19C is another example of a cross-sectional view taken along dashed-dotted line A3-A4 in FIG. 17B. The light-emitting panel described in Specific Example 3 is a top-emission light-emitting panel using a separate coloring method.

The light-emitting panel in FIG. 19C includes the substrate 701, the bonding layer 703, the insulating layer 705, a plurality of transistors, the conductive layer 857, the insulating layer 815, the insulating layer 817, a plurality of light-emitting elements, the insulating layer 821, the spacer 823, the bonding layer 822, and the substrate 711. The bonding layer 822 and the substrate 711 transmit visible light.

In the light-emitting panel illustrated in FIG. 19C, the connector 825 is positioned over the insulating layer 815. The connector 825 is connected to the conductive layer 857 through an opening provided in the insulating layer 815. The connector 825 is also connected to the FPC 808. The FPC 808 and the conductive layer 857 are electrically connected to each other via the connector 825.

Specific Example 4

Figures 20A, 20B:
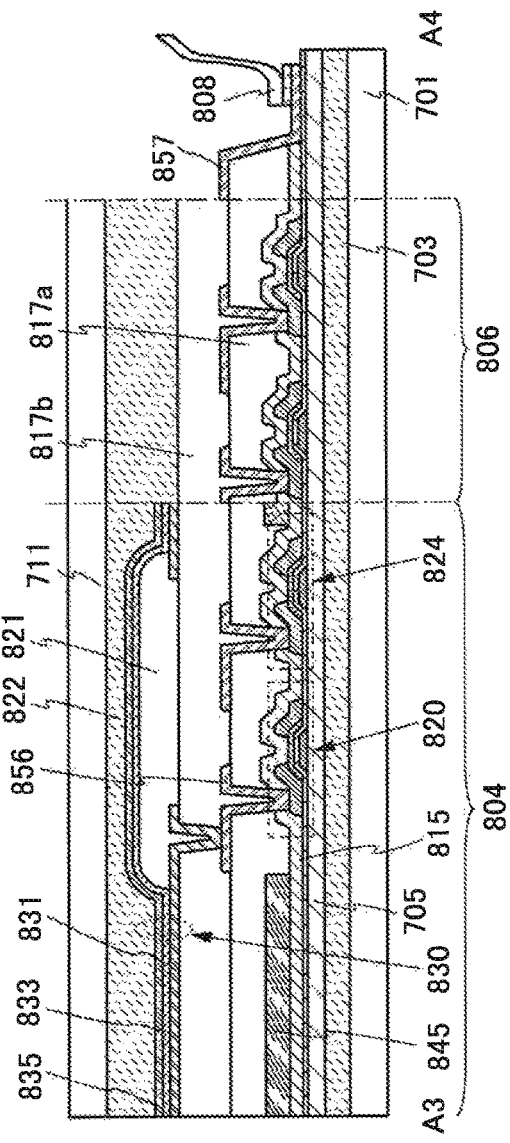
FIGS. 20A and 20B each illustrate an example of a light-emitting panel.

FIG. 17B is a plan view of a light-emitting panel, and FIG. 20A is another example of a cross-sectional view taken along dashed-dotted line A3-A4 in FIG. 17B. The light-emitting panel described in Specific Example 4 is a bottom-emission light-emitting panel using a color filter method.

The light-emitting panel in FIG. 20A includes the substrate 701, the bonding layer 703, the insulating layer 705, a plurality of transistors, the conductive layer 857, the insulating layer 815, the coloring layer 845, the insulating layer 817a, the insulating layer 817b, the conductive layer 856, a plurality of light-emitting elements, the insulating layer 821, the bonding layer 822, and the substrate 711. The substrate 701, the bonding layer 703, the insulating layer 705, the insulating layer 815, the insulating layer 817a, and the insulating layer 817b transmit visible light.

The light-emitting portion 804 includes the transistor 820, a transistor 824, and the light-emitting element 830 over the substrate 701 with the bonding layer 703 and the insulating layer 705 provided therebetween. The light-emitting element 830 includes the lower electrode 831 over the insulating layer 817b, the EL layer 833 over the lower electrode 831, and the upper electrode 835 over the EL layer 833. The lower electrode 831 is electrically connected to a source electrode or a drain electrode of the transistor 820. An end portion of the lower electrode 831 is covered with the insulating layer 821. The upper electrode 835 preferably reflects visible light. The lower electrode 831 transmits visible light. The coloring layer 845 that overlaps with the light-emitting element 830 can be provided anywhere; for example, the coloring layer 845 can be provided between the insulating layers 817a and 817b or between the insulating layers 815 and 817a.

The driver circuit portion 806 includes a plurality of transistors over the substrate 701 with the bonding layer 703 and the insulating layer 705 provided therebetween. In FIG. 20A, two of the transistors included in the driver circuit portion 806 are illustrated.

The insulating layer 705 and the substrate 701 are attached to each other with the bonding layer 703. The insulating layer 705 is preferably highly resistant to moisture, in which case impurities such as water can be prevented from entering the light-emitting element 830, the transistor 820, and the transistor 824, leading to higher reliability of the light-emitting panel.

The conductive layer 857 is electrically connected to an external input terminal through which a signal or a potential from the outside is transmitted to the driver circuit portion 806. Described here is an example in which the FPC 808 is provided as the external input terminal and the conductive layer 857 is formed using the same material and the same step as the conductive layer 856.

Specific Example 5

FIG. 20B illustrates an example of a light-emitting panel that is different from those in Specific Examples 1 to 4.

The light-emitting panel in FIG. 20B includes the substrate 701, the bonding layer 703, the insulating layer 705, a conductive layer 814, a conductive layer 857a, a conductive layer 857b, the light-emitting element 830, the insulating layer 821, the bonding layer 822, and the substrate 711.

The conductive layer 857a and the conductive layer 857b, which are external connection electrodes of the light-emitting panel, can each be electrically connected to an FPC or the like.

The light-emitting element 830 includes the lower electrode 831, the EL layer 833, and the upper electrode 835. An end portion of the lower electrode 831 is covered with the insulating layer 821. The light-emitting element 830 is a bottom-emission, top-emission, or dual-emission light-emitting element. An electrode, a substrate, an insulating layer, and the like on the light extraction side transmit visible light. The conductive layer 814 is electrically connected to the lower electrode 831.

The substrate through which light is extracted may have, as a light extraction structure, a hemispherical lens, a micro lens array, a film provided with an uneven surface structure, a light diffusing film, or the like. For example, a substrate having the light extraction structure can be formed by bonding the above lens or film to a resin substrate with an adhesive or the like having substantially the same refractive index as the substrate or the lens or film.

The conductive layer 814 is preferably, though not necessarily, provided because voltage drop due to the resistance of the lower electrode 831 can be prevented. For a similar purpose, a conductive layer electrically connected to the upper electrode 835 may be provided over the insulating layer 821, the EL layer 833, the upper electrode 835, or the like.

The conductive layer 814 can be formed to have a single layer or a stacked layer using a material selected from copper, titanium, tantalum, tungsten, molybdenum, chromium, neodymium, scandium, nickel, and aluminum; an alloy material containing any of these materials as its main component; or the like. The thickness of the conductive layer 814 can be, for example, greater than or equal to 0.1 μm and less than or equal to 3 μm, and preferably greater than or equal to 0.1 μm and less than or equal to 0.5 μm.

<Examples of Materials>

Next, materials and the like that can be used for a light-emitting panel are described. Note that description on the components already described in this specification is omitted in some cases.

For each of the substrates, a material such as glass, quartz, an organic resin, a metal, or an alloy can be used. The substrate on the side from which light from the light-emitting element is extracted is formed using a material which transmits the light.

It is particularly preferable to use a flexible substrate. For example, an organic resin; a glass material, a metal, or an alloy that is thin enough to have flexibility; or the like can be used.

An organic resin, which has a specific gravity smaller than that of glass, is preferably used for the flexible substrate, in which case the light-emitting panel can be more lightweight compared with the case where glass is used.

The substrates are preferred to be formed using a material with high toughness. In that case, a light-emitting panel with high impact resistance that is less likely to be broken can be provided. For example, when an organic resin substrate, a thin metal substrate, or a thin alloy substrate is used, the light-emitting panel can be lighter and more robust than the case where a glass substrate is used.

A metal material and an alloy material, which have high thermal conductivity, are each preferable because they can easily conduct heat to the whole substrate and accordingly can prevent a local temperature rise in the light-emitting panel. The thickness of a substrate using a metal material or an alloy material is preferably greater than or equal to 10 μm and less than or equal to 200 μm, and further preferably greater than or equal to 20 μm and less than or equal to 50 μm.

There is no particular limitation on a material of the metal substrate or the alloy substrate, but it is preferable to use, for example, aluminum, copper, nickel, a metal alloy such as an aluminum alloy or stainless steel.

Furthermore, when a material with high thermal emissivity is used for the substrate, the surface temperature of the light-emitting panel can be prevented from rising, leading to prevention of breakage or a decrease in reliability of the light-emitting panel. For example, the substrate may have a stacked-layer structure of a metal substrate and a layer with high thermal emissivity (e.g., the layer can be formed using a metal oxide or a ceramic material).

Examples of materials having flexibility and a light-transmitting property include a material used for the protective substrate 132 described in Embodiment 1.

The flexible substrate may have a stacked-layer structure in which a hard coat layer (such as a silicon nitride layer) by which a surface of a light-emitting device is protected from damage, a layer (such as an aramid resin layer) which can disperse pressure, or the like is stacked over a layer of any of the above-mentioned materials.

The flexible substrate may be formed by stacking a plurality of layers. When a glass layer is used, a barrier property against water or oxygen can be improved and thus a reliable light-emitting panel can be provided.

A flexible substrate in which a glass layer, a bonding layer, and an organic resin layer are stacked from the side closer to a light-emitting element is preferably used. The thickness of the glass layer is greater than or equal to 20 μm and less than or equal to 200 μm, and preferably greater than or equal to 25 μm and less than or equal to 100 μm. With such a thickness, the glass layer can have both a high barrier property against water or oxygen and a high flexibility. The thickness of the organic resin layer is greater than or equal to 10 μm and less than or equal to 200 μm, and preferably greater than or equal to 20 μm and less than or equal to 50 μm. Providing such organic resin layer can suppress occurrence of a crack or a break in the glass layer and improve mechanical strength. With the substrate that includes such a composite material of a glass material and an organic resin, a highly reliable and flexible light-emitting panel can be provided.

Any of a variety of curable adhesives, e.g., light curable adhesives such as a UV curable adhesive, a reactive curable adhesive, a thermal curable adhesive, and an anaerobic adhesive can be used for the bonding layer. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Further alternatively, an adhesive sheet or the like may be used.

Furthermore, the resin may include a drying agent. For example, a substance that adsorbs moisture by chemical adsorption, such as oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent an impurity such as moisture from entering the functional element, thereby improving the reliability of the light-emitting panel.

In addition, it is preferable to mix a filler with a high refractive index or light-scattering member into the resin, in which case the efficiency of light extraction from the light-emitting element can be improved. For example, titanium oxide, barium oxide, zeolite, zirconium, or the like can be used.

An insulating film with high resistance to moisture is preferably used for each of the insulating layer 705 and the insulating layer 715. Alternatively, each of the insulating layer 705 and the insulating layer 715 preferably has a function of preventing diffusion of impurities to a light-emitting element.

As an insulating film having an excellent moisture-resistant property, a film containing nitrogen and silicon (e.g., a silicon nitride film, a silicon nitride oxide film, or the like), a film containing nitrogen and aluminum (e.g., an aluminum nitride film or the like), or the like can be used. Alternatively, a silicon oxide film, a silicon oxynitride film, an aluminum oxide film, or the like can be used.

For example, the moisture vapor transmission rate of the insulating film highly resistant to moisture is lower than or equal to $1\times10^{-5}$ [g/(m$^2$.day)], preferably lower than or equal to $1\times10^{-6}$ [g/(m$^2$.day)], further preferably lower than or equal to $1\times10^{-7}$ [g/(m$^2$.day)], and still further preferably lower than or equal to $1\times10^{-8}$ [g/(m$^2$.day)].

In the light-emitting panel, it is necessary that at least one of the insulating layers 705 and 715 transmit light emitted from the light-emitting element. One of the insulating layers 705 and 715, which transmits light emitted from the light-emitting element, preferably has higher average transmittance of light having a wavelength of greater than or equal to 400 nm and less than or equal to 800 nm than the other.

The insulating layers 705 and 715 each preferably include oxygen, nitrogen, and silicon. The insulating layers 705 and 715 each preferably include, for example, silicon oxynitride.

Moreover, the insulating layers 705 and 715 each preferably include silicon nitride or silicon nitride oxide. It is preferable that the insulating layers 705 and 715 be each formed using a silicon oxynitride film and a silicon nitride film, which are in contact with each other. The silicon oxynitride film and the silicon nitride film are alternately stacked so that antiphase interference occurs more often in a visible region, whereby the stack can have higher transmittance of light in the visible region.

There is no particular limitation on the structure of the transistor in the light-emitting panel. For example, a forward staggered transistor or an inverted staggered transistor may be used. Furthermore, a top-gate transistor or a bottom-gate transistor may be used. There is no particular limitation on a semiconductor material used for the transistors, and for example, silicon, germanium, or an organic semiconductor can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a poly crystalline semiconductor, a single-crystal semiconductor, or a semiconductor partly including crystal regions) may be used. It is preferable that a semiconductor having crystallinity be used, in which case deterioration of the transistor characteristics can be inhibited.

In one embodiment of the present invention, a c-axis aligned crystalline oxide semiconductor (CAAC-OS) is preferably used as the semiconductor material used for the transistors. Unlike amorphous semiconductor, the CAAC-OS has few defect states, so that the reliability of the transistor can be improved. Moreover, since the CAAC-OS does not have a grain boundary, a stable and uniform film can be formed over a large area, and stress that is caused by bending a flexible light-emitting device does not easily make a crack in a CAAC-OS film.

A CAAC-OS is a crystalline oxide semiconductor having c-axis alignment of crystals in a direction substantially perpendicular to the film surface. It has been found that oxide semiconductors have a variety of crystal structures other than a single-crystal structure. An example of such structures is a nano-crystal (nc) structure, which is an aggregate of nanoscale microcrystals. The crystallinity of a CAAC-OS structure is lower than that of a single-crystal structure and higher than that of an nc structure.

For stable characteristics of the transistor, a base film is preferably provided. The base film can be formed to have a single-layer structure or a stacked-layer structure using an inorganic insulating film such as a silicon oxide film, a silicon nitride film, a silicon oxynitride film, or a silicon nitride oxide film. The base film can be formed by a sputtering method, a chemical vapor deposition (CVD) method (e.g., a plasma CVD method, a thermal CVD method, or a metal organic CVD (MOCVD) method), an atomic layer deposition (ALD) method, a coating method, a printing method, or the like. Note that the base film is not necessarily provided. In each of the above structure examples, the insulating layer 705 can serve as a base film of the transistor.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may have any of a top emission structure, a bottom emission structure, and a dual emission structure. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide (ZnO), or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; a nitride of any of these metal materials (e.g., titanium nitride); or the like can be formed thin so as to have a light-transmitting property. Alternatively, a stacked film of any of the above materials can be used as the conductive layer. For example, a stacked film of ITO and an alloy of silver and magnesium is preferably used, in which case conductivity can be increased. Further alternatively, graphene or the like may be used.

For the conductive film that reflects visible light, for example, a metal material, such as aluminum, gold, platinum, silver, nickel, tungsten, chromium, molybdenum, iron, cobalt, copper, or palladium or an alloy including any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, an alloy of aluminum and neodymium, or an alloy of aluminum, nickel, and lanthanum (Al—Ni—La), or an alloy containing silver such as an alloy of silver and copper, an alloy of silver, palladium, and copper (Ag—Pd—Cu, also referred to as APC), or an alloy of silver and magnesium can be used for the conductive film. An alloy of silver and copper is preferable because of its high heat resistance. Moreover, a metal film or a metal oxide film is stacked on an aluminum alloy film, whereby oxidation of the aluminum alloy film can be suppressed. Examples of a material for the metal film or the metal oxide film are titanium and titanium oxide. Alternatively, the conductive film having a property of transmitting visible light and a film containing any of the above metal materials may be stacked. For example, a stacked film of silver and ITO or a stacked film of an alloy of silver and magnesium and ITO can be used.

The electrodes may be formed separately by an evaporation method or a sputtering method. Alternatively, a discharging method such as an ink-jet method, a printing method such as a screen printing method, or a plating method can be used.

When a voltage higher than the threshold voltage of the light-emitting element is applied between the lower electrode 831 and the upper electrode 835, holes are injected to the EL layer 833 from the anode side and electrons are injected to the EL layer 833 from the cathode side. The injected electrons and holes are recombined in the EL layer 833 and a light-emitting substance contained in the EL layer 833 emits light.

The EL layer 833 includes at least a light-emitting layer. In addition to the light-emitting layer, the EL layer 833 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 833, either a low molecular compound or a high molecular compound can be used, and an inorganic compound may also be used. Each of the layers included in the EL layer 833 can be formed by any of the following methods: an evaporation method (including a vacuum evaporation method), a transfer method, a printing method, an inkjet method, a coating method, and the like.

The light-emitting element 830 may contain two or more kinds of light-emitting substances. Thus, for example, a light-emitting element that emits white light can be achieved. For example, a white emission can be obtained by selecting light-emitting substances so that two or more kinds of light-emitting substances emit light of complementary colors. A light-emitting substance that emits red (R) light, green (G) light, blue (B) light, yellow (Y) light, or orange (O) light or a light-emitting substance that emits light containing spectral components of two or more of R light, G light, and B light can be used, for example. A light-emitting substance that emits blue light and a light-emitting substance that emits yellow light may be used, for example. At this time, the emission spectrum of the light-emitting substance that emits yellow light preferably contains spectral components of G light and R light. The emission spectrum of the light-emitting element 830 preferably has two or more peaks in the wavelength range in a visible region (e.g., greater than or equal to 350 nm and less than or equal to 750 nm or greater than or equal to 400 nm and less than or equal to 800 nm).

The EL layer 833 may include a plurality of light-emitting layers. In the EL layer 833, the plurality of light-emitting layers may be stacked in contact with one another or may be stacked with a separation layer provided therebetween. The separation layer may be provided between a fluorescent layer and a phosphorescent layer, for example.

The separation layer can be provided, for example, to prevent energy transfer by the Dexter mechanism (particularly triplet energy transfer) from a phosphorescent material or the like in an excited state which is generated in the phosphorescent layer to a fluorescent material or the like in the fluorescent layer. The thickness of the separation layer may be several nanometers.

Specifically, the thickness of the separation layer may be greater than or equal to 0.1 nm and less than or equal to 20 nm, greater than or equal to 1 nm and less than or equal to 10 nm, or greater than or equal to 1 nm and less than or equal to 5 nm. The separation layer contains a single material (preferably, a bipolar substance) or a plurality of materials (preferably, a hole-transport material and an electron-transport material).

The separation layer may be formed using a material contained in a light-emitting layer in contact with the separation layer. This facilitates the manufacture of the light-emitting element and reduces the drive voltage. For example, in the case where the phosphorescent layer includes a host material, an assist material, and a phosphorescent material (guest material), the separation layer may be formed using the host material and the assist material. In other words, the separation layer includes a region not containing the phosphorescent material and the phosphorescent layer includes a region containing the phosphorescent material in the above structure. Accordingly, the separation layer and the phosphorescent layer can be evaporated separately depending on whether a phosphorescent material is used or not. With such a structure, the separation layer and the phosphorescent layer can be formed in the same chamber. Thus, the manufacturing costs can be reduced.

Moreover, the light-emitting element 830 may be a single element including one EL layer or a tandem element in which EL layers are stacked with a charge generation layer provided therebetween.

The light-emitting element is preferably provided between a pair of insulating films having an excellent moisture-resistant property. In that case, entry of an impurity such as moisture into the light-emitting element can be inhibited, leading to inhibition of a decrease in the reliability of the light-emitting device. Specifically, the use of an insulating film having high resistance to moisture for the insulating layer 705 and the insulating layer 715 allows the light-emitting element to be located between a pair of insulating films having high resistance to moisture, by which decrease in reliability of the light-emitting device can be prevented.

As the insulating layer 815, for example, an inorganic insulating film such as a silicon oxide film, a silicon oxynitride film, or an aluminum oxide film can be used. For example, as the insulating layer 817, the insulating layer 817a, and the insulating layer 817b, an organic material such as polyimide, acrylic, polyamide, polyimide amide, or a benzocyclobutene-based resin can be used. Alternatively, a low-dielectric constant material (a low-k material) or the like can be used. Furthermore, each insulating layer may be formed by stacking a plurality of insulating films.

The insulating layer 821 is formed using an organic insulating material or an inorganic insulating material. As the resin, for example, a polyimide resin, a polyamide resin, an acrylic resin, a siloxane resin, an epoxy resin, or a phenol resin can be used. It is particularly preferable that the insulating layer 821 be formed using a photosensitive resin material and an opening portion be formed over the lower electrode 831 so that a side wall of the opening portion is formed as an inclined surface with a continuous curvature.

There is no particular limitation on the method for forming the insulating layer 821. A photolithography method, a sputtering method, an evaporation method, a droplet discharging method (e.g., an inkjet method), a printing method (e.g., a screen printing method or an off-set printing method) can be used, for example.

The spacer 823 can be formed using an inorganic insulating material, an organic insulating material, a metal material, or the like. As the inorganic insulating material or the organic insulating material, for example, a variety of materials that can be used for the insulating layer can be used. As the metal material, titanium, aluminum, or the like can be used. When the spacer 823 containing a conductive material is electrically connected to the upper electrode 835, a potential drop due to the resistance of the upper electrode 835 can be inhibited. The spacer 823 may have either a tapered shape or an inverse tapered shape.

For example, a conductive layer functioning as an electrode or a wiring of the transistor, an auxiliary electrode of the light-emitting element, or the like, which is used for the light-emitting device, can be formed to have a single-layer structure or a stacked-layer structure using any of metal materials such as molybdenum, titanium, chromium, tantalum, tungsten, aluminum, copper, neodymium, and scandium, and an alloy material containing any of these elements. Alternatively, the conductive layer may be formed using a conductive metal oxide. As the conductive metal oxide, indium oxide (e.g., $In_2O_3$), tin oxide (e.g., $SnO_2$), ZnO, ITO, indium zinc oxide (e.g., $In_2O_3$—ZnO), or any of these metal oxide materials in which silicon oxide is contained can be used.

The coloring layer is a colored layer that transmits light in a specific wavelength range. For example, a color filter for transmitting light in a red, green, blue, or yellow wavelength range can be used. Each coloring layer is formed in a desired position with any of various materials by a printing method, an inkjet method, an etching method using a photolithography method, or the like. In a white sub-pixel, a resin such as a transparent resin may be provided so as to overlap with the light-emitting element.

The light-blocking layer is provided between the adjacent coloring layers. The light-blocking layer blocks light emitted from an adjacent light-emitting element to inhibit color mixture between adjacent light-emitting elements. Here, the coloring layer is provided such that its end portion overlaps with the light-blocking layer, whereby light leakage can be reduced. As the light-blocking layer, a material that can block light from the light-emitting element can be used; for example, a black matrix is formed using a resin material containing a metal material, pigment, or dye. Note that it is preferable to provide the light-blocking layer in a region other than the light-emitting portion, such as a driver circuit portion, in which case undesired leakage of guided light or the like can be inhibited.

Furthermore, an overcoat covering the coloring layer and the light-blocking layer may be provided. The overcoat can prevent an impurity and the like contained in the coloring layer from being diffused into the light-emitting element. The overcoat is formed with a material that transmits light emitted from the light-emitting element; for example, an inorganic insulating film such as a silicon nitride film or a silicon oxide film, an organic insulating film such as an acrylic film or a polyimide film can be used, and a stacked-layer structure of an organic insulating film and an inorganic insulating film may be employed.

In the case where upper surfaces of the coloring layer and the light-blocking layer are coated with a material of the bonding layer, a material which has high wettability with respect to the material of the bonding layer is preferably used as the material of the overcoat. For example, an oxide conductive film such as an ITO film or a metal film such as an Ag film which is thin enough to transmit light is preferably used as the overcoat.

As the connector, any of a variety of anisotropic conductive films (ACF), anisotropic conductive pastes (ACP), and the like can be used.

As described above, a variety of panels such as a light-emitting panel, a display panel, and a touch panel can be used in the display system of one embodiment of the present invention.

Examples of the display element include an EL element (an EL element containing organic and inorganic materials, an organic EL element, or an inorganic EL element), an LED (a white LED, a red LED, a green LED, a blue LED, or the like), a liquid crystal element, an electrophoretic element, and a display element using a micro electro mechanical systems (MEMS).

Note that the light-emitting panel of one embodiment of the present invention may be used as a display device or as a lighting panel. For example, it may be used as a light source such as a backlight or a front light, that is, a lighting device for a display panel.

As described above, with an image processing device and the light-emitting panel including a region that transmits visible light described in this embodiment, a large display system in which a seam between light-emitting panels is hardly recognized and display unevenness is suppressed can be obtained.

This embodiment can be combined with any other embodiment as appropriate.

Embodiment 3

In this embodiment, a flexible display panel, which is an example of a display panel that can be used for the display system of one embodiment of the present invention, will be described with reference to drawings. Note that the above description can be referred to for the components of a touch panel, which are similar to those of the light-emitting panel described in Embodiment 2. Although a touch panel including a light-emitting element is described in this embodiment as an example, one embodiment of the present invention is not limited to this example.

Structure Example 1

Figure 21A:
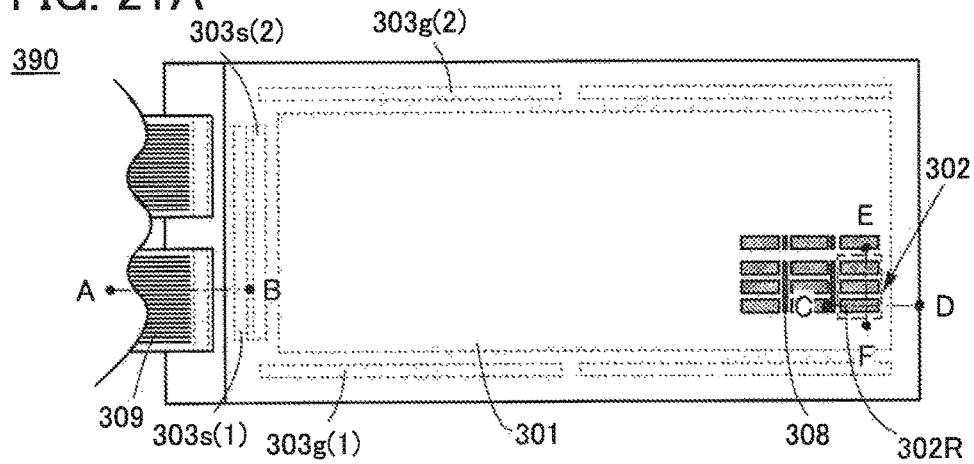
FIGS. 21A to 21C illustrate an example of a touch panel.
Figure 21B:
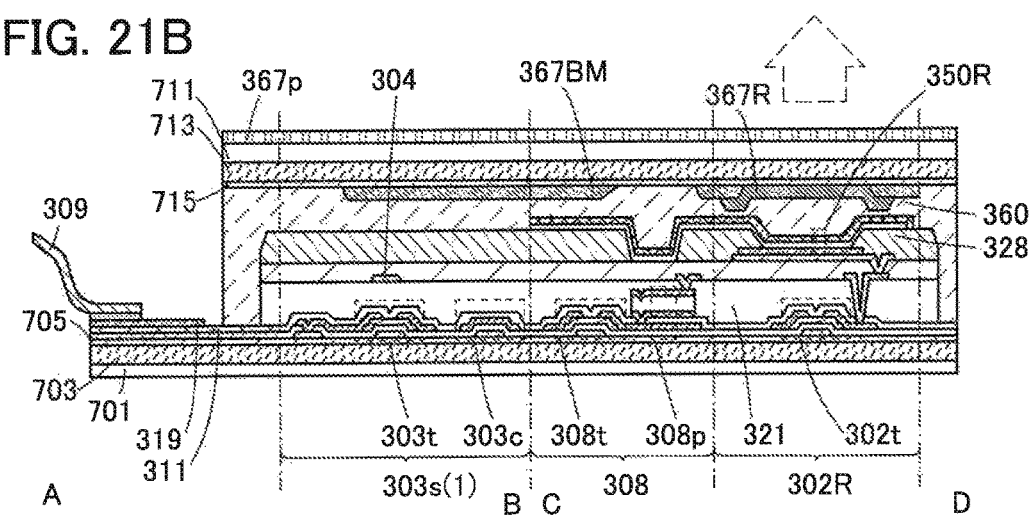
Figure 21C:
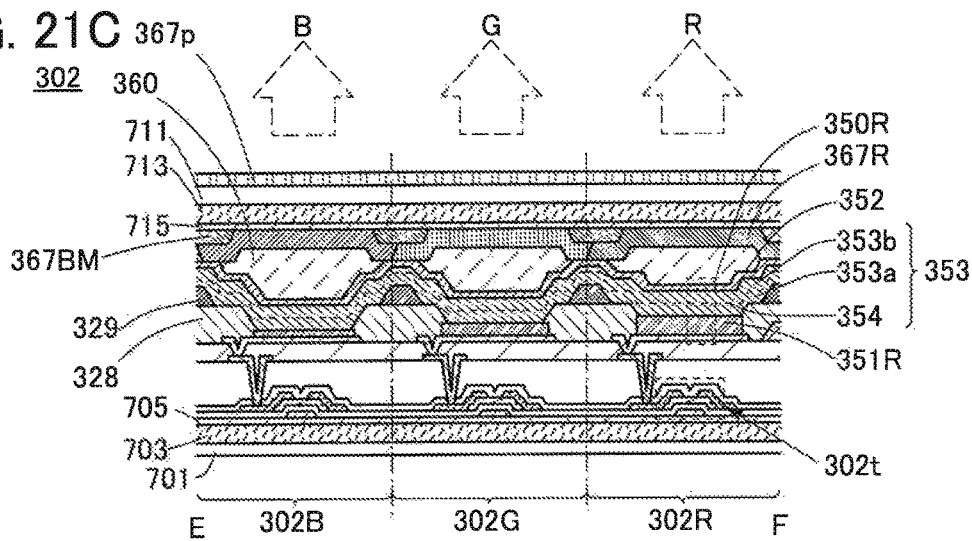

FIG. 21A is a top view of the touch panel. FIG. 21B is a cross-sectional view taken along dashed-dotted line A-B and dashed-dotted line C-D in FIG. 21A. FIG. 21C is a cross-sectional view taken along dashed-dotted line E-F in FIG. 21A.

A touch panel 390 illustrated in FIG. 21A includes a display portion 301 (serving also as an input portion), a scan line driver circuit 303g(1), an imaging pixel driver circuit 303g(2), an image signal line driver circuit 303s(1), and an imaging signal line driver circuit 303s(2).

The display portion 301 includes a plurality of pixels 302 and a plurality of imaging pixels 308.

The pixel 302 includes a plurality of sub-pixels. Each sub-pixel includes a light-emitting element and a pixel circuit.

The pixel circuits can supply electric power for driving the light-emitting element. The pixel circuits are electrically connected to wirings through which selection signals are supplied. The pixel circuits are also electrically connected to wirings through which image signals are supplied.

The scan line driver circuit 303g(1) can supply selection signals to the pixels 302.

The image signal line driver circuit 303s(1) can supply image signals to the pixels 302.

A touch sensor can be formed using the imaging pixels 308. Specifically, the imaging pixels 308 can sense a touch of a finger or the like on the display portion 301.

The imaging pixels 308 include photoelectric conversion elements and imaging pixel circuits.

The imaging pixel circuits can drive photoelectric conversion elements. The imaging pixel circuits are electrically connected to wirings through which control signals are supplied. The imaging pixel circuits are also electrically connected to wirings through which power supply potentials are supplied.

Examples of the control signal include a signal for selecting an imaging pixel circuit from which a recorded imaging signal is read, a signal for initializing an imaging pixel circuit, and a signal for determining the time for an imaging pixel circuit to sense light.

The imaging pixel driver circuit 303g(2) can supply control signals to the imaging pixels 308.

The imaging signal line driver circuit 303s(2) can read out imaging signals.

As illustrated in FIGS. 21B and 21C, the touch panel 390 includes the substrate 701, the bonding layer 703, the insulating layer 705, the substrate 711, the bonding layer 713, and the insulating layer 715. The substrates 701 and 711 are bonded to each other with a bonding layer 360.

The substrate 701 and the insulating layer 705 are attached to each other with the bonding layer 703. The substrate 711 and the insulating layer 715 are attached to each other with the bonding layer 713.

Embodiment 2 can be referred to for materials used for the substrates, the bonding layers, and the insulating layers.

Each of the pixels 302 includes the sub-pixel 302R, a sub-pixel 302G, and a sub-pixel 302B (FIG. 21C).

For example, the sub-pixel 302R includes the light-emitting element 350R and the pixel circuit. The pixel circuit includes a transistor 302t that can supply electric power to the light-emitting element 350R. The sub-pixel 302R further includes an optical element (e.g., a coloring layer 367R that transmits red light).

The light-emitting element 350R includes a lower electrode 351R, an EL layer 353, and an upper electrode 352, which are stacked in this order (see FIG. 21C).

The EL layer 353 includes a first EL layer 353a, an intermediate layer 354, and a second EL layer 353b, which are stacked in this order.

Note that a microcavity structure can be provided for the light-emitting element 350R so that light with a specific wavelength can be efficiently extracted. Specifically, an EL layer may be provided between a film that reflects visible light and a film that partly reflects and partly transmits visible light, which are provided so that light with a specific wavelength can be efficiently extracted.

The sub-pixel 302R includes, for example, a bonding layer 360 that is in contact with the light-emitting element 350R and the coloring layer 367R.

The coloring layer 367R is positioned in a region overlapping with the light-emitting element 350R. Accordingly, part of light emitted from the light-emitting element 350R passes through the bonding layer 360 and through the coloring layer 367R and is emitted to the outside of the sub-pixel 302R as indicated by an arrow in FIG. 21C.

The touch panel 390 includes a light-blocking layer 367BM. The light-blocking layer 367BM is provided so as to surround the coloring layer (e.g., the coloring layer 367R).

The touch panel 390 includes an anti-reflective layer 367p positioned in a region overlapping with the display portion 301. As the anti-reflective layer 367p, a circular polarizing plate can be used, for example.

The touch panel 390 includes an insulating layer 321. The insulating layer 321 covers the transistor 302t and the like. Note that the insulating layer 321 can be used as a layer for covering unevenness caused by the pixel circuit or the imaging pixel circuit to provide a flat surface. The transistor 302t and the like are preferably covered with an insulating layer that can inhibit diffusion of impurities to the transistor 302t and the like.

The touch panel 390 includes a partition 328 that overlaps with an end portion of the lower electrode 351R. A spacer 329 that controls the distance between the substrate 701 and the substrate 711 is provided on the partition 328.

The image signal line driver circuit 303s(1) includes a transistor 303t and a capacitor 303c. Note that the driver circuit can be formed in the same process and over the same substrate as those of the pixel circuits. As illustrated in FIG. 21B, the transistor 303t may include a second gate 304 over the insulating layer 321. The second gate 304 may be electrically connected to a gate of the transistor 303t, or different potentials may be supplied to these gates. Alternatively, if necessary, the second gate 304 may be provided for a transistor 308t, the transistor 302t, or the like.

The imaging pixels 308 each include a photoelectric conversion element 308p and an imaging pixel circuit. The imaging pixel circuit can sense light received by the photoelectric conversion element 308p. The imaging pixel circuit includes the transistor 308t.

For example, a PIN photodiode can be used as the photoelectric conversion element 308p.

The touch panel 390 includes a wiring 311 through which a signal is supplied. The wiring 311 is provided with a terminal 319. An FPC 309 through which a signal such as an image signal or a synchronization signal is supplied is electrically connected to the terminal 319. A printed wiring board (PWB) may be attached to the FPC 309.

Note that transistors such as the transistors 302t, 303t, and 308t can be formed in the same process. Alternatively, the transistors may be formed in different processes.

Structure Example 2

Figure 22A:
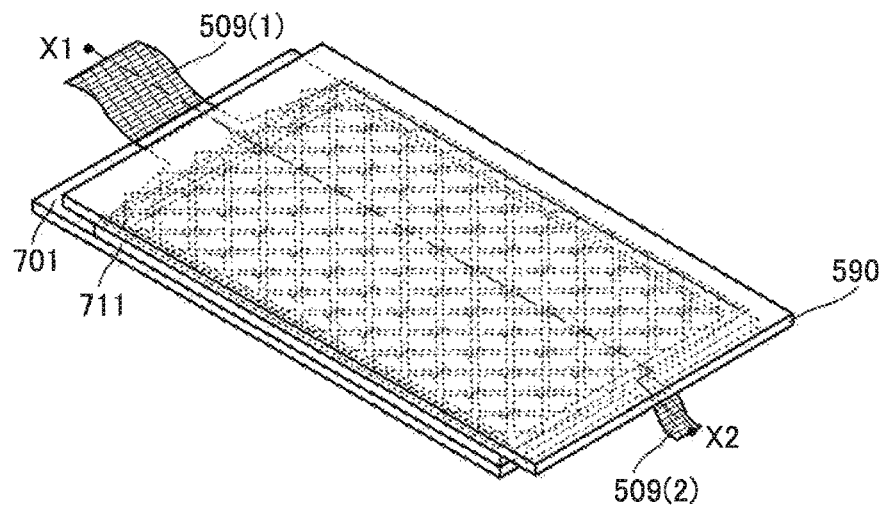
FIGS. 22A and 22B illustrate an example of a touch panel.
Figure 22B:
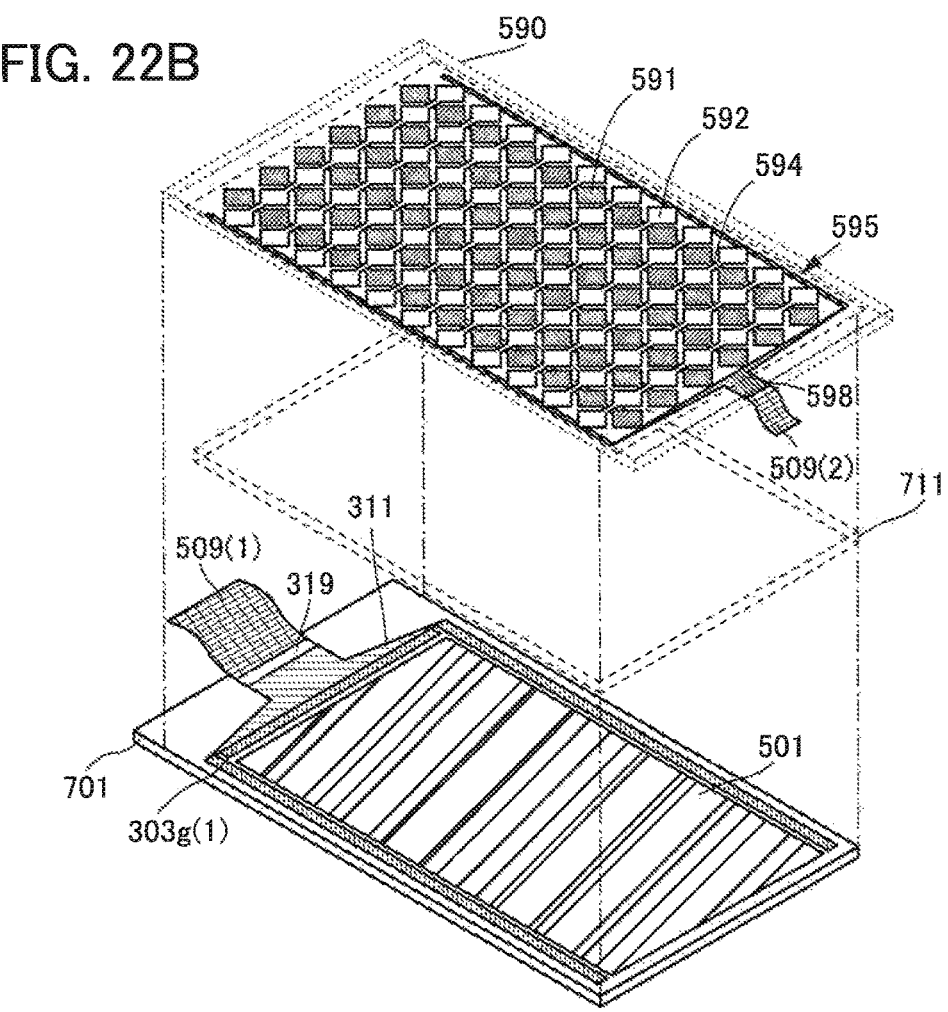
Figure 23A:
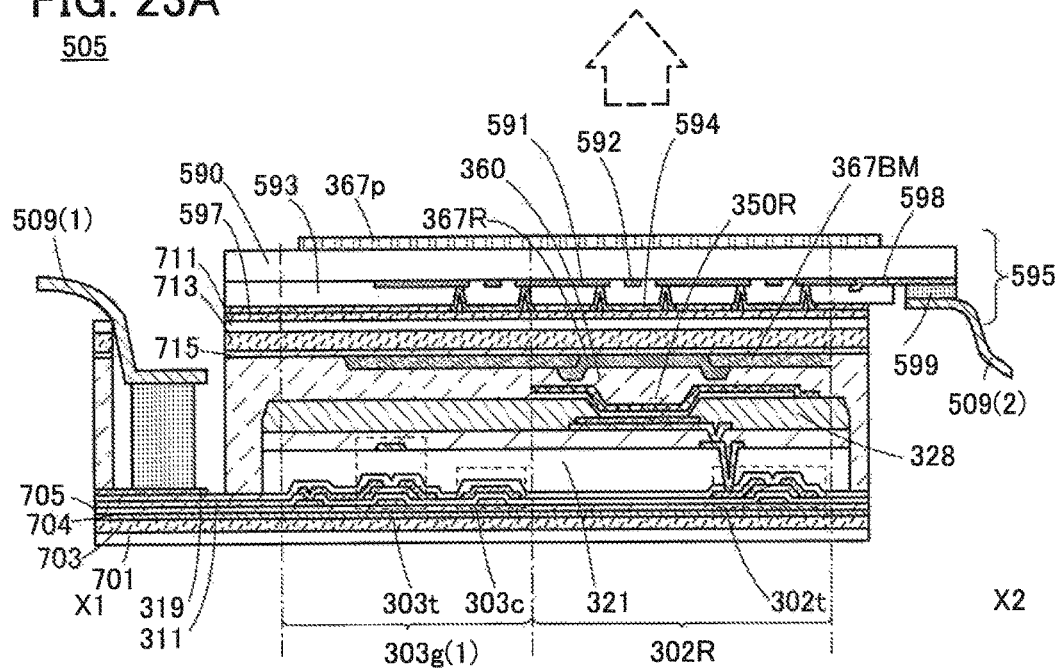
FIGS. 23A to 23C each illustrate an example of a touch panel.
Figure 23B:
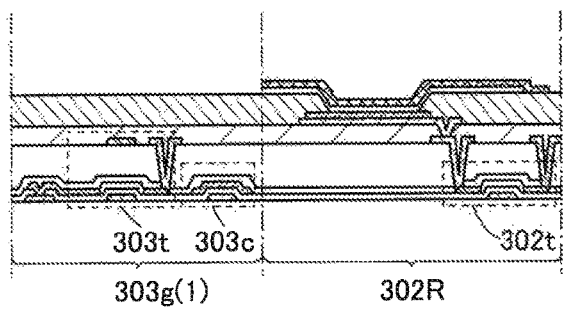
Figure 23C:
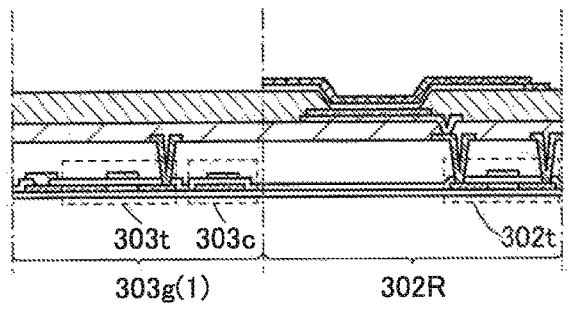

FIGS. 22A and 22B are perspective views of a touch panel 505. FIGS. 22A and 22B illustrate only main components for simplicity. FIGS. 23A to 23C are each a cross-sectional view taken along the dashed-dotted line X1-X2 in FIG. 22A.

As illustrated in FIGS. 22A and 22B, the touch panel 505 includes a display portion 501, the scan line driver circuit 303g(1), a touch sensor 595, and the like. Furthermore, the touch panel 505 includes the substrate 701, the substrate 711, and a substrate 590.

The touch panel 505 includes a plurality of pixels and a plurality of wirings 311. The plurality of wirings 311 can supply signals to the pixels. The plurality of wirings 311 are arranged to a peripheral portion of the substrate 701, and part of the plurality of wirings 311 form the terminal 319. The terminal 319 is electrically connected to an FPC 509(1).

The touch panel 505 includes the touch sensor 595 and a plurality of wirings 598. The plurality of wirings 598 are electrically connected to the touch sensor 595. The plurality of wirings 598 are arranged to a peripheral portion of the substrate 590, and part of the plurality of wirings 598 form a terminal. The terminal is electrically connected to an FPC 509(2). Note that in FIG. 22B, electrodes, wirings, and the like of the touch sensor 595 provided on the back side of the substrate 590 (the side facing the substrate 701) are indicated by solid lines for clarity.

As the touch sensor 595, for example, a capacitive touch sensor can be used. Examples of the capacitive touch sensor include a surface capacitive touch sensor and a projected capacitive touch sensor. An example of using a projected capacitive touch sensor is described here.

Examples of the projected capacitive touch sensor include a self-capacitive touch sensor and a mutual capacitive touch sensor. The use of a mutual capacitive type is preferable because multiple points can be sensed simultaneously.

Note that a variety of sensors that can sense the closeness or the contact of a sensing target such as a finger can be used as the touch sensor 595.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 22A and 22B.

The electrodes 591, each of which has a quadrangular shape, are arranged in a direction intersecting with the direction in which the electrodes 592 extend. Note that the plurality of electrodes 591 is not necessarily arranged in the direction orthogonal to one electrode 592 and may be arranged in a direction that intersects with one electrode 592 at an angle of less than 90 degrees.

The wiring 594 intersects with the electrode 592. One wiring 594 electrically connects two electrodes 591 between which one electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

As illustrated in FIG. 23A, the touch panel 505 includes the substrate 701, the bonding layer 703, the insulating layer 705, the substrate 711, the bonding layer 713, and the insulating layer 715. The substrates 701 and 711 are bonded to each other with a bonding layer 360.

A bonding layer 597 attaches the substrate 590 to the substrate 711 so that the touch sensor 595 overlaps with the display portion 501. The bonding layer 597 has a light-transmitting property.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used. A film including graphene may be used as well. The film including graphene can be formed, for example, by reducing a film including graphene oxide. As a reducing method, heating or the like can be employed.

The resistance of conductive films such as the electrodes 591, the electrodes 592, and the wiring 594, which are materials used for wirings and electrodes in the touch panel, is preferably low. Examples of the material include ITO, indium zinc oxide, ZnO, silver, copper, aluminum, a carbon nanotube, and graphene. Alternatively, a metal nanowire including a number of conductors with an extremely small width (for example, a diameter of several nanometers) may be used. Examples of such a metal nanowire include an Ag nanowire, a Cu nanowire, and an Al nanowire.

In the case of using an Ag nanowire, light transmittance of 89% or more and a sheet resistance of 40 ohm/square or more and 100 ohm/square or less can be achieved. Note that a metal nanowire, a carbon nanotube, graphene, or the like may be used for an electrode of the display element, e.g., a pixel electrode or a common electrode because of its high transmittance.

The electrodes 591 and the electrodes 592 may be formed by depositing a light-transmitting conductive material on the substrate 590 by a sputtering method and then removing an unnecessary portion by a variety of patterning technique such as photolithography.

The electrodes 591 and the electrodes 592 are covered with an insulating layer 593. Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and 592 can be favorably used as the wiring 594 because electric resistance can be reduced.

Note that an insulating layer that covers the insulating layer 593 and the wiring 594 may be provided to protect the touch sensor 595.

Furthermore, a connection layer 599 electrically connects the wiring 598 to the FPC 509(2).

The display portion 501 includes a plurality of pixels arranged in a matrix. Each pixel has the same structure as Structure Example 1; thus, description is omitted.

Any of various kinds of transistors can be used in the touch panel. A structure in the case of using bottom-gate transistors is illustrated in FIGS. 23A and 23B.

For example, a semiconductor layer containing an oxide semiconductor, amorphous silicon, or the like can be used in the transistor 302t and the transistor 303t illustrated in FIG. 23A.

For example, a semiconductor layer containing polycrystalline silicon that is obtained by crystallization process such as laser annealing can be used in the transistor 302t and the transistor 303t illustrated in FIG. 23B.

A structure in the case of using top-gate transistors is illustrated in FIG. 23C.

For example, a semiconductor layer containing polycrystalline silicon, a single crystal silicon film that is transferred from a single crystal silicon substrate, or the like can be used in the transistor 302t and the transistor 303t illustrated in FIG. 23C.

Structure Example 3

Figure 24A:
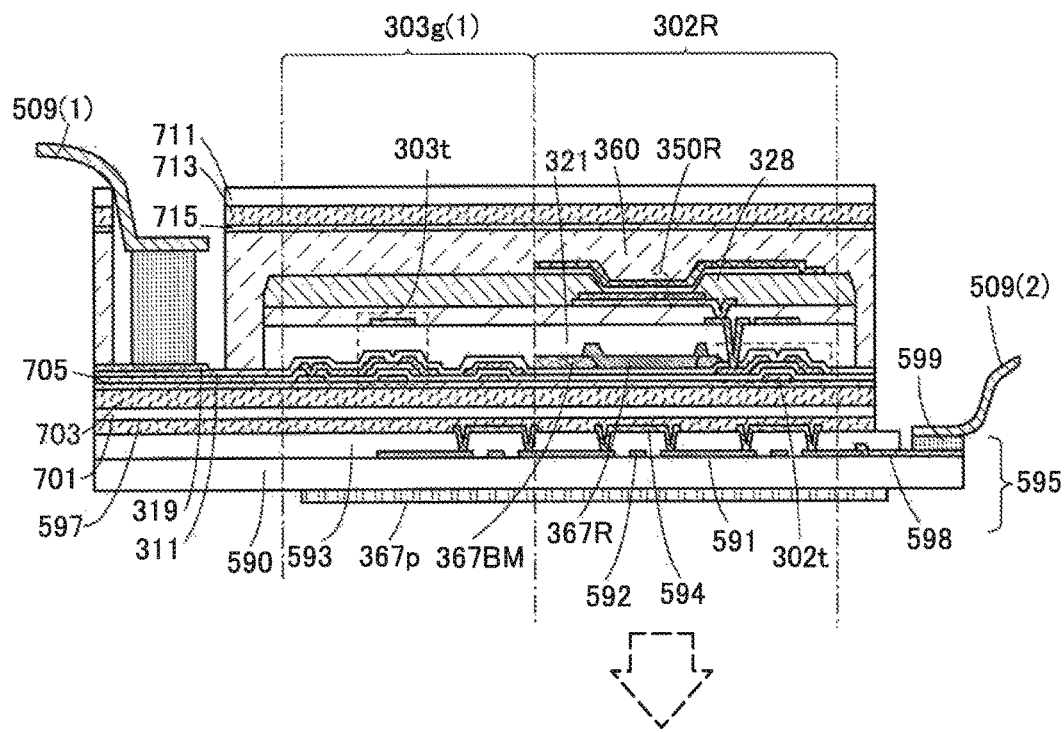
FIGS. 24A to 24C each illustrate an example of a touch panel.
Figure 24B:
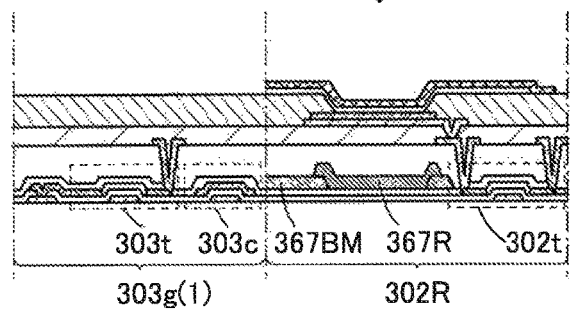
Figure 24C:
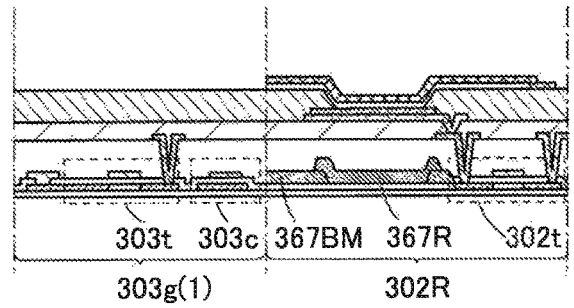

FIGS. 24A to 24C are cross-sectional views of a touch panel 505B. The touch panel 505B described in this embodiment is different from the touch panel 505 in Structure Example 2 in that an image is displayed on the side where the transistors are provided and that the touch sensor is provided on the substrate 701 side of the display portion. Different structures will be described in detail below, and the above description is referred to for the other similar structures.

The coloring layer 367R is positioned in a region overlapping with the light-emitting element 350R. The light-emitting element 350R illustrated in FIG. 24A emits light to the side where the transistor 302t is provided. Accordingly, part of light emitted from the light-emitting element 350R passes through the coloring layer 367R and is emitted to the outside of the touch panel 505B as indicated by an arrow in FIG. 24A.

The touch panel 505B includes the light-blocking layer 367BM on the light extraction side.

The light-blocking layer 367BM is provided so as to surround the coloring layer (e.g., the coloring layer 367R).

The touch sensor 595 is provided not on the substrate 711 side but on the substrate 701 side (see FIG. 24A).

The bonding layer 597 attaches the substrate 590 to the substrate 701 so that the touch sensor 595 overlaps with the display portion. The bonding layer 597 has a light-transmitting property.

Note that a structure in the case of using bottom-gate transistors in the display portion 501 is illustrated in FIGS. 24A and 24B.

For example, a semiconductor layer containing an oxide semiconductor, amorphous silicon, or the like can be used in the transistor 302t and the transistor 303t illustrated in FIG. 24A.

For example, a semiconductor layer containing polycrystalline silicon can be used in the transistor 302t and the transistor 303t illustrated in FIG. 24B.

A structure in the case of using top-gate transistors is illustrated in FIG. 24C.

For example, a semiconductor layer containing polycrystalline silicon, a single crystal silicon film that is transferred from a single crystal silicon substrate, or the like can be used in the transistor 302t and the transistor 303t illustrated in FIG. 24C.

Structure Example 4

Figure 25:
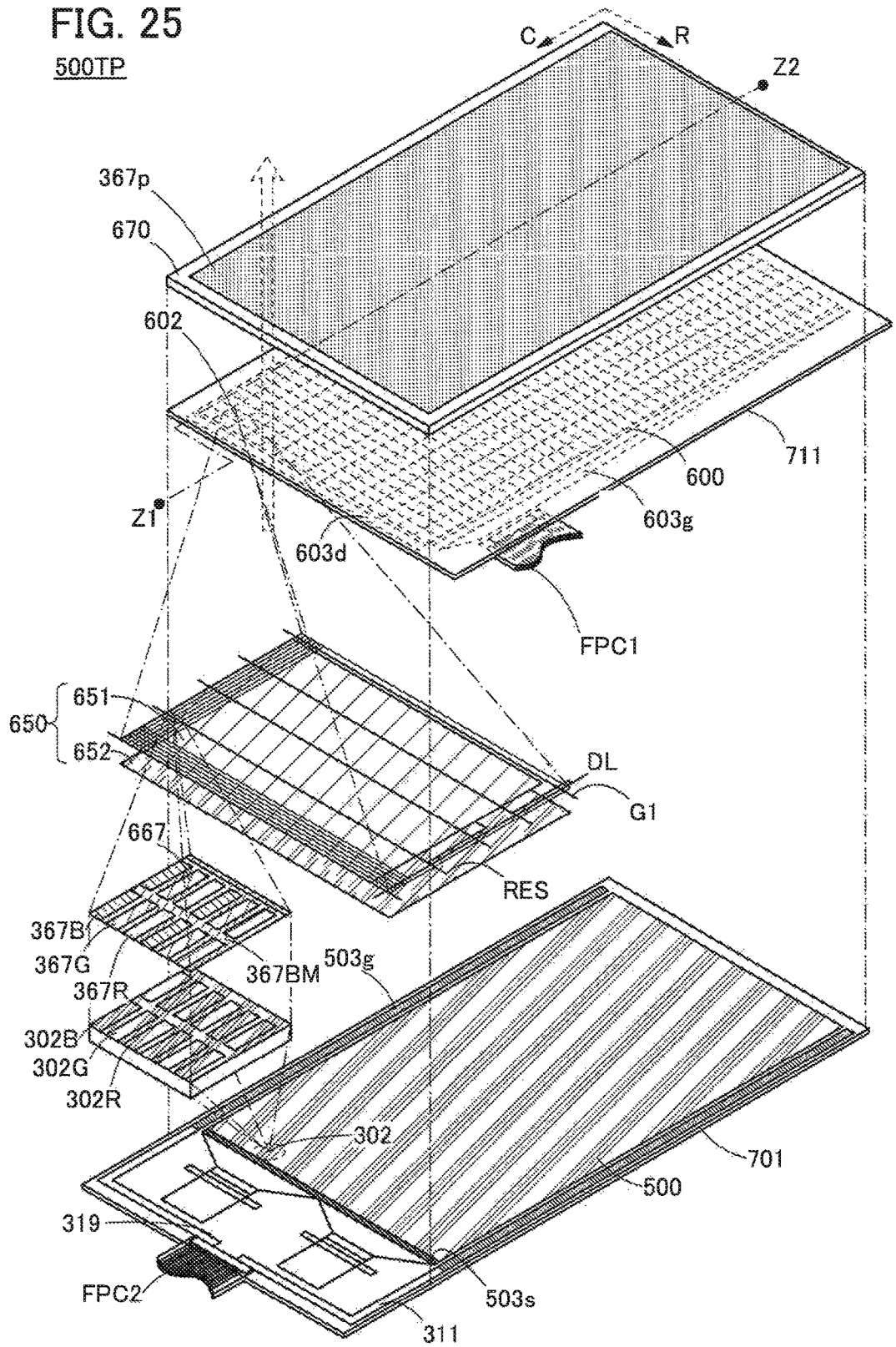
FIG. 25 illustrates an example of a touch panel.
Figure 26:
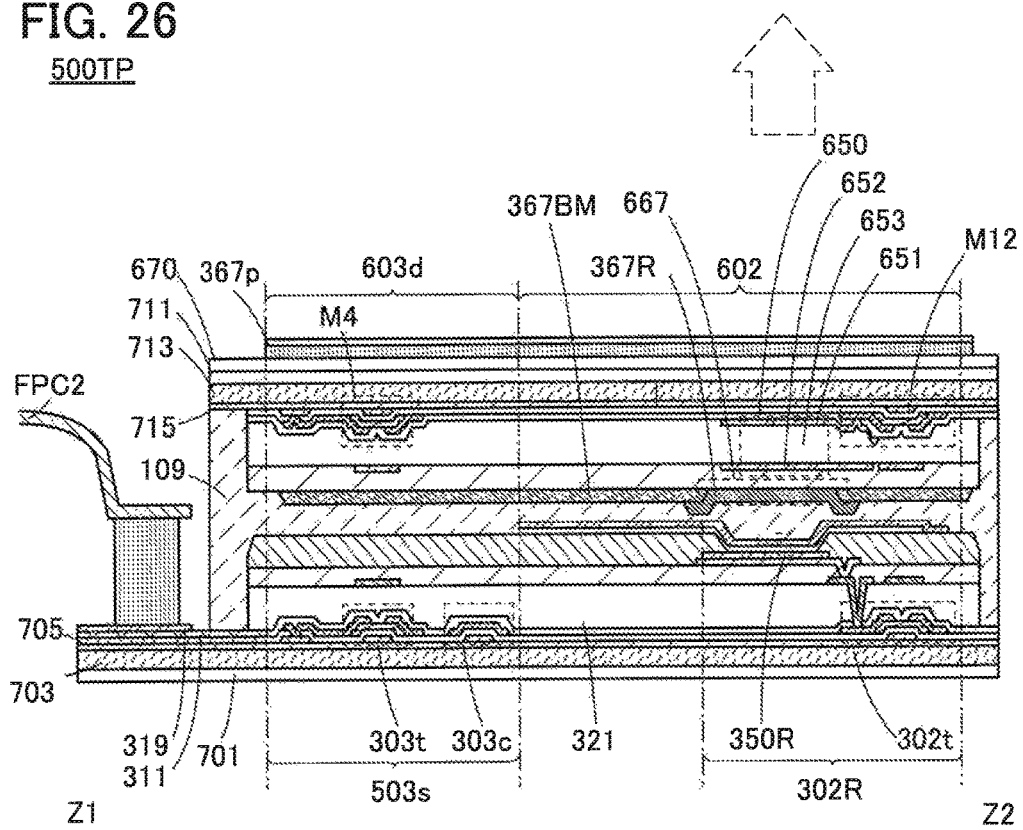
FIG. 26 illustrates an example of a touch panel.

As illustrated in FIG. 25, the touch panel 500TP includes a display portion 500 and an input portion 600 that overlap with each other. FIG. 26 is a cross-sectional view taken along the dashed-dotted line Z1-Z2 in FIG. 25.

Components of the touch panel 500TP are described below. Note that these units cannot be clearly distinguished and one unit also serves as another unit or include part of another unit in some cases. Note that the touch panel 500TP in which the input portion 600 overlaps with the display portion 500 is also referred to as a touch panel.

The input portion 600 includes a plurality of sensing units 602 arranged in a matrix. The input portion 600 also includes a selection signal line G1, a control line RES, a signal line DL, and the like.

The selection signal line G1 and the control line RES are electrically connected to the plurality of sensing units 602 that are arranged in the row direction (indicated by the arrow R in FIG. 25). The signal line DL is electrically connected to the plurality of sensing units 602 that are arranged in the column direction (indicated by the arrow C in FIG. 25).

The sensing unit 602 senses an object that is close thereto or in contact therewith and supplies a sensing signal. For example, the sensing unit 602 senses, for example, capacitance, illuminance, magnetic force, electric waves, or pressure and supplies data based on the sensed physical quantity. Specifically, a capacitor, a photoelectric conversion element, a magnetic sensing element, a piezoelectric element, a resonator, or the like can be used as the sensing element.

The sensing unit 602 senses, for example, a change in capacitance between the sensing unit 602 and an object close thereto or an object in contact therewith.

Note that when an object having a dielectric constant higher than that of air, such as a finger, comes close to a conductive film in air, the capacitance between the finger and the conductive film changes. The sensing unit 602 can sense the capacitance change and supply sensing data.

For example, distribution of charge occurs between the conductive film and the capacitor owing to the change in the electrostatic capacitance, so that the voltage across the capacitor is changed. This voltage change can be used as the sensing signal.

The sensing unit 602 is provided with a sensor circuit. The sensor circuit is electrically connected to the selection signal line G1, the control line RES, the signal line DL, or the like.

The sensor circuit includes a transistor, a sensor element, and the like. For example, a conductive film and a capacitor electrically connected to the conductive film can be used for the sensor circuit. A capacitor and a transistor electrically connected to the capacitor can also be used for the sensor circuit.

For example, a capacitor 650 including an insulating layer 653, and a first electrode 651 and a second electrode 652 between which the insulating layer 653 is provided can be used for the sensor circuit (see FIG. 26). Specifically, the voltage between the electrodes of the capacitor 650 changes when an object approaches the conductive film which is electrically connected to one electrode of the capacitor 650.

The sensing unit 602 includes a switch that can be turned on or off in accordance with a control signal. For example, a transistor M12 can be used as the switch.

A transistor which amplifies a sensing signal can be used in the sensing unit 602.

Transistors manufactured through the same process can be used as the transistor that amplifies a sensing signal and the switch. This allows the input portion 600 to be provided through a simplified process.

The sensing unit includes a plurality of window portions 667 arranged in a matrix. The window portions 667 transmit visible light. A light-blocking layer BM may be provided between the window portions 667.

The touch panel 500TP is provided in a position overlapping with the window portion 667. The coloring layer transmits light of a predetermined color. Note that the coloring layer can be referred to as a color filter. For example, a coloring layer 367B transmitting blue light, a coloring layer 367G transmitting green light, and a coloring layer 367R transmitting red light can be used. Alternatively, a coloring layer transmitting yellow light or white light may be used.

The display portion 500 includes the plurality of pixels 302 arranged in a matrix. The pixel 302 is positioned so as to overlap with the window portions 667 of the input portion 600. The pixels 302 may be arranged at higher resolution than the sensing units 602. Each pixel has the same structure as Structure Example 1; thus, description is omitted.

The touch panel 500TP includes the input portion 600 that includes the plurality of sensing units 602 arranged in a matrix and the window portions 667 transmitting visible light, the display portion 500 that includes the plurality of pixels 302 overlapping with the window portions 667, and the coloring layers between the window portions 667 and the pixels 302. Each of the sensing units includes a switch that can reduce interference in another sensing unit.

Thus, sensing data obtained by each sensor unit can be supplied together with the positional information of the sensor unit. In addition, sensing data can be supplied in relation to the positional data of the pixel for displaying an image. In addition, the sensor unit which does not supply the sensing data is not electrically connected to a signal line, whereby interference with the sensor unit which supplies a sensing signal can be reduced. Consequently, the touch panel 500TP that is highly convenient or highly reliable can be provided.

For example, the input portion 600 of the touch panel 500TP can sense sensing data and supply the sensing data together with the positional data. Specifically, a user of the touch panel 500TP can make a variety of gestures (e.g., tap, drag, swipe, and pinch-in operation) using, as a pointer, his/her finger or the like on the input portion 600.

The input portion 600 can sense a finger or the like that comes close to or is in contact with the input portion 600 and supply sensing data including a sensed position, path, or the like.

An arithmetic unit determines whether or not supplied data satisfies a predetermined condition on the basis of a program or the like and executes an instruction associated with a predetermined gesture.

Thus, a user of the input portion 600 can make the predetermined gesture with his/her finger or the like and make the arithmetic unit execute an instruction associated with the predetermined gesture.

For example, first, the input portion 600 of the touch panel 500TP selects one sensing unit X from the plurality of sensing units that can supply sensing data to one signal line.

Then, electrical continuity between the signal line and the sensing units other than the sensing unit X is not established. This can reduce interference of the other sensing units in the sensing unit X.

Specifically, interference of sensing elements of the other sensing units in a sensing element of the sensing unit X can be reduced.

For example, in the case where a capacitor and a conductive film to which one electrode of the capacitor is electrically connected are used for the sensing element, interference of the potentials of the conductive films of the other sensing units in the potential of the conductive film of the sensing unit X can be reduced.

Thus, the touch panel 500TP can drive the sensing unit and supply sensing data independently of its size. The touch panel 500TP can have a variety of sizes, for example, ranging from a size for a hand-held device to a size for an electronic blackboard.

The touch panel 500TP can be folded and unfolded. Even in the case where interference of the other sensing units in the sensing unit X is different between the folded state and the unfolded state, the sensing unit can be driven and sensing data can be supplied without dependence on the state of the touch panel 500TP.

The display portion 500 of the touch panel 500TP can be supplied with display data. For example, an arithmetic unit can supply the display data.

In addition to the above structure, the touch panel 500TP can have the following structure.

The touch panel 500TP may include a driver circuit 603g or a driver circuit 603d. In addition, the touch panel 500TP may be electrically connected to an FPC1.

The driver circuit 603g can supply selection signals at predetermined timings, for example.

Specifically, the driver circuit 603g supplies selection signals to the selection signal lines G1 row by row in a predetermined order. Any of a variety of circuits can be used as the driver circuit 603g. For example, a shift register, a flip-flop circuit, a combination circuit, or the like can be used.

The driver circuit 603d supplies sensing data on the basis of a sensing signal supplied from the sensing unit 602. Any of a variety of circuits can be used as the driver circuit 603d. For example, a circuit that can form a source follower circuit or a current mirror circuit by being electrically connected to the sensing circuit in the sensing unit can be used as the driver circuit 603d. In addition, an analog-to-digital converter circuit that converts a sensing signal into a digital signal may be provided in the driver circuit 603d.

The FPC1 supplies a timing signal, a power supply potential, or the like and is supplied with a sensing signal.

The touch panel 500TP may include a driver circuit 503g, a driver circuit 503s, a wiring 311, and a terminal 319. In addition, the touch panel 500TP (or driver circuit) may be electrically connected to an FPC2.

In addition, a protective layer 670 that prevents damage and protects the touch panel 500TP may be provided. For example, a ceramic coat layer or a hard coat layer can be used as the protective layer 670. Specifically, a layer containing aluminum oxide or a UV curable resin can be used.

This embodiment can be combined with any other embodiment as appropriate.

Embodiment 4

In this embodiment, electronic devices and lighting devices of one embodiment of the present invention will be described with reference to drawings.

Examples of electronic devices include a television set, a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

The electronic device or the lighting device of one embodiment of the present invention has flexibility and therefore can be incorporated along a curved inside/outside wall surface of a house or a building or a curved interior/exterior surface of a car.

Furthermore, the electronic device of one embodiment of the present invention may include a secondary battery. It is preferable that the secondary battery be capable of being charged by non-contact power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display an image, data, or the like on a display portion. When the electronic device includes the antenna and a secondary battery, the antenna may be used for contactless power transmission.

In the display system of one embodiment of the present invention, the area of the display region can be increased unlimitedly by increasing the number of display panels. Thus, the display system of one embodiment of the present invention can be favorably used for digital signage, a PID, or the like. Furthermore, the shape of the display region of the display system of one embodiment of the present invention can be changed variously when the arrangement of the display panels is changed. In addition, the image processing device of one embodiment of the present invention can make a joint between the display panels to be hardly recognized. Accordingly, the display unevenness or luminance unevenness of the display region can be suppressed.

Figure 27A:
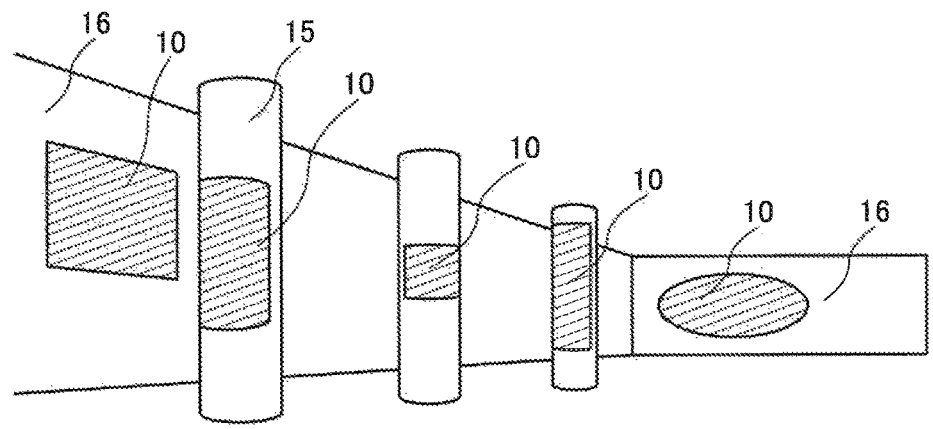
FIGS. 27A to 27F illustrate examples of electronic devices and lighting devices.

FIG. 27A illustrates an example in which the display system 10 of one embodiment of the present invention is provided for each of pillars 15 and walls 16. A flexible display panel is used as a display panel included in the display system 10, whereby the display system 10 can be placed along a curved surface.

Here, in particular, in the case where the display system of one embodiment of the present invention is used in digital signage or a PID, it is preferable to use a touch panel in a display panel because a device with such a structure does not just display a still or moving image, but can be operated by viewers intuitively. Alternatively, in the case where the display device of one embodiment of the present invention is used for providing information such as route information or traffic information, usability can be enhanced by intuitive operation. In the case of providing the display device on the walls of buildings, public facilities, or the like, a touch panel does not need to be used in the display panel.

FIGS. 27B to 27E illustrate an example of an electronic device including the display portion 7000 with a curved surface. The display surface of the display portion 7000 is bent, and images can be displayed on the bent display surface. The display portion 7000 may be flexible.

The display portion 7000 of each of the electronic devices illustrated in FIGS. 27B to 27E can be formed using the display system of one embodiment of the present invention.

Figure 27B:
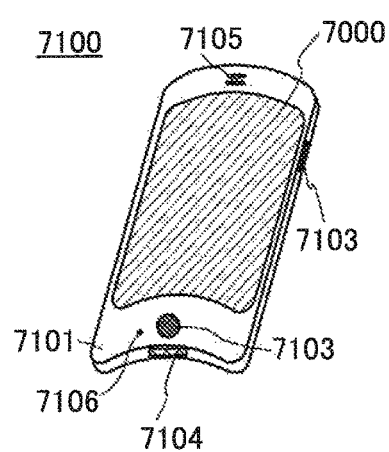

FIG. 27B illustrates an example of a mobile phone. A mobile phone 7100 includes a housing 7101, the display portion 7000, operation buttons 7103, an external connection port 7104, a speaker 7105, a microphone 7106, and the like.

The mobile phone 7100 illustrated in FIG. 27B includes a touch sensor in the display portion 7000. Moreover, operations such as making a call and inputting a letter can be performed by touch on the display portion 7000 with a finger, a stylus, or the like.

With the operation buttons 7103, power on or off can be switched. Alternatively, types of images displayed on the display portion 7000 can be switched; switching images from a mail creation screen to a main menu screen, for example.

Figure 27C:
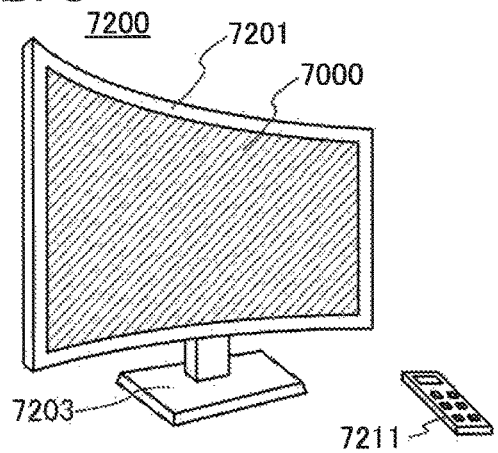

FIG. 27C illustrates an example of a television set. In a television set 7200, the display portion 7000 is incorporated into the housing 7201. Here, the housing 7201 is supported by a stand 7203.

The television set 7200 illustrated in FIG. 27C can be operated with an operation switch of the housing 7201 or a separate remote controller 7211. Furthermore, the display portion 7000 may include a touch sensor. The display portion 7000 can be performed by touching the display portion 7000 with a finger or the like. Furthermore, the remote controller 7211 may be provided with a display portion for displaying data output from the remote controller 7211. With operation keys or a touch panel of the remote controller 7211, channels and volume can be controlled and images displayed on the display portion 7000 can be controlled.

Note that the television set 7200 is provided with a receiver, a modem, or the like. A general television broadcast can be received with the receiver. Furthermore, when the television set is connected to a communication network with or without wires via the modem, one-way (from a transmitter to a receiver) or two-way (between a transmitter and a receiver or between receivers) data communication can be performed.

Figure 27D:
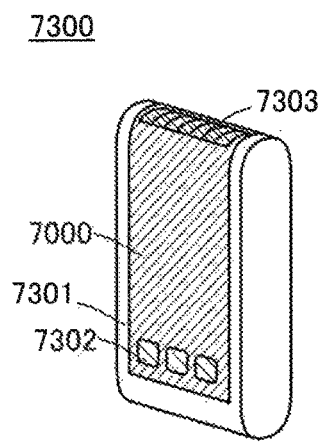

FIG. 27D illustrates an example of a portable information terminal. A portable information terminal 7300 includes a housing 7301 and the display portion 7000. Each of the portable information terminals may also include an operation button, an external connection port, a speaker, a microphone, an antenna, a battery, or the like. The display portion 7000 is provided with a touch sensor. An operation of the portable information terminal 7300 can be performed by touching the display portion 7000 with a finger, a stylus, or the like.

Figure 27E:
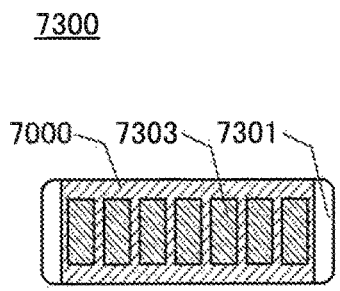

FIG. 27D is a perspective view of the portable information terminal 7300. FIG. 27E is a top view of the portable information terminal 7300.

Each of the portable information terminals illustrated in this embodiment functions as, for example, one or more of a telephone set, a notebook, and an information browsing system. Specifically, each of the portable information terminals can be used as a smartphone. Each of the portable information terminals illustrated in this embodiment is capable of executing a variety of applications such as mobile phone calls, e-mailing, reading and editing texts, music reproduction, Internet communication, and a computer game, for example.

The portable information terminal 7300 can display characters or an image on its plurality of surfaces. For example, as illustrated in FIG. 27D, three operation buttons 7302 can be displayed on one surface, and information 7303 indicated by a rectangle can be displayed on another surface. FIGS. 27D and 27E illustrate an example in which information is displayed at the top of the portable information terminal. Alternatively, information may be displayed on the side of the portable information terminal. Information may also be displayed on three or more surfaces of the portable information terminal.

Examples of the information include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation button, an icon, or the like may be displayed in place of the information.

For example, a user of the portable information terminal 7300 can see the display (here, the information 7303) with the portable information terminal 7300 put in a breast pocket of his/her clothes.

Specifically, a caller's phone number, name, or the like of an incoming call is displayed in a position that can be seen from above the portable information terminal 7300. Thus, the user can see the display without taking out the portable information terminal 7300 from the pocket and decide whether to answer the call.

Figure 27F:
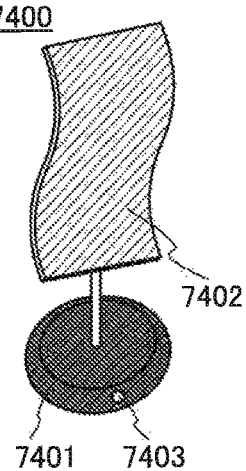

FIG. 27F illustrates an example of a lighting device having a curved light-emitting portion.

The light-emitting portion included in the lighting devices illustrated in FIG. 27F can be manufactured using the display system of one embodiment of the present invention.

A lighting device 7400 illustrated in FIG. 27F includes a light-emitting portion 7402 having a wave-shaped light-emitting surface, which is a good-design lighting device.

The light-emitting portion included in the lighting device 7400 may be flexible. The light-emitting portion may be fixed on a plastic member, a movable frame, or the like so that an emission surface of the light-emitting portion can be bent freely depending on the intended use.

The lighting device 7400 includes a stage 7401 provided with an operation switch 7403 and a light-emitting portion supported by the stage 7401.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a depressed shape, whereby a particular region can be brightly illuminated, or the light-emitting surface is curved to have a projecting shape, whereby a whole room can be brightly illuminated.

FIGS. 28A1, 28A2, and 28B to 28I each illustrate an example of a portable information terminal including a display portion 7001 having flexibility.

The display portion 7001 is manufactured using the display system of one embodiment of the present invention. For example, a display system including a display panel that can be bent with a radius of curvature of greater than or equal to 0.01 mm and less than or equal to 150 mm can be used. The display portion 7001 may include a touch sensor so that the portable information terminal can be operated by touching the display portion 7001 with a finger or the like.

FIGS. 28A1 and 28A2 are a perspective view and a side view, respectively, illustrating an example of the portable information terminal. A portable information terminal 7500 includes a housing 7501, the display portion 7001, a display portion tab 7502, operation buttons 7503, and the like.

The portable information terminal 7500 includes a rolled flexible display portion 7001 in the housing 7501.

The portable information terminal 7500 can receive a video signal with a control portion incorporated therein and can display the received video on the display portion 7001. The portable information terminal 7500 incorporates a battery. A terminal portion for connecting a connector may be included in the housing 7501 so that a video signal or power can be directly supplied from the outside with a wiring.

By pressing the operation buttons 7503, power on/off, switching of displayed videos, and the like can be performed. Although FIGS. 28A1, 28A2, and 28B illustrate an example where the operation buttons 7503 are positioned on a side surface of the portable information terminal 7500, one embodiment of the present invention is not limited thereto. The operation buttons 7503 may be placed on a display surface (a front surface) or a rear surface of the portable information terminal 7500.

Figure 28B:
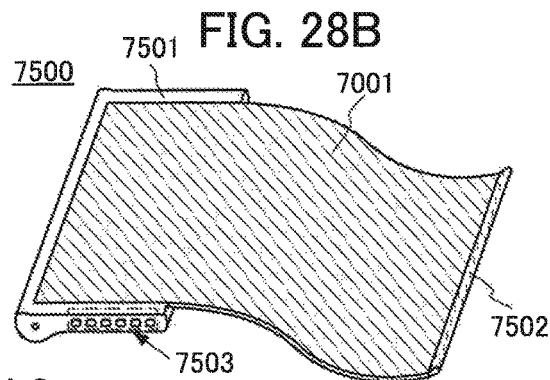

FIG. 28B illustrates the portable information terminal 7500 in a state where the display portion 7001 is pulled out. Videos can be displayed on the display portion 7001 in this state. The display portion 7001 can be extracted by the display portion tab 7502. In addition, the portable information terminal 7500 may perform different displays in the state where part of the display portion 7001 is rolled as illustrated in FIG. 28A1 and in the state where the display portion 7001 is pulled out as illustrated in FIG. 28B. For example, in the state illustrated in FIG. 28A1, the rolled portion of the display portion 7001 is put in a non-display state, which results in a reduction in power consumption of the portable information terminal 7500.

Note that a reinforcement frame may be provided for a side portion of the display portion 7001 so that the display portion 7001 has a flat display surface when pulled out.

Note that in addition to this structure, a speaker may be provided for the housing so that sound is output with an audio signal received together with a video signal.

Figure 28C:
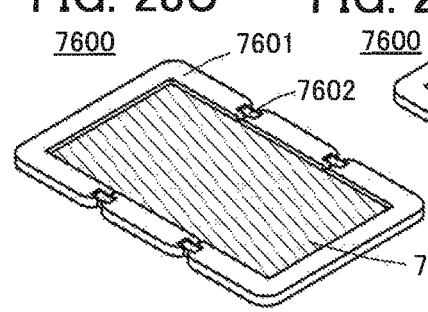
Figure 28D:
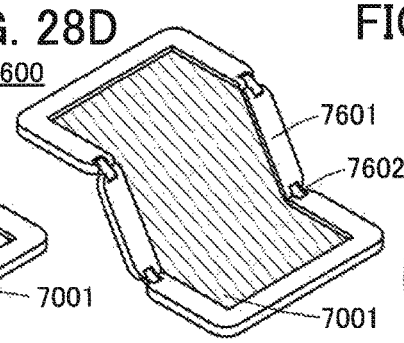
Figure 28E:
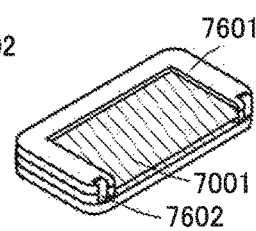

FIGS. 28C to 28E illustrate an example of a foldable portable information terminal. FIG. 28C illustrates a portable information terminal 7600 that is opened. FIG. 28D illustrates the portable information terminal 7600 that is being opened or being folded. FIG. 28E illustrates the portable information terminal 7600 that is folded. The portable information terminal 7600 is highly portable when folded, and is highly browsable when opened because of a seamless large display area.

A display portion 7001 is supported by three housings 7601 joined together by hinges 7602. By folding the portable information terminal 7600 at a connection portion between two housings 7601 with the hinges 7602, the portable information terminal 7600 can be reversibly changed in shape from an opened state to a folded state.

Figure 28F:
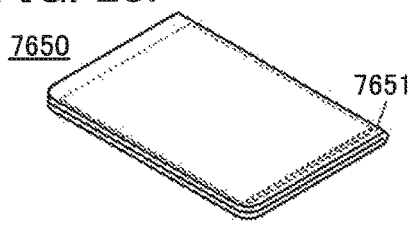
Figure 28G:
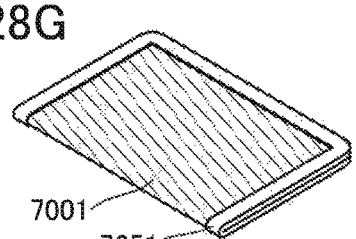

FIGS. 28F and 28G illustrate an example of a foldable portable information terminal. FIG. 28F illustrates a portable information terminal 7650 that is folded so that the display portion 7001 is on the inside. FIG. 28G illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated or damaged.

Figure 28H:
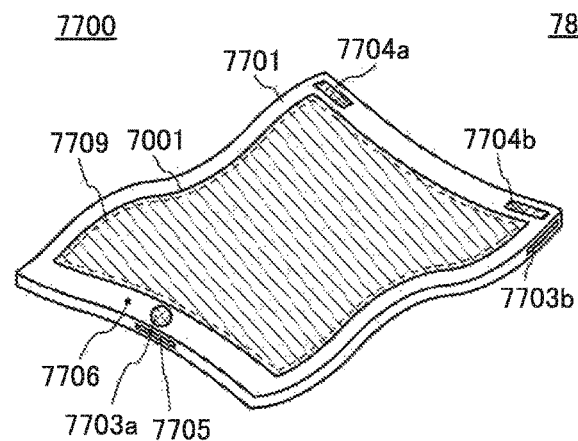

FIG. 28H illustrates an example of a flexible portable information terminal. The portable information terminal 7700 includes a housing 7701 and the display portion 7001. In addition, the portable information terminal 7700 may include buttons 7703a and 7703b which serve as input means, speakers 7704a and 7704b which serve as sound output means, an external connection port 7705, a microphone 7706, or the like. A flexible battery 7709 can be mounted on the portable information terminal 7700. The battery 7709 may be arranged to overlap with the display portion 7001, for example.

The housing 7701, the display portion 7001, the battery 7709 are flexible. Thus, it is easy to curve the portable information terminal 7700 into a desired shape or to twist the portable information terminal 7700. For example, the portable information terminal 7700 can be curved so that the display portion 7001 is on the inside or in the outside. The portable information terminal 7700 can be used in a rolled state. Since the housing 7701 and the display portion 7001 can be transformed freely in this manner, the portable information terminal 7700 is less likely to be broken even when the portable information terminal 7700 falls down or external stress is applied to the portable information terminal 7700.

The portable information terminal 7700 can be used effectively in various situations because the portable information terminal 7700 is lightweight. For example, the portable information terminal 7700 can be used in the state where the upper portion of the housing 7701 is suspended by a clip or the like, or in the state where the housing 7701 is fixed to a wall by magnets or the like.

Figure 28I:
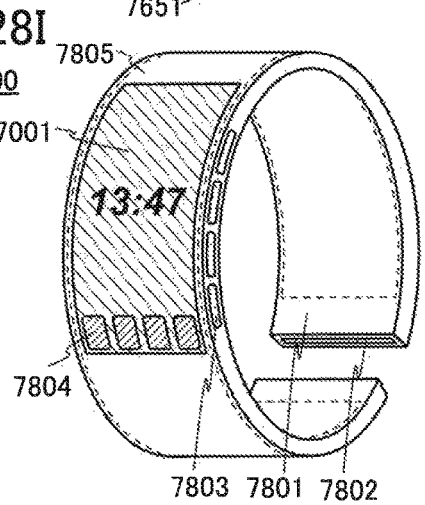

FIG. 28I illustrates an example of a wrist-watch-type portable information terminal. The portable information terminal 7800 includes a band 7801, the display portion 7001, an input-output terminal 7802, operation buttons 7803, or the like. The band 7801 has a function of a housing. A flexible battery 7805 can be mounted on the portable information terminal 7800. The battery 7805 may overlap with the display portion 7001 or the band 7801, for example.

The band 7801, the display portion 7001, and the battery 7805 have flexibility. Thus, the portable information terminal 7800 can be easily curved to have a desired shape.

With the operation button 7803, a variety of functions such as time setting, on/off of the power, on/off of wireless communication, setting and cancellation of silent mode, and setting and cancellation of power saving mode can be performed. For example, the functions of the operation button 7803 can be set freely by the operating system incorporated in the portable information terminal 7800.

By touching an icon 7804 displayed on the display portion 7001 with a finger or the like, application can be started.

The portable information terminal 7800 can employ near field communication that is a communication method based on an existing communication standard. In that case, for example, mutual communication between the portable information terminal 7800 and a headset capable of wireless communication can be performed, and thus hands-free calling is possible.

The portable information terminal 7800 may include the input-output terminal 7802. In the case where the input-output terminal 7802 is included, data can be directly transmitted to and received from another information terminal via a connector. Charging through the input-output terminal 7802 is also possible. Note that charging of the portable information terminal described as an example in this embodiment can be performed by non-contact power transmission without using the input-output terminal.

This embodiment can be combined with any other embodiment as appropriate.

EXPLANATION OF REFERENCE

10: display system, 11: image processing device, 12: display device, 13: display region, 14: detection device, 15: pillar, 16: wall, 21: decoder circuit, 22: signal dividing portion, 23a: controller, 23b: controller, 30a: display panel, 30b: display panel, 31a: driver circuit, 31b: driver circuit, 51: arithmetic portion, 52: memory portion, 92a: region, 92b: region, 92c: region, 92d: region, 100: display panel, 100a: display panel, 100b: display panel, 100c: display panel, 100d: display panel, 101: display region, 101a: display region, 101b: display region, 101c: display region, 101d: display region, 101e: display region, 101f: display region, 102: region, 102a: region, 102b: region, 103: light-transmitting layer, 103a: light-transmitting layer, 103b: light-transmitting layer, 105a: region, 105b: region, 105c: region, 110: region, 110a: region, 110b: region, 110c: region, 110d: region, 112a: FPC, 112b: FPC, 120: region, 120a: region, 120b: region, 120c: region, 123: FPC, 131: resin layer, 132: protective substrate, 133: resin layer, 134: protective substrate, 141: pixel, 141a: pixel, 141b: pixel, 142a: wiring, 142b: wiring, 143a: circuit, 143b: circuit, 145: wiring, 151: substrate, 151a: substrate, 151b: substrate, 152: substrate, 152a: substrate, 152b: substrate, 153a: element layer, 153b: element layer, 154: bonding layer, 155a: region, 155b: region, 156a: region, 156b: region, 301: display portion, 302: pixel, 302B: sub-pixel, 302G: sub-pixel, 302R: sub-pixel, 302t: transistor, 303c: capacitor, 303g(1): scan line driver circuit, 303g(2): imaging pixel driver circuit, 303s(1): image signal line driver circuit, 303s(2): imaging signal line driver circuit, 303t: transistor, 304: gate, 308: imaging pixel, 308p: photoelectric conversion element, 308t: transistor, 309: FPC, 311: wiring, 319: terminal, 321: insulating layer, 328: partition, 329: spacer, 350R: light-emitting element, 351R: lower electrode, 352: upper electrode, 353: EL layer, 353a: EL layer, 353b: EL layer, 354: intermediate layer, 360: adhesive layer, 367B: coloring layer, 367BM: light-blocking layer, 367G: coloring layer, 367p: anti-reflective layer, 367R: coloring layer, 390: touch panel, 500: display portion, 500TP: touch panel, 501: display portion, 503g: driver circuit, 503s: driver circuit, 505: touch panel, 505B: touch panel, 509: FPC, 590: substrate, 591: electrode, 592: electrode, 593: insulating layer, 594: wiring, 595: touch sensor, 597: adhesive layer, 598: wiring, 599: connection layer, 600: input portion, 602: sensing unit, 603d: driver circuit, 603g: driver circuit, 650: capacitor, 651: electrode, 652: electrode, 653: insulating layer, 667: window portion, 670: protective layer, 701: substrate, 703: adhesive layer, 705: insulating layer, 711: substrate, 713: adhesive layer, 715: insulating layer, 804: light-emitting portion, 806: driver circuit portion, 808: FPC, 814: conductive layer, 815: insulating layer, 817: insulating layer, 817a: insulating layer, 817b: insulating layer, 820: transistor, 821: insulating layer, 822: adhesive layer, 823: spacer, 824: transistor, 825: connector, 830: light-emitting element, 831: lower electrode, 832: optical adjustment layer, 833: EL layer, 835: upper electrode, 845: coloring layer, 847: light-blocking layer, 849: overcoat, 856: conductive layer, 857: conductive layer, 857a: conductive layer, 857b: conductive layer, 7000: display portion, 7001: display portion, 7100: mobile phone, 7101: housing, 7103: operation button, 7104: external connection port, 7105: speaker, 7106: microphone, 7200: television device, 7201: housing, 7203: stand, 7211: remote controller, 7300: portable information terminal, 7301: housing, 7302: operation button, 7303: data, 7400: lighting device, 7401: stage, 7402: light-emitting portion, 7403: operation switch, 7500: portable information terminal, 7501: housing, 7502: tab, 7503: operation button, 7600: portable information terminal, 7601: housing, 7602: hinge, 7650: portable information terminal, 7651: non-display portion, 7700: portable information terminal, 7701: housing, 7703a: button, 7703b: button, 7704a: speaker, 7704b: speaker, 7705: external connection port, 7706: microphone, 7709: battery, 7800: portable information terminal, 7801: band, 7802: input-output terminal, 7803: operation button, 7804: icon, and 7805: battery.

This application is based on Japanese Patent Application serial no. 2014-241476 filed with Japan Patent Office on Nov. 28, 2014, the entire contents of which are hereby incorporated by reference.

The invention claimed is:

1. A display system comprising:
   a first display panel comprising a first region;
   a second display panel comprising a second region; and
   an arithmetic portion configured to produce a second image signal by correcting a first image signal on the basis of a correction data, and supply the second image signal to the first display panel,
   wherein the first region is configured to display an image,
   wherein the second region is configured to transmit visible light,
   wherein the first region comprises a first portion overlapping with the second region, and
   wherein the second image signal is a signal in which gray scale corresponding to the first portion is corrected, or a signal in which gray scale corresponding to at least part of the first region excluding the first portion is corrected.

2. The display system according to claim 1, wherein the second image signal is subjected to gamma correction.

3. The display system according to claim 1, wherein each of the first display panel and the second display panel has flexibility.

4. The display system according to claim 1, further comprising a light-transmitting layer overlapping with the first portion of the first region,
   wherein the light-transmitting layer is provided between a display surface of the first display panel and an opposite surface of a display surface of the second display panel.

5. The display system according to claim 4,
   wherein the light-transmitting layer has a light transmittance of higher than or equal to 80% on average at a wavelength longer than or equal to 450 nm and shorter than or equal to 700 nm, and
   wherein the light-transmitting layer has a higher refractive index than air.

6. The display system according to claim 1, further comprises a memory portion configured to supply the correction data to the arithmetic portion.

7. The display system according to claim 1, further comprising a detection device configured to acquire luminance data of the first display panel and the second display panel.

8. An image processing device comprising:
   an arithmetic portion configured to produce a second image signal by correcting a first image signal on the basis of a correction data, and supply the second image signal to a display device,
   wherein the display device comprises:
   a first display panel comprising a first region; and
   a second display panel comprising a second region,
   wherein the first region is configured to display an image,
   wherein the second region is configured to transmit visible light, wherein the first region comprises a first portion overlapping with the second region, and wherein the second image signal is a signal in which gray scale corresponding to the first portion is corrected, or a signal in which gray scale corresponding to at least part of the first region excluding the first portion is corrected.

9. The image processing device according to claim 8, further comprising a memory portion, wherein the memory portion is configured to supply the correction data to the arithmetic portion.

* * * * *